(12) United States Patent
Forutanpour et al.

(10) Patent No.: US 11,922,467 B2
(45) Date of Patent: Mar. 5, 2024

(54) EVALUATING AN ELECTRONIC DEVICE USING OPTICAL CHARACTER RECOGNITION

(71) Applicant: ecoATM, LLC, San Diego, CA (US)

(72) Inventors: Babak Forutanpour, San Diego, CA (US); Ted Ray Gooding, San Diego, CA (US)

(73) Assignee: ecoATM, Inc., San Diego, CA (US)

( * ) Notice: Subject to any disclaimer, the term of this patent is extended or adjusted under 35 U.S.C. 154(b) by 236 days.

(21) Appl. No.: 17/445,083

(22) Filed: Aug. 13, 2021

(65) Prior Publication Data
US 2022/0051301 A1 Feb. 17, 2022

Related U.S. Application Data

(60) Provisional application No. 63/116,020, filed on Nov. 19, 2020, provisional application No. 63/066,794, filed on Aug. 17, 2020.

(51) Int. Cl.
*G06Q 30/02* (2023.01)
*G06Q 10/30* (2023.01)
(Continued)

(52) U.S. Cl.
CPC ......... *G06Q 30/0278* (2013.01); *G06Q 20/18* (2013.01); *G06Q 20/208* (2013.01);
(Continued)

(58) Field of Classification Search
CPC .. G06Q 30/0278; G06Q 20/18; G06Q 20/208; G06Q 30/0185
See application file for complete search history.

(56) References Cited

U.S. PATENT DOCUMENTS 1,327,315 A 1/1920 Davies
3,808,439 A 4/1974 Renius
(Continued)

FOREIGN PATENT DOCUMENTS

CA 2760863 11/2010
CA 2818533 A1 5/2012
(Continued)

OTHER PUBLICATIONS

2006 Florida Statutes Title XXXIII, Chapter 538, Sections 538.03 and 538.04, 7 pages.
(Continued)

*Primary Examiner* — Peter Ludwig
(74) *Attorney, Agent, or Firm* — Perkins Coie LLP

(57) ABSTRACT

Disclosed herein are various embodiments of systems and methods for evaluating a device and presenting a price quote for the device by using an optical character recognition (OCR) system and/or other associated devices and systems. The system can utilize a wireless charger to obtain information about the device while charging the device. The information can include the make of the device. The system can guide the user to navigate the device to provide additional information such as model, memory capacity, unique identifier, and carrier associated with the device, which can be extracted from the device using OCR. Based on, e.g., the unique identifier, the system can determine whether the device has been stolen. If the device has not been stolen, the system can determine a price based on information obtained from the device and can present the price to the user. If the user accepts the price, the system can facilitate purchase of the device.

20 Claims, 24 Drawing Sheets

(51) Int. Cl.
  *G06Q 20/18* (2012.01)
  *G06Q 20/20* (2012.01)
  *G06Q 30/018* (2023.01)
  *G06V 10/44* (2022.01)
  *G06V 20/00* (2022.01)
  *G08B 13/196* (2006.01)
  *H04W 8/18* (2009.01)
  *H04W 8/22* (2009.01)
  *G06V 30/10* (2022.01)
  *H02J 7/02* (2016.01)

(52) U.S. Cl.
  CPC ......... *G06Q 30/0185* (2013.01); *G06V 10/44* (2022.01); *G06V 20/00* (2022.01); *G08B 13/19682* (2013.01); *H04W 8/183* (2013.01); *H04W 8/22* (2013.01); *G06Q 10/30* (2013.01); *G06V 30/10* (2022.01); *G06V 2201/02* (2022.01); *H02J 7/02* (2013.01)

(56) References Cited

U.S. PATENT DOCUMENTS

| | | |
|---|---|---|
| 4,248,334 A | 2/1981 | Hanley et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A | 1/1996 | Moore |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,407,392 B1 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |

(56) References Cited

U.S. PATENT DOCUMENTS

| | | |
|---|---|---|
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,367,982 B2 | 6/2016 | Chayun et al. |
| 9,378,606 B2 | 6/2016 | Chayun et al. |
| 9,390,442 B2 | 7/2016 | Lyle |
| 9,497,563 B2 | 11/2016 | Hornung et al. |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,818,160 B2 | 11/2017 | Bowles et al. |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 10,032,140 B2 | 7/2018 | Bowles et al. |
| 10,043,339 B2 | 8/2018 | Walker et al. |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 | 2/2020 | Bowles et al. |
| 10,679,279 B2 | 6/2020 | Ward |
| 10,740,891 B1 | 8/2020 | Chen et al. |
| 10,803,527 B1 * | 10/2020 | Zankat ............... G06V 30/40 |
| 10,824,942 B1 | 11/2020 | Bhotika et al. |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 10,970,786 B1 | 4/2021 | Matheson et al. |
| 10,977,700 B2 | 4/2021 | Bordeleau et al. |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,126,973 B2 | 9/2021 | Silva et al. |
| 11,164,000 B2 * | 11/2021 | Lee ..................... G06V 20/20 |
| 11,232,412 B2 | 1/2022 | Hunt et al. |
| 11,288,789 B1 | 3/2022 | Chen et al. |
| 11,302,038 B2 * | 4/2022 | Muendel ............... H04L 51/08 |
| 11,315,093 B2 | 4/2022 | Bowles |
| 11,321,768 B2 * | 5/2022 | Beauchamp ........... G06V 20/64 |
| 11,341,471 B2 | 5/2022 | Dion et al. |
| 11,379,886 B1 | 7/2022 | Fields et al. |
| 11,417,068 B1 * | 8/2022 | Burris .................. G06Q 20/18 |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,688,149 B1 * | 6/2023 | Mascarin ............. G06T 19/006 |
| | | 345/633 |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |

(56) References Cited

U.S. PATENT DOCUMENTS

| | | |
|---|---|---|
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0173576 A1* | 7/2011 | Murphy ............... G06F 3/0481 715/863 |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0235812 A1 | 9/2012 | Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1 | 8/2013 | Panagas |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | DeSousa |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1* | 5/2014 | Uchida ............... G06V 30/40 382/103 |
| 2014/0150100 A1 | 5/2014 | Gupta et al. |
| 2014/0156883 A1 | 6/2014 | Bowles |
| 2014/0178029 A1* | 6/2014 | Raheman ......... H04N 21/41415 386/224 |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0120485 A1 | 4/2015 | Nash |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |

(56) References Cited

U.S. PATENT DOCUMENTS

| | | |
|---|---|---|
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |
| 2017/0169401 A1 | 6/2017 | Beane et al. |
| 2017/0221110 A1 | 8/2017 | Sullivan et al. |
| 2017/0256051 A1 | 9/2017 | Dwivedi et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0343481 A1 | 11/2017 | Jahanshahi et al. |
| 2018/0084094 A1 | 3/2018 | Sinha et al. |
| 2018/0101810 A1* | 4/2018 | Feng ................. G06Q 10/1097 |
| 2018/0157246 A1 | 6/2018 | Huang et al. |
| 2018/0157820 A1 | 6/2018 | Adams et al. |
| 2018/0160269 A1 | 6/2018 | Baarman et al. |
| 2018/0240144 A1 | 8/2018 | Curtis |
| 2018/0293566 A1 | 10/2018 | Engles et al. |
| 2018/0293664 A1 | 10/2018 | Zhang et al. |
| 2018/0321163 A1 | 11/2018 | Casadio |
| 2018/0322623 A1 | 11/2018 | Memo et al. |
| 2018/0342050 A1 | 11/2018 | Fitzgerald et al. |
| 2018/0350163 A1 | 12/2018 | Pofale et al. |
| 2019/0019147 A1 | 1/2019 | McCarty et al. |
| 2019/0066075 A1 | 2/2019 | Lobo et al. |
| 2019/0066439 A1 | 2/2019 | Pinkus |
| 2019/0073566 A1 | 3/2019 | Brauer |
| 2019/0073568 A1 | 3/2019 | He et al. |
| 2019/0102874 A1 | 4/2019 | Goja |
| 2019/0166278 A1 | 5/2019 | Hiyama et al. |
| 2019/0222748 A1 | 7/2019 | Weir et al. |
| 2019/0251777 A1 | 8/2019 | Abdelmalak et al. |
| 2019/0272628 A1 | 9/2019 | Tsou |
| 2019/0279431 A1 | 9/2019 | Wurmfeld et al. |
| 2019/0318465 A1 | 10/2019 | Nguyen |
| 2019/0372827 A1 | 12/2019 | Vasseur et al. |
| 2020/0020097 A1 | 1/2020 | Do et al. |
| 2020/0042969 A1 | 2/2020 | Ray |
| 2020/0066067 A1 | 2/2020 | Herman et al. |
| 2020/0090137 A1 | 3/2020 | Bowles et al. |
| 2020/0104720 A1 | 4/2020 | Boa et al. |
| 2020/0175669 A1 | 6/2020 | Bian et al. |
| 2020/0202319 A1 | 6/2020 | Forutanpour et al. |
| 2020/0202405 A1 | 6/2020 | Glickman et al. |
| 2020/0241891 A1 | 7/2020 | Li et al. |
| 2020/0265487 A1 | 8/2020 | Forutanpour et al. |
| 2020/0393742 A1 | 12/2020 | Dion et al. |
| 2021/0012315 A1 | 1/2021 | Priebatsch |
| 2021/0081698 A1 | 3/2021 | Lindeman et al. |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0174312 A1 | 6/2021 | Bowles et al. |
| 2021/0192484 A1 | 6/2021 | Forutanpour et al. |
| 2021/0209512 A1 | 7/2021 | Gaddam et al. |
| 2021/0209746 A1 | 7/2021 | Johnson et al. |
| 2021/0224867 A1 | 7/2021 | Bordeleau et al. |
| 2021/0254966 A1 | 8/2021 | Hur et al. |
| 2021/0255240 A1 | 8/2021 | McGrath |
| 2021/0272208 A1 | 9/2021 | Leise et al. |
| 2021/0278338 A1 | 9/2021 | Jung |
| 2021/0295494 A1 | 9/2021 | Forutanpour et al. |
| 2021/0343030 A1* | 11/2021 | Sagonas .................. G06T 7/30 |
| 2021/0357545 A1* | 11/2021 | Sugawara .............. G06Q 50/04 |
| 2022/0027879 A1 | 1/2022 | Bowles et al. |
| 2022/0050897 A1 | 2/2022 | Gaddam et al. |
| 2022/0051212 A1 | 2/2022 | Forutanpour et al. |
| 2022/0051300 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0164833 A1 | 5/2022 | Dion et al. |
| 2022/0172178 A1 | 6/2022 | Forutanpour et al. |
| 2022/0187802 A1 | 6/2022 | Wittenberg et al. |
| 2022/0198407 A1 | 6/2022 | Beane et al. |
| 2022/0262189 A1* | 8/2022 | Dion ..................... G06Q 20/18 |
| 2022/0277281 A1 | 9/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0196865 A1 | 6/2023 | Forutanpour et al. |
| 2023/0215109 A1* | 7/2023 | Ha ........................ G06T 19/006 |
| | | 345/633 |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 202394296 | 8/2012 |
| CN | 102654927 | 9/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 205129815 U | 4/2016 |
| CN | 205132514 U | 4/2016 |

(56) References Cited

FOREIGN PATENT DOCUMENTS

| | | | |
|---|---|---|---|
| CN | 205140067 U | 4/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |
| CN | 304169301 S | 6/2017 |
| CN | 206440635 U | 8/2017 |
| CN | 107220640 A | 9/2017 |
| CN | 206466691 U | 9/2017 |
| CN | 107514978 A | 12/2017 |
| CN | 206861374 U | 1/2018 |
| CN | 207037788 U | 2/2018 |
| CN | 105444678 B | 3/2018 |
| CN | 304702339 S | 6/2018 |
| CN | 304702340 S | 6/2018 |
| CN | 304747709 S | 7/2018 |
| CN | 304795309 S | 8/2018 |
| CN | 108596658 A | 9/2018 |
| CN | 108647588 A | 10/2018 |
| CN | 207993120 U | 10/2018 |
| CN | 207993121 U | 10/2018 |
| CN | 207995226 U | 10/2018 |
| CN | 304842785 S | 10/2018 |
| CN | 108764236 A | 11/2018 |
| CN | 208086545 U | 11/2018 |
| CN | 208172834 U | 11/2018 |
| CN | 304958348 S | 12/2018 |
| CN | 305014434 S | 1/2019 |
| CN | 305014435 S | 1/2019 |
| CN | 109831575 A | 5/2019 |
| CN | 208819255 U | 5/2019 |
| CN | 208819289 U | 5/2019 |
| CN | 208819290 U | 5/2019 |
| CN | 208969761 U | 6/2019 |
| CN | 305275610 S | 7/2019 |
| CN | 110333876 A | 10/2019 |
| CN | 110347341 A | 10/2019 |
| CN | 110595361 A | 12/2019 |
| CN | 110653162 A | 1/2020 |
| CN | 110675399 A | 1/2020 |
| CN | 110751002 A | 2/2020 |
| CN | 110788015 A | 2/2020 |
| CN | 110796646 A | 2/2020 |
| CN | 110796647 A | 2/2020 |
| CN | 110796669 A | 2/2020 |
| CN | 110827244 A | 2/2020 |
| CN | 110827245 A | 2/2020 |
| CN | 110827246 A | 2/2020 |
| CN | 110827247 A | 2/2020 |
| CN | 110827248 A | 2/2020 |
| CN | 110827249 A | 2/2020 |
| CN | 110880028 A | 3/2020 |
| CN | 110928730 A | 3/2020 |
| CN | 305638504 S | 3/2020 |
| CN | 110976302 A | 4/2020 |
| CN | 111009073 A | 4/2020 |
| CN | 111080184 A | 4/2020 |
| CN | 210348162 U | 4/2020 |
| CN | 111175318 A | 5/2020 |
| CN | 111210473 A | 5/2020 |
| CN | 305767220 S | 5/2020 |
| CN | 111238430 A | 6/2020 |
| CN | 111262987 A | 6/2020 |
| CN | 111272067 A | 6/2020 |
| CN | 111272388 A | 6/2020 |
| CN | 111272393 A | 6/2020 |
| CN | 111273704 A | 6/2020 |
| CN | 111277466 A | 6/2020 |
| CN | 111277659 A | 6/2020 |
| CN | 111277695 A | 6/2020 |
| CN | 111277696 A | 6/2020 |
| CN | 111290660 A | 6/2020 |
| CN | 111290949 A | 6/2020 |
| CN | 111291661 A | 6/2020 |
| CN | 111292302 A | 6/2020 |
| CN | 111294454 A | 6/2020 |
| CN | 111294459 A | 6/2020 |
| CN | 111307429 A | 6/2020 |
| CN | 111311556 A | 6/2020 |
| CN | 111311687 A | 6/2020 |
| CN | 111311749 A | 6/2020 |
| CN | 111314445 A | 6/2020 |
| CN | 111314535 A | 6/2020 |
| CN | 111325715 A | 6/2020 |
| CN | 111325716 A | 6/2020 |
| CN | 111325717 A | 6/2020 |
| CN | 111325901 A | 6/2020 |
| CN | 210666955 U | 6/2020 |
| CN | 305818424 S | 6/2020 |
| CN | 111439560 A | 7/2020 |
| CN | 211149556 U | 7/2020 |
| CN | 305955503 S | 7/2020 |
| CN | 211291337 U | 8/2020 |
| CN | 211296771 U | 8/2020 |
| CN | 211402187 U | 9/2020 |
| CN | 211515235 U | 9/2020 |
| CN | 211538600 U | 9/2020 |
| CN | 111830293 A | 10/2020 |
| CN | 111830354 A | 10/2020 |
| CN | 111860890 A | 10/2020 |
| CN | 111860891 A | 10/2020 |
| CN | 211630227 U | 10/2020 |
| CN | 306113050 S | 10/2020 |
| CN | 306113051 S | 10/2020 |
| CN | 306113052 S | 10/2020 |
| CN | 212023984 U | 11/2020 |
| CN | 212031269 U | 11/2020 |
| CN | 306164092 S | 11/2020 |
| CN | 306164093 S | 11/2020 |
| CN | 306164094 S | 11/2020 |
| CN | 306164095 S | 11/2020 |
| CN | 112098443 A | 12/2020 |
| CN | 212084259 U | 12/2020 |
| CN | 212268703 U | 1/2021 |
| CN | 212314534 U | 1/2021 |
| CN | 212322247 U | 1/2021 |
| CN | 212364464 U | 1/2021 |
| CN | 306272538 S | 1/2021 |
| CN | 306283626 S | 1/2021 |
| CN | 112348761 A | 2/2021 |
| CN | 112348808 A | 2/2021 |
| CN | 112393880 A | 2/2021 |
| CN | 112395118 A | 2/2021 |
| CN | 212586854 U | 2/2021 |
| CN | 212597202 U | 2/2021 |
| CN | 306323627 S | 2/2021 |
| CN | 112433902 A | 3/2021 |
| CN | 112452935 A | 3/2021 |
| CN | 112455988 A | 3/2021 |
| CN | 112456100 A | 3/2021 |
| CN | 112565505 A | 3/2021 |
| CN | 212677296 U | 3/2021 |
| CN | 212681731 U | 3/2021 |
| CN | 111314537 B | 4/2021 |
| CN | 112613622 A | 4/2021 |
| CN | 112613914 A | 4/2021 |
| CN | 112614117 A | 4/2021 |
| CN | 112614269 A | 4/2021 |
| CN | 112633194 A | 4/2021 |
| CN | 112634245 A | 4/2021 |
| CN | 112634288 A | 4/2021 |
| CN | 112634301 A | 4/2021 |
| CN | 112672145 A | 4/2021 |
| CN | 112735081 A | 4/2021 |
| CN | 213001252 U | 4/2021 |
| CN | 213004872 U | 4/2021 |
| CN | 112777290 A | 5/2021 |
| CN | 112783702 A | 5/2021 |
| CN | 112816490 A | 5/2021 |
| CN | 112822740 A | 5/2021 |
| CN | 112828842 A | 5/2021 |

(56) References Cited

FOREIGN PATENT DOCUMENTS

| | | |
|---|---|---|
| CN | 112837076 A | 5/2021 |
| CN | 112837102 A | 5/2021 |
| CN | 213149008 U | 5/2021 |
| CN | 213301455 U | 5/2021 |
| CN | 213301535 U | 5/2021 |
| CN | 213305483 U | 5/2021 |
| CN | 112907182 A | 6/2021 |
| CN | 112991614 A | 6/2021 |
| CN | 113032198 A | 6/2021 |
| CN | 113034481 A | 6/2021 |
| CN | 113034493 A | 6/2021 |
| CN | 113034529 A | 6/2021 |
| CN | 113034530 A | 6/2021 |
| CN | 113034531 A | 6/2021 |
| CN | 113038012 A | 6/2021 |
| CN | 113052798 A | 6/2021 |
| CN | 113110806 A | 7/2021 |
| CN | 113114794 A | 7/2021 |
| CN | 113132523 A | 7/2021 |
| CN | 113160494 A | 7/2021 |
| CN | 113190215 A | 7/2021 |
| CN | 113191789 A | 7/2021 |
| CN | 213765490 U | 7/2021 |
| CN | 213796595 U | 7/2021 |
| CN | 213807304 U | 7/2021 |
| CN | 306700330 S | 7/2021 |
| CN | 113220647 A | 8/2021 |
| CN | 113220648 A | 8/2021 |
| CN | 113237473 A | 8/2021 |
| CN | 113238680 A | 8/2021 |
| CN | 113238905 A | 8/2021 |
| CN | 113252678 A | 8/2021 |
| CN | 113254292 A | 8/2021 |
| CN | 113254293 A | 8/2021 |
| CN | 113254294 A | 8/2021 |
| CN | 113268162 A | 8/2021 |
| CN | 113298078 A | 8/2021 |
| CN | 113301202 A | 8/2021 |
| CN | 113329222 A | 8/2021 |
| CN | 213917879 U | 8/2021 |
| CN | 213933659 U | 8/2021 |
| CN | 306744667 S | 8/2021 |
| CN | 306744668 S | 8/2021 |
| CN | 306786433 S | 8/2021 |
| CN | 306786434 S | 8/2021 |
| CN | 113422860 A | 9/2021 |
| CN | 214160736 U | 9/2021 |
| CN | 214162705 U | 9/2021 |
| CN | 214427985 U | 10/2021 |
| CN | 113591066 A | 11/2021 |
| CN | 113591963 A | 11/2021 |
| CN | 215246545 U | 12/2021 |
| CN | 215247165 U | 12/2021 |
| CN | 215247245 U | 12/2021 |
| CN | 215247426 U | 12/2021 |
| CN | 215262785 U | 12/2021 |
| CN | 215262787 U | 12/2021 |
| CN | 215266884 U | 12/2021 |
| CN | 215266954 U | 12/2021 |
| CN | 215325354 U | 12/2021 |
| CN | 215556081 U | 1/2022 |
| CN | 215575427 U | 1/2022 |
| CN | 215576764 U | 1/2022 |
| CN | 215576765 U | 1/2022 |
| CN | 215703219 U | 2/2022 |
| CN | 216612155 U | 5/2022 |
| CN | 112672145 B | 2/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017093938 | 6/2017 |
| JP | 2019012474 | 1/2019 |
| JP | 3223233 U | 9/2019 |
| JP | 2022539909 A | 9/2022 |
| JP | 2022539910 A | 9/2022 |
| JP | 2022539912 A | 9/2022 |
| JP | 2022545336 A | 9/2022 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |

(56) References Cited

FOREIGN PATENT DOCUMENTS

| | | |
|---|---|---|
| KR | 1020190107594 | 9/2019 |
| KR | 1020200115308 | 10/2020 |
| KR | 20210020717 | 2/2021 |
| KR | 1020210059148 | 5/2021 |
| KR | 1020210107515 | 9/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |
| WO | WO2022034298 | 2/2022 |
| WO | WO2022090999 | 5/2022 |
| WO | WO2022091000 | 5/2022 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing User's Guide 2007, 8 pages.
Bhule et al., "Environmental and economic trade-offs in consumer electronic products recycling: a case study of cell phones and computers," IEEE International Symposium on Electronics and the Environment, Conference Record, 2004.
Bournique, D .: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Draft IDS 10/26ress Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4): 493-504.
Geekanoids, You Tube Video, "Apple iphone 3GS Unboxing and Review", uploaded on Jun. 19, 2009, retrieved from http://www.youtube.com/watch?v=GCEI9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
International Numbering Plan, www.numberingplans.com, 2 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp- dyn/content/article/2006/01/30/AR2006013001144.html on Nov. 10, 2015.

(56) References Cited

OTHER PUBLICATIONS

Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Bling et al. "Extended consumer responsibility: Syncretic value-oriented pricing strategies for trade-in-for-upgrade programs" Transportation Research Part E: Logistics and Transportation Review 122 (2019) 350-367.
Simplysellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate-Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
International Search Report and Written Opinion dated Nov. 29, 2021 in International Application No. PCT/US2021/071192, 15 pages.
International Search Report and Written Opinion dated Dec. 6, 2021 in International Application No. PCT/US2021/071191. 15 pages.
Invitation to Pay Additional Fees & Partial Search Report dated Nov. 29, 2021 in International Application No. PCT/US2021/071200, 11 pages.
International Search Report and Written Opinion dated Jan. 24, 2022 in International Application No. PCT/US2021/071200, 19 pages.
International Search Report and Written Opinion dated Nov. 22, 2021 in International Application No. PCT/US2021/071201, 17 pages.
Tech Spurt, "Sandisk iXpand Review | Wireless Charger & Auto Photo Backup!" https://www.youtube.com/watch?v=zemKQ6xIJLww, Aug. 21, 2019, 1 page.
Wiley Encyclopedia of Computer Science and Technology (2009).

* cited by examiner

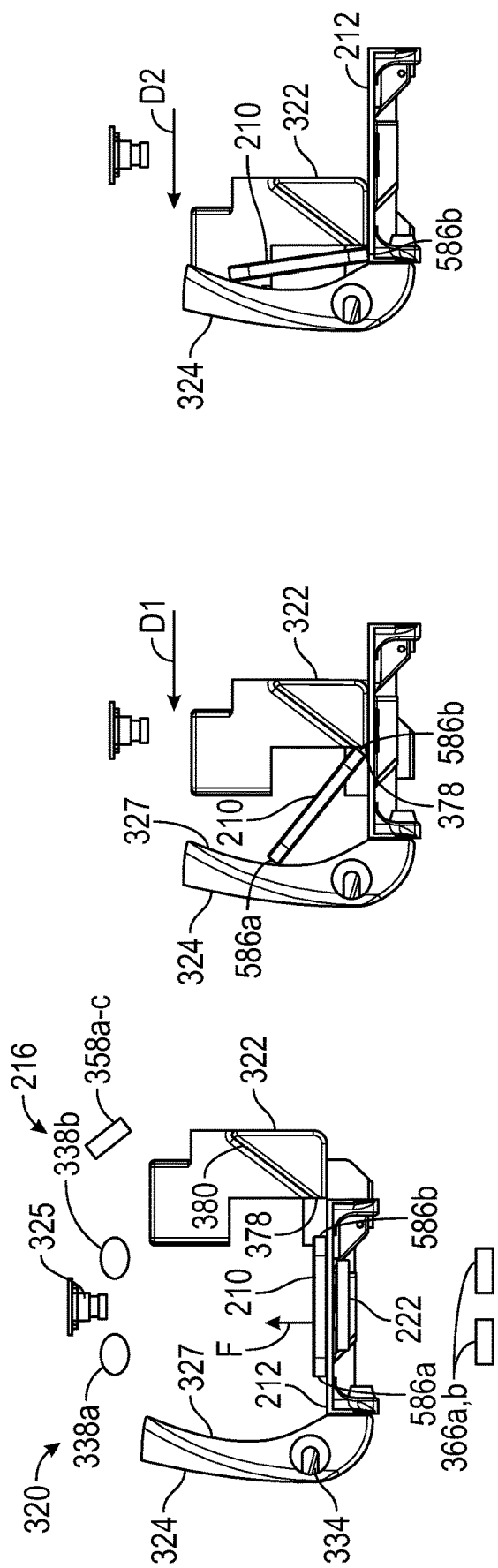

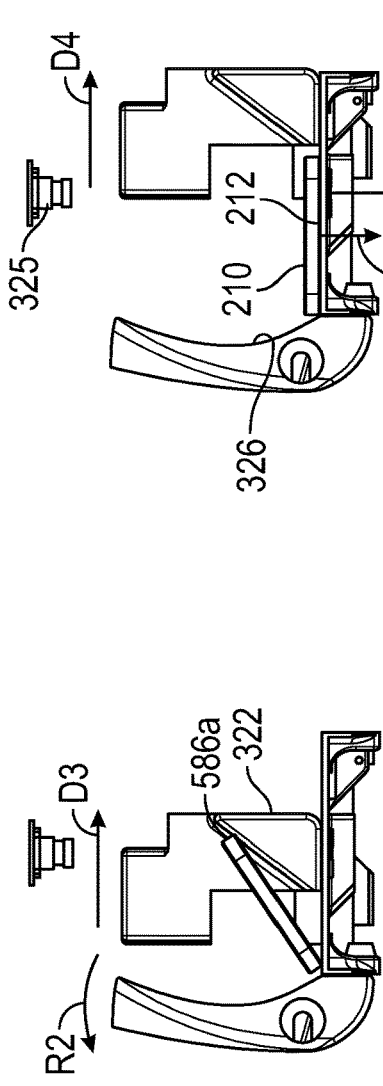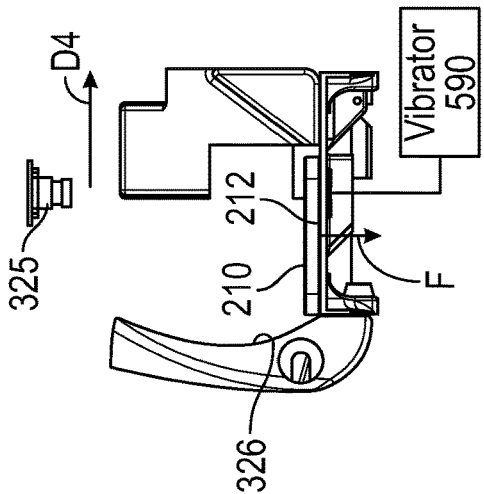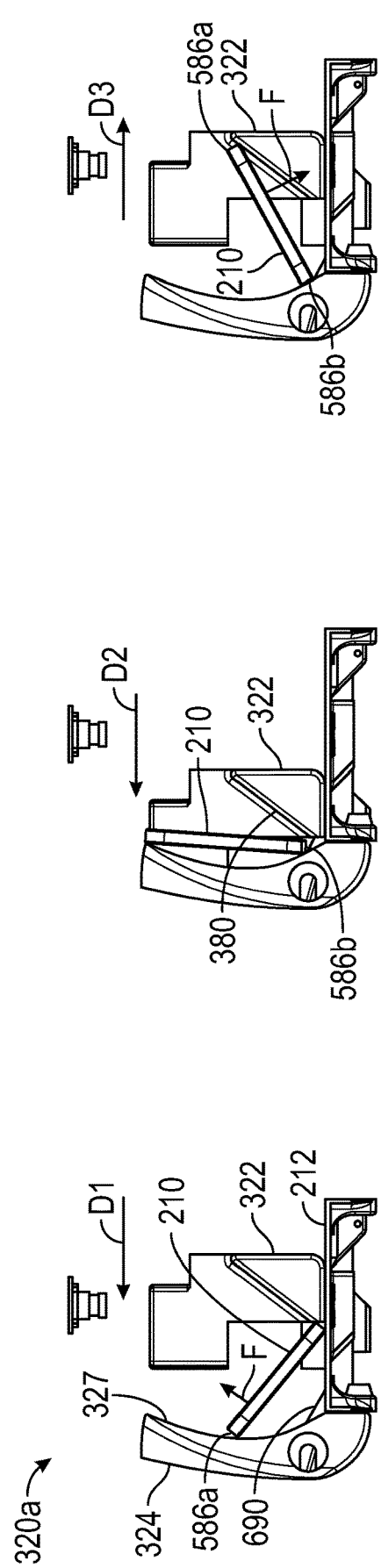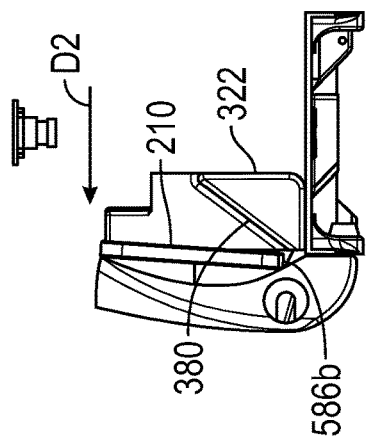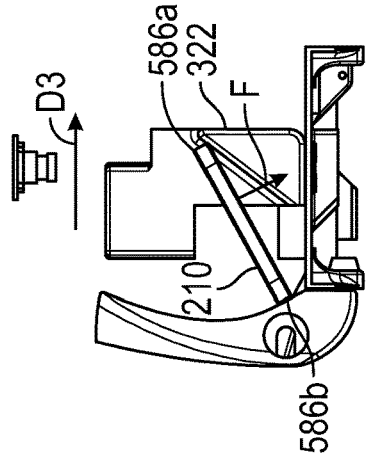

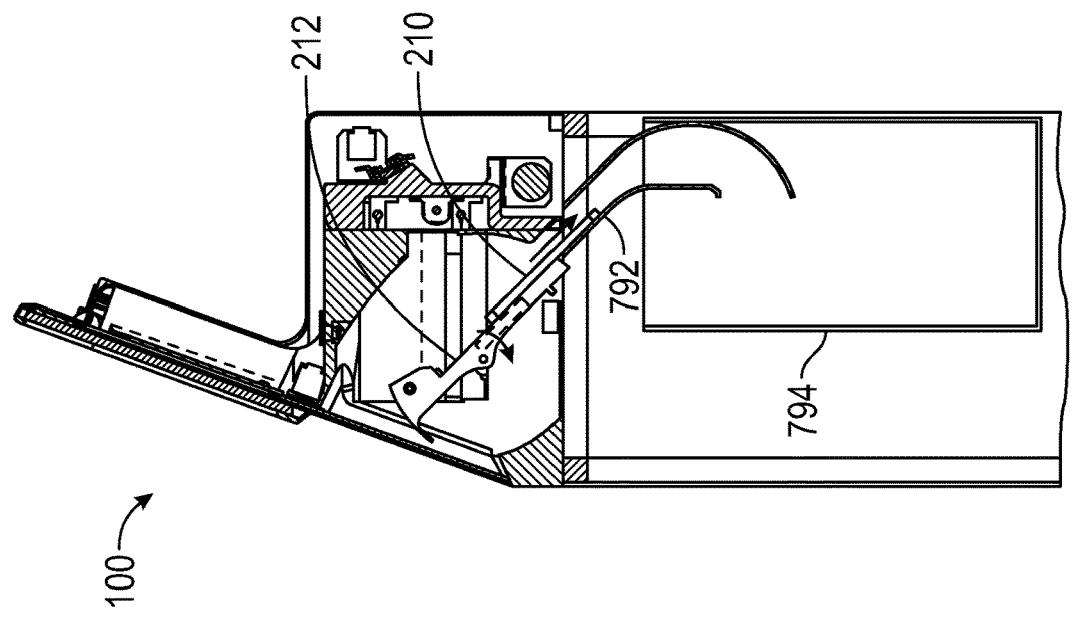
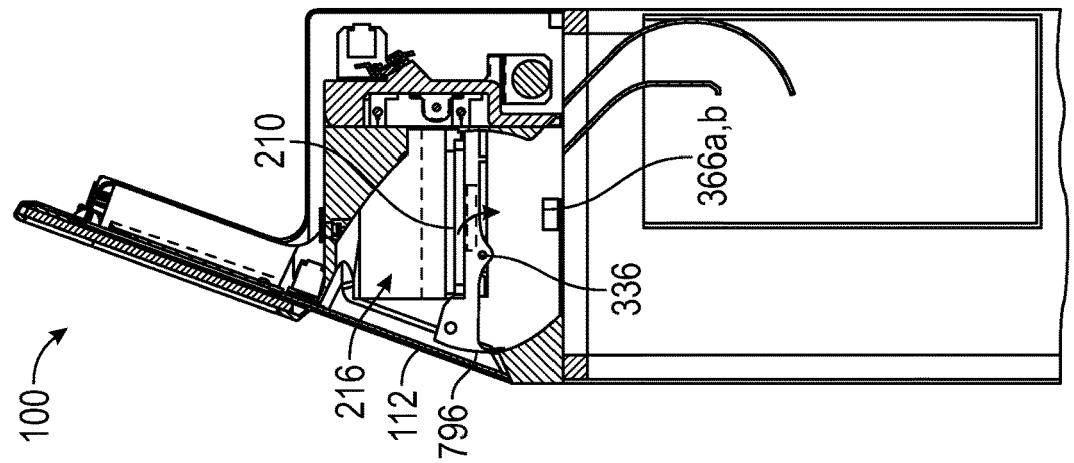
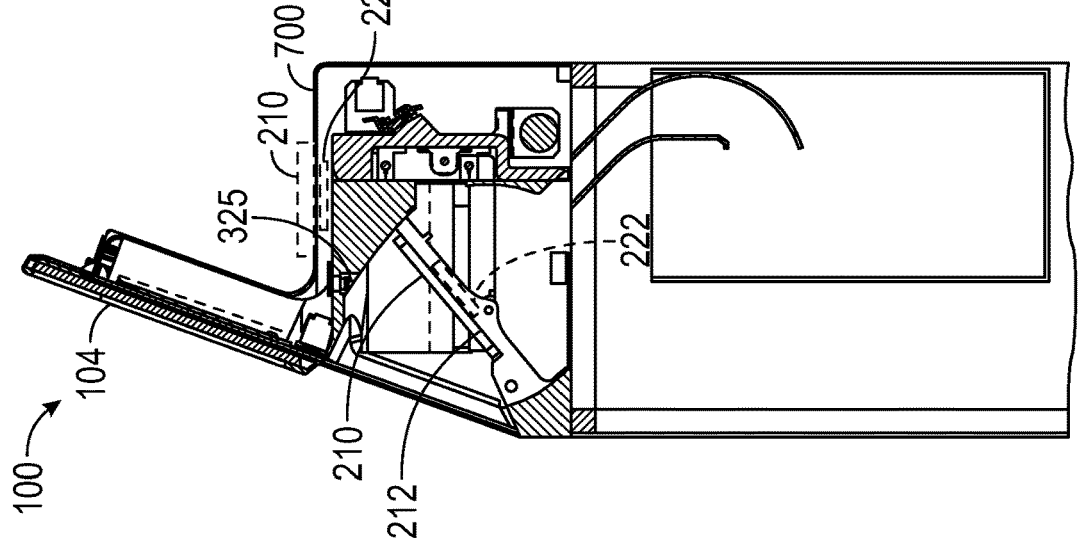

EVALUATING AN ELECTRONIC DEVICE USING OPTICAL CHARACTER RECOGNITION

CROSS-REFERENCE TO RELATED APPLICATIONS

This application claims the benefit of U.S. Provisional Patent Application No. 63/066,794, filed Aug. 17, 2020, and U.S. Provisional Patent Application No. 63/116,020, filed Nov. 19, 2020, both of which are incorporated by reference in their entireties herein.

TECHNICAL FIELD

The present disclosure is directed generally to methods and systems for evaluating and recycling mobile phones and other consumer devices and, more particularly, to hardware and/or software for facilitating device identification, evaluation, purchase, and/or other processes associated with electronic device recycling.

BACKGROUND

There are more mobile phones and other electronic devices (e.g., laptop computers, notebooks, tablets, PDAs, MP3 players, wearable smart devices, etc.) in use now than there are people on the planet. The rapid proliferation of mobile phones is due in part to the rapid pace at which they evolve. Because of the rapid pace of development, a relatively high percentage of mobile phones are replaced every year as consumers continually upgrade to obtain the latest features or a better operating plan. According to the U.S. Environmental Protection Agency, the United States alone disposes of over 370 million mobile phones, PDAs, tablets, and other electronic devices every year. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, mobile phones and similar devices typically contain substances that can be harmful to the environment, such as arsenic, lithium, cadmium, copper, lead, mercury, and zinc. If not properly disposed of, these toxic substances can seep into groundwater from decomposing landfills and contaminate the soil with potentially harmful consequences for humans and the environment.

As an alternative to retailer trade-in or buyback programs, consumers can recycle and/or sell their used mobile phones at self-service kiosks located in malls, retail stores, or other publicly accessible areas. Such kiosks are operated by ecoATM, LLC, the assignee of the present application, and embodiments of these kiosks are described in, for example: U.S. Pat. Nos. 8,463,646, 8,423,404, 8,239,262, 8,200,533, 8,195,511, and 7,881,965, each of which is incorporated herein by reference in its entirety.

BRIEF DESCRIPTION OF THE DRAWINGS

FIGS. 5A-5G are a series of front views of the kiosk inspection area illustrating operation of a mobile device flipping apparatus configured in accordance with embodiments of the present technology.

FIGS. 6A-6C are a series of front views illustrating operation of a mobile device flipping apparatus configured in accordance with other embodiments of the present technology.

FIGS. 7A-7C are a series of cross-sectional side views of the kiosk of FIG. 1 illustrating three stages of operation of the inspection tray, in accordance with embodiments of the present technology.

DETAILED DESCRIPTION

Figure 2A:
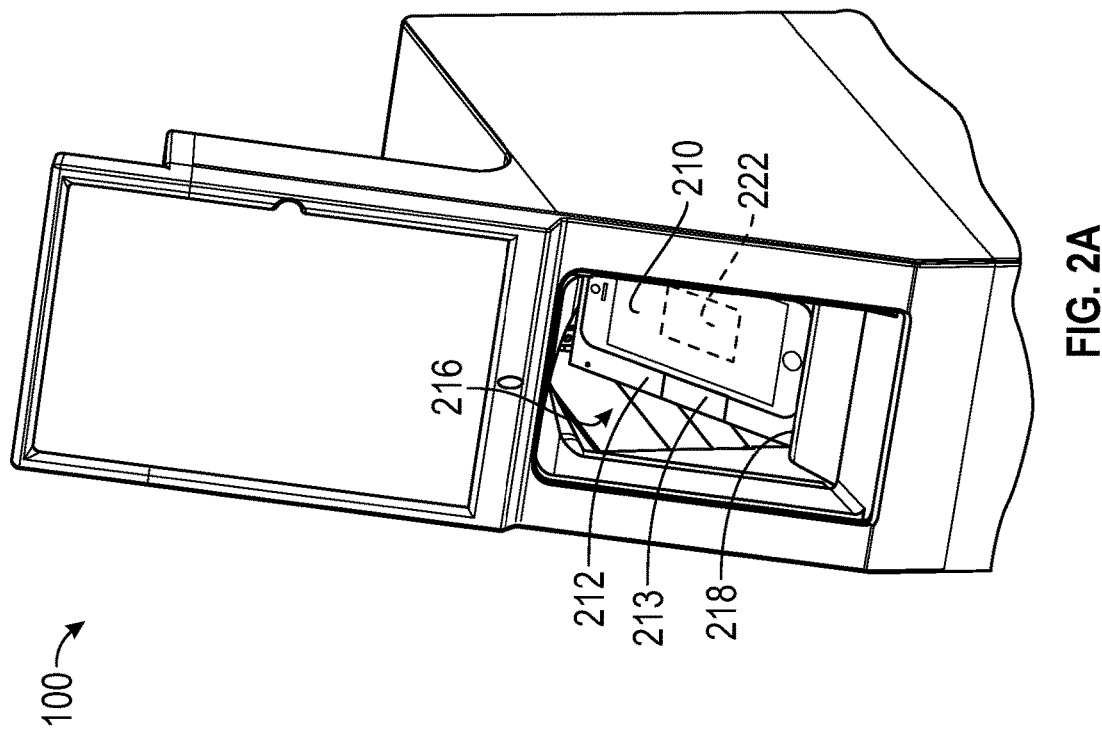
FIGS. 2A-2C are a series of enlarged isometric views illustrating structures and functions associated with an inspection area of the kiosk of FIG. 1, configured in accordance with embodiments of the present technology.

The following disclosure describes various embodiments of systems and methods that enable users to sell, trade, or recycle mobile phones and other electronic devices. In some embodiments, the systems described herein include a kiosk or other structure having a wireless charger in, or proximate to, a device inspection area and an associated optical character recognition (OCR) system. As described in greater detail below, in various embodiments the wireless charger can be used to obtain information about a device (e.g., a mobile phone) placed in proximity to the wireless charger, and the information can be used to determine a price quote for the device. Embodiments of such a wireless charger are described in concurrently filed U.S. patent application No. 17/445,082, filed on Aug. 13, 2021 and U.S. Provisional Patent Application No. 63/116,007, filed on Nov. 19, 2020, and incorporated herein in their entireties by reference. The kiosk can also guide the user to navigate the device and cause the device to display additional information such as model, memory capacity, unique identifier (e.g., an International Mobile Equipment Identity (IMEI) number), and/or carrier. The kiosk can capture and evaluate the displayed information via, for example, one or more cameras and the OCR system.

Based on the unique identifier, the kiosk and/or associated systems can determine whether the device has been stolen. If the device has not been stolen, the kiosk can determine an estimated price or price range for the device based on the obtained information and present the price or price range to the user. The price range can include a high price and a low price. If the user wishes to proceed and sell the device, the kiosk can inform the user that further inspection of the device may be necessary (to, for example, inspect the device display screen for cracks) before the high price can be paid and that this additional inspection may take a few minutes. If the user does not wish to wait, the user can accept the low price and the kiosk can proceed to purchase the device for the lower price. If, instead, the user wishes to have the device further inspected in order to obtain a higher price, the kiosk can proceed to further inspect the device and then offer a more accurate (and likely higher) price based on the more thorough inspection. In some embodiments as described herein, the kiosk and other systems can further inspect the device by: causing the device to run one or more tests; using one or more cameras that image the device for visual inspection of, e.g., the device display screen for cracks or other damage; and/or using an electrical cable that connects to the device and performs an electrical inspection of, e.g., device functionality.

Certain details are set forth in the following description and in FIGS. 1-19 to provide a thorough understanding of various embodiments of the present technology. In other instances, well-known structures, materials, operations, and/or systems often associated with smartphones and other handheld mobile electronic devices, consumer electronic devices, computer hardware, software, and network systems, etc., are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. Component details may be abstracted in the Figures to exclude details such as position of components and certain precise connections between such components when such details are unnecessary for a complete understanding of how to make and use the invention. Many of the details, dimensions, angles, and other features shown in the Figures are merely illustrative of particular embodiments of the present technology. Accordingly, other embodiments can have other details, dimensions, angles, and features without departing from the spirit or scope of the present disclosure. In addition, those of ordinary skill in the art will appreciate that further embodiments of the present technology can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
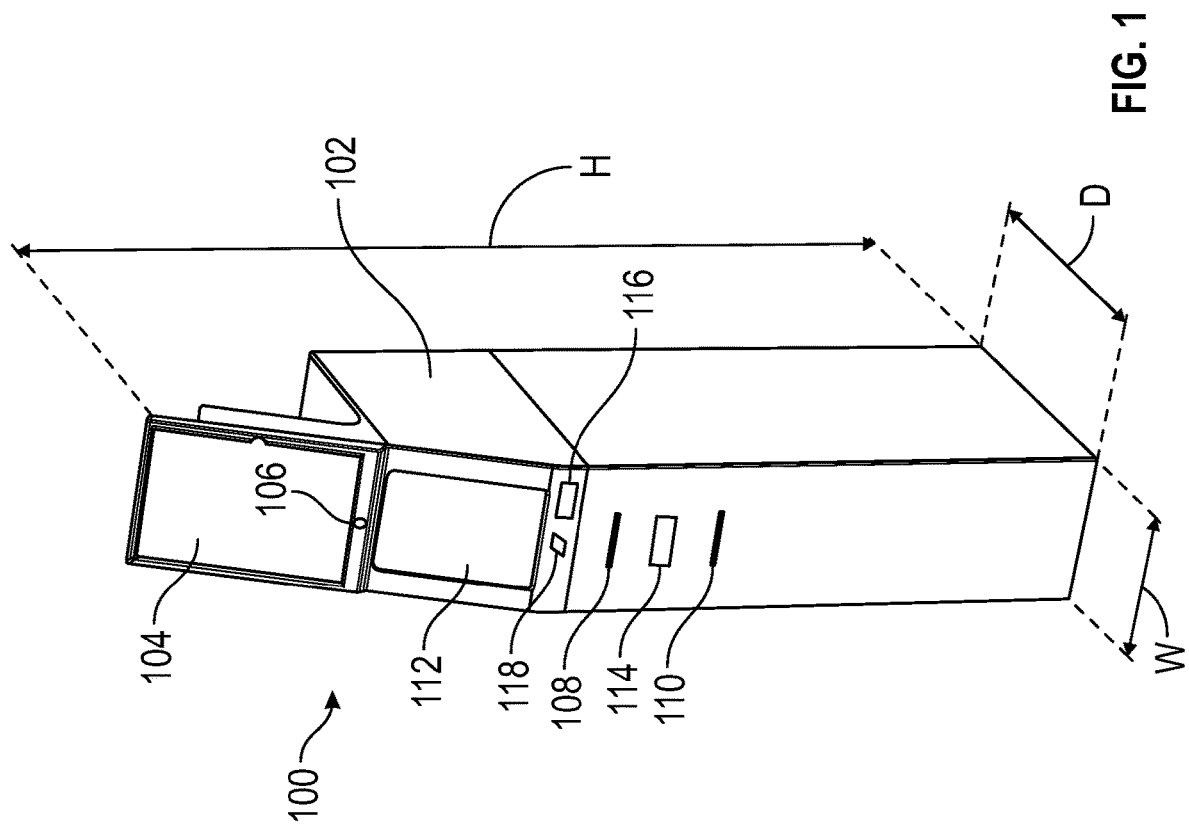
FIG. 1 is an isometric view of a consumer-operated kiosk for purchasing mobile electronic devices from users, configured in accordance with embodiments of the present technology.

FIG. 1 is an isometric view of a consumer-operated kiosk 100 for purchasing mobile phones and other electronic devices from users, configured in accordance with embodiments of the present technology. The kiosk 100 includes an enclosure or housing 102 that supports a display screen 104 positioned above an inspection area access door 112. The access door 112 can be formed from, e.g., various types of plastic (e.g., polyethylene, polycarbonate, etc.), glass, etc., that can be transparent, opaque, or solid. The housing 102 can be manufactured from, for example, sheet metal, plastic panels, etc., in a conventional manner. By way of example only, in some embodiments, the kiosk 100 can have a width W of from about 7 inches to about 14 inches, or from about 8 inches to about 9 inches; a depth D of from about 12 inches to about 18 inches, or from about 14 inches to about 15 inches; and an overall height H of from about 3 feet to about 5 feet, or about 4 feet. The foregoing dimensions are but one example; in other embodiments, kiosks configured in accordance with the present disclosure can have other dimensions without departing from the present disclosure.

A plurality of user interface devices are provided on a front portion of the housing 102 for providing messages or instructions and other information to users, and/or for receiving user inputs and other information from users. For example, in some embodiments, the display screen 104 can include a liquid crystal display (LCD) or a light emitting diode (LED) display screen, a projected display (such as a heads-up display or a head-mounted device), and so on, for providing information, prompts, etc., to users. The display screen 104 can also display graphical user interfaces (GUIs), including touch screens, for receiving user input and responses to displayed prompts. In addition or alternatively, the kiosk 100 can include a separate keyboard or keypad for receiving user inputs. The kiosk 100 can also include an ID reader or scanner 108 (e.g., a driver's license scanner), a fingerprint reader 118, and one or more external cameras 106 (e.g., digital still and/or video cameras).

The kiosk 100 can additionally include output devices such as a label printer (e.g., a barcode label printer) having an outlet 116, a payment (e.g., cash, voucher, coupon, etc.) dispenser having an outlet 110, and/or a receipt dispenser having an outlet 114. Although not identified in FIG. 1, the kiosk 100 can further include, e.g., a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), as well as other user input and/or output devices. Additionally, the kiosk 100 can also include a barcode reader (for reading, e.g., a barcode displayed on a mobile device), a QR code reader (for reading, e.g., a QR code displayed on a mobile device), a package or bag dispenser (e.g., a shipping package dispenser), a digital signature pad, etc. The user interface devices described above are representative of such devices that can be included with some embodiments of the kiosk 100. Depending on the particular use case or commercial application, other embodiments of the kiosks disclosed herein can include other devices, or one or more of the above devices may be omitted. Accordingly, embodiments of the kiosk 100 are not limited to the type or arrangement of user interface devices described above.

Figure 2C:
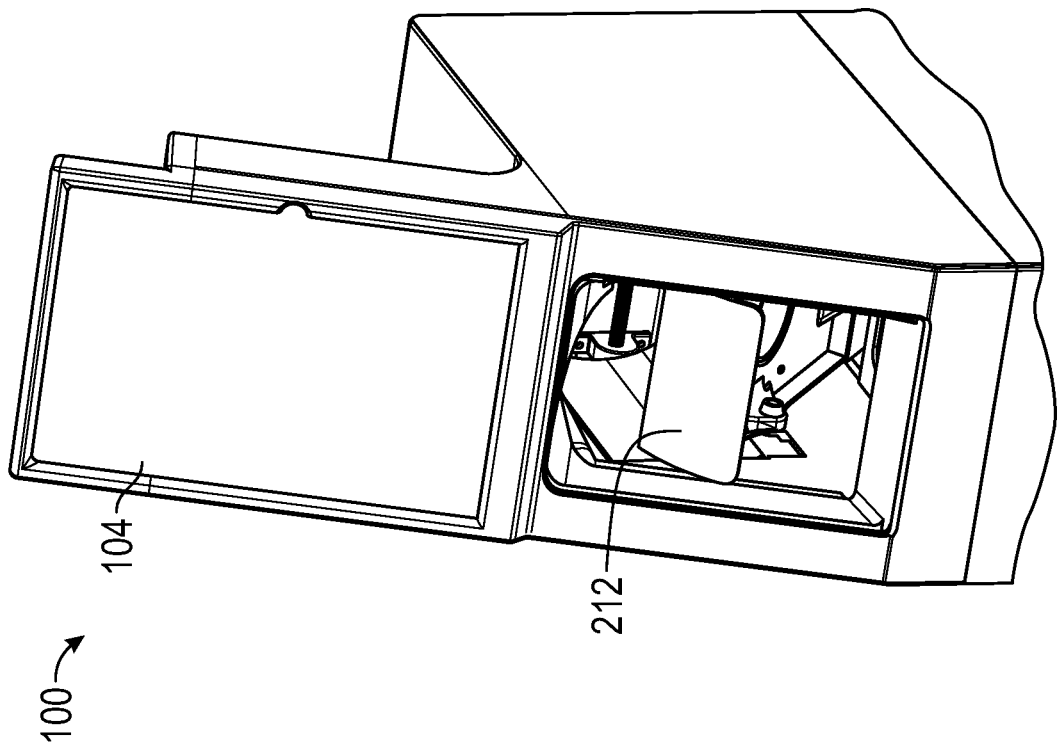
Figure 2B:
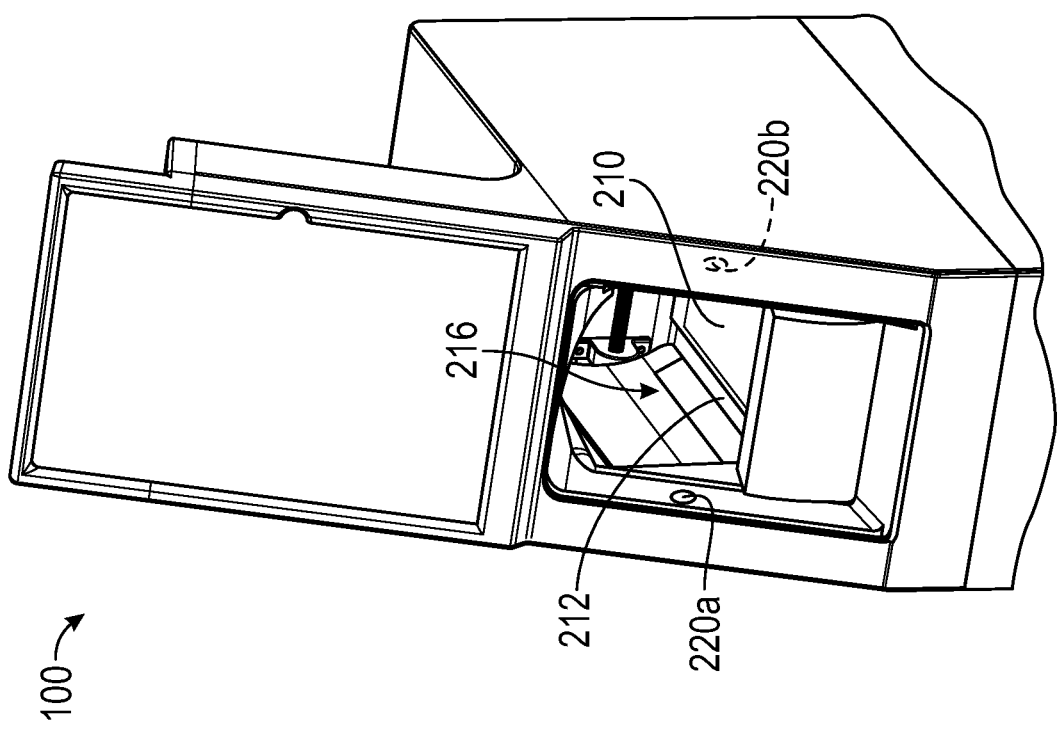

FIGS. 2A-2C are a series of enlarged isometric views illustrating structures and functions associated with an inspection area 216 of the kiosk 100. Referring first to FIG. 2A, in some embodiments, a user wishing to sell an electronic device (e.g., a used mobile phone 210) via the kiosk 100 would first approach the kiosk 100 and follow prompts displayed on the display screen 104. Such prompts, for example, may ask the user what type of phone they wish to sell/trade, who the carrier is, etc. To begin the process, the access door 112 (FIG. 1) retracts upward behind the display screen 104 to expose the inspection area 216. In other embodiments, the access door 112 may be stored in the retracted position. The inspection area 216 includes an inspection tray 212 having a shelf 218. The inspection tray 212 is sometimes referred to as a "tray 212." The user is instructed (via, e.g., prompts on the display screen 104) to position the mobile phone 210 on the shelf 218 so that it is facing outward toward the user with the electrical connector receptacle on the mobile phone 210 facing downward toward the shelf 218, as shown in FIG. 2A. In some embodiments, the user may also be asked to turn the mobile phone 210 on.

In some embodiments, the kiosk 100 includes a wireless charger 222 positioned in relatively close proximity to the mobile phone 210 when the phone is positioned on the inspection tray as shown in FIG. 2A. For example, in the illustrated embodiment the wireless charger 222 is mounted to the back side of the inspection tray 212 (which could also be referred to as the underside of the inspection tray 212). The wireless charger 222 can be, for example, a "Qi wireless charger" that functions in accordance with the Qi open interface standard, which defines wireless power transfer using inductive charging over distances of up to, e.g., about 1.6 inches. In operation, the wireless charger 222 can provide a quick charge to the mobile phone 210 if it is placed on the inspection tray 212 without power. Additionally, as described in greater detail below, in some embodiments the wireless charger 222 can receive certain information about the mobile phone (e.g., make, model, a unique 32-bit identifier associated with the phone, and/or Qi standard, etc.) as part of the charging process.

In some embodiments, identifying the unique ID of the mobile phone 210 and maintaining the wireless connection between the wireless charger 222 and the mobile phone 210 during the kiosk transaction enables the kiosk 100 to monitor whether the user attempts to switch the mobile phone 210 with another mobile phone (e.g., another mobile phone of the same model but lesser value) at any time during the transaction. For example, if the connection between the wireless charger 222 and the mobile phone 210 is broken, the kiosk 100 requires reestablishment of the connection prior to purchasing the mobile phone 210. For example, reestablishment of the connection involves providing the unique ID in the header packet of the wireless charging protocol. By obtaining the unique ID in the header packet, the kiosk 100 can identify whether the mobile phone 210 has been switched. If so, the kiosk 100 can stop the transaction, display a warning to the user, and/or take other steps to prevent the user from committing fraud by pricing one phone but actually selling the kiosk a different phone of, for example, a lesser value.

In some embodiments, the information obtained from the wireless charger 222 may include only the make of the mobile phone 210. In most instances, the make of the mobile phone 210 will be only a part of the information needed to provide an accurate price quote for the device. After receiving the make of the mobile phone 210, the kiosk 100 can offer to purchase the mobile phone 210 from the user for a low price based solely on the make of the phone, or the kiosk 100 can offer to perform a more thorough evaluation of the mobile phone 210 and potentially offer the user a higher price if the user is willing to wait.

If the user decides to wait and authorizes the kiosk 100 to perform a more thorough evaluation, the kiosk 100 can instruct the user (via, e.g., prompts displayed on the kiosk display screen 104) how to navigate menus on the mobile phone 210 while it is positioned on the inspection tray 212 as shown in FIG. 2A so that the mobile phone 210 displays information about the device, such as the model, the carrier, memory capacity, unique identification number (e.g., an IMEI number), etc. The kiosk 100 can adjust messages or instructions presented to the user based on the make of the mobile phone 210 obtained from the wireless charger 222. For example, the messages or instructions presented to the user for Google devices may be different from the messages or instructions for Apple® devices. A camera (not shown in FIG. 2A) in or proximate to the inspection area 216 can capture one or more images of the information displayed on the mobile phone 210, and an OCR system, such as the OCR system 807 in FIG. 8, associated with the kiosk 100 can extract the device information from the images. Other embodiments are described in concurrently filed U.S. patent application No. 17/445,158, filed on Aug. 16, 2021 and U.S. Provisional Patent Application No. 63/066,794, filed on Aug. 17, 2020, and incorporated herein by reference in their entireties. In some embodiments, the information obtained by the wireless charger 222 and/or the associated OCR system can be used to present a more accurate price or price range to the user without the need to connect a cable from the kiosk 100 to the mobile phone 210.

If the kiosk 100 cannot obtain the information necessary to accurately price the mobile phone 210 by guiding the user to navigate the phone display because, for example, the user cannot follow the messages or instructions provided, or because the user does not want to spend the time to follow the messages or instructions, the kiosk 100 can present an electrical connector configured to connect to the mobile phone 210. For example, as described in greater detail below, in some embodiments the kiosk 100 can present the appropriate electrical connector (not shown) by extending it outward through an aperture in the shelf 218, so that the user can connect mobile phone 210 to the connector when he/she positions the mobile phone 210 on the shelf 218 as shown in FIG. 2A. The kiosk 100 can determine the appropriate electrical connector to present to the user based on the make of the mobile phone 210. The appropriate electrical connector can also be selected by the kiosk 100 in response to, for example, user responses to questions presented on the display screen 104 regarding the type of phone the user wishes to sell. After the user connects the mobile phone 210 to the appropriate electrical connector, the kiosk 100 can perform an electrical inspection of the device to obtain the additional device information via the electrical connector as described below with reference to FIG. 2B. In some embodiments, the kiosk 100 can perform the electrical inspection via the electrical connector when the inspection tray 212 is in the position shown in FIG. 2A. In other embodiments, the kiosk 100 can perform the electrical inspection of the mobile phone 210 when the inspection tray 212 is rotated to the position shown in FIG. 2B.

Before or after the kiosk 100 obtains the additional device information, the kiosk can perform a visual inspection of the mobile phone 210 to determine defects with the mobile phone 210 (e.g., whether the device screen is cracked or whether the mobile phone 210 has other physical damage), as also described below with reference to FIG. 2B. For example, when the screen of the mobile phone 210 is cracked, the price offered for the mobile phone will be lower than if the screen is not cracked. After obtaining the device information and performing the visual inspection, the kiosk 100 can present a more accurate price for the mobile phone 210 to the user.

Turning next to FIG. 2B, the inspection tray 212 has been rotated rearward into a horizontal position so that the mobile phone 210 is facing upward in the inspection area 216. Although, in some embodiments, the access door 112 (FIG. 1) would normally be closed during this stage of kiosk operation, the access door 112 is not shown in FIG. 2B (or FIG. 2C) to better illustrate operation of the inspection tray 212 and the inspection area 216. As noted above, the kiosk 100 can perform an electrical inspection of the mobile phone 210 via the electrical connector to, e.g., identify the phone and further evaluate the condition of the phone, as well as to identify specific component and operating parameters such as memory, carrier, etc. For example, in some embodiments, the kiosk 100 (e.g., a kiosk central processing unit (CPU) or other processing device) can query the mobile phone 210 (by using, e.g., an operating system application programming interface (API)) to obtain characteristic information about the mobile phone 210, which can include device identification, make, model, and/or configuration. In other embodiments, the characteristic information can further include device functionality, including hardware/software configuration, charging capability, memory capacity, etc. Information necessary to identify and/or evaluate a mobile device such as the mobile phone 210 can include, for example, a unique identifier (e.g., an IMEI number or a Mobile Equipment Identifier (MEID) or equivalent number of a mobile phone, a hardware media access control address (MAC address) of a networkable device, or a model number and serial number of the electronic device), information describing the device manufacturer (e.g., a manufacturer name or ID code), model, characteristics and capabilities (e.g., CPU type and speed, storage capacity (SRAM, DRAM, disk, etc.)), wireless carrier, radio bands (frequency ranges and encodings such as CDMA, GSM, LTE, etc.), color and/or condition, and so on. In other embodiments, the electrical analysis can include evaluating the condition and/or functionality of the charging circuit of the electronic device. In some embodiments, the kiosk 100 can perform the electrical analysis using one or more of the methods and/or systems described in detail in the patents and patent applications identified herein and incorporated herein by reference in their entireties.

Although the embodiments described above include establishing an electrical connection between the mobile phone 210 and the kiosk 100 via an electrical connector, in other embodiments the kiosk 100 can establish a wireless connection with the mobile phone 210 to facilitate performing all or a portion of the phone evaluation and purchase steps described herein. For example, in some embodiments the kiosk 100 can include a wireless radio transceiver that is accessible by user devices (e.g., the mobile phone 210). The kiosk 100 can establish a wireless connection with the mobile phone 210 by providing connection messages or instructions and/or authentication information for the user to enter via the mobile phone 210 and/or via the display screen 104. For example, the kiosk 100 can direct the user to make the mobile phone's Bluetooth connection discoverable, and/or can provide a Bluetooth pairing code that the user can type on the screen of the mobile phone 210 or on the touch screen of the kiosk 100. As another example, the kiosk 100 can provide a Wi-Fi network name and/or password that when selected and/or entered on the user's phone 210 enables the user to wirelessly connect the device to the indicated Wi-Fi network. In other embodiments, establishing the connection can include providing a visual code or image (e.g., a QR code) for the user to scan using the mobile phone 210, such that scanning the code or image prompts the phone to connect to the kiosk's wireless network (e.g., upon user confirmation). In some embodiments, establishing the connection can include allowing a particular wireless device to join or use the wireless network or make a wireless connection. For example, when the kiosk 100 detects the mobile phone 210 and determines that the device is registered for access or otherwise recognized, the kiosk 100 automatically connects to the mobile phone 210 without requiring further user authentication. In other embodiments, the user can load a mobile app onto the mobile phone 210, and the app can evaluate the electronic device and facilitate wireless communication between the mobile phone 210 and the kiosk 100 to facilitate phone evaluation and purchase by the kiosk 100. Various systems and methods for establishing a wireless connection between the kiosk 100 and a mobile phone or other electronic device of a user are described in at least some of the patents and/or patent applications incorporated herein by reference in their entireties. In other embodiments, wireless connections between the kiosk 100 and mobile phones and other electronic devices can be established using other suitable means known in the art.

As noted above, in addition to performing an electrical inspection, the kiosk 100 can also perform a visual inspection of the mobile phone 210 using one or more cameras (not shown) positioned in the inspection area 216. In some embodiments, the visual inspection can include a 3D visual analysis (of, e.g., the shape and/or size of the phone) to confirm the identification of the mobile phone 210 (e.g., make and model) and/or to evaluate or assess the condition and/or function of the mobile phone 210 and/or its various components and systems. In some embodiments, the inspection tray 212 can be colored (e.g., the inspection tray can be made from colored plastic, such as plastic that is colored green) so that the technique of chroma key compositing, or chroma keying (sometimes referred to as green screening if used with a green screen), can be used to, e.g., remove the inspection tray 212 from images of the mobile phone 210 obtained by the one or more cameras positioned in the inspection area 216. Chroma keying the images can provide better definition of the phone's physical features and enable the kiosk processor to better determine the size (e.g., width, height, and curvature) of the mobile phone 210 based on the images. As described in greater detail below, in other embodiments, rather than being green (or some other opaque color) the inspection tray 212 can be configured as a light table to enable the images to provide a more accurate silhouette of the mobile phone 210 for visual analysis of, e.g., phone dimensions, shape, etc.

The visual analysis can also include an inspection of the mobile phone 210 for cracks or other damage to the display screen (LCD), as well as cracks off of the display screen. In some embodiments, the visual inspection can include performing OCR to identify printed or displayed patterns, codes, and/or text, and comparing characteristics of the patterns, codes, and/or text (e.g., layout, size, font, color, etc.) to templates to determine the presence of device identifiers such as model number, serial number, IMEI number, etc. As described in greater detail below, the visual inspection can be performed with one or more cameras and the kiosk 100 can perform the visual analysis using one or more of the methods and/or systems described in detail in the patents and patent applications identified herein and incorporated herein by reference in their entireties. Some mobile phones include a unique identifier (e.g., an IMEI number) that is printed or otherwise formed on the phone's Subscriber Identification Module (also known as a "SIM" card) holder or tray. In some embodiments, the kiosk 100 can instruct the user to extract the SIM card tray from their phone and position the SIM card tray on the inspection tray 212 so that the kiosk can perform OCR of the IMEI number on the SIM card tray. Further, in some embodiments the inspection tray 212 can include a designated area or a small tray configured to hold the SIM card tray so that the kiosk camera can obtain an image of the IMEI number for OCR. In some mobile phones (e.g., older iPhones® and Samsung® phones), the IMEI number may be printed or otherwise formed on the back side of the phone (the side opposite the display screen). In some embodiments, the kiosk may prompt the user to place such a phone on the inspection tray 212 with the back side facing outward so that the kiosk camera can obtain an image of the IMEI number printed on the back surface for OCR by the kiosk software.

As described in greater detail below, in one aspect of the illustrated embodiment, the inspection area 216 includes an apparatus configured to flip the mobile phone 210 when the inspection tray 212 is in the position shown in FIG. 2B so that the front side of the phone is facing downward toward the inspection tray 212. This enables the kiosk 100 to perform a visual inspection of the back side of the mobile phone using the same imaging systems (e.g., camera systems, lighting systems, etc.) that were used to inspect the front side of the mobile phone 210. This feature eliminates the need to place the mobile phone 210 on a transparent surface and provide cameras below the transparent surface to visually inspect the back side of the mobile phone 210. In addition to saving cost, this feature can also save space and reduce the size of the kiosk 100.

In some embodiments, the kiosk 100 can include a security feature that detects if a user reaches into the inspection area 216 at an inappropriate time. For example, the security feature can detect if the user reaches into the inspection area 216 when the inspection tray 212 is in the position shown in FIG. 2B to, e.g., remove the mobile phone 210 and/or switch it for another phone. In some embodiments, the security feature can include a break-beam sensor system having an emitter 220a (e.g., an infrared (IR) emitter, a laser beam emitter, etc.) mounted to a sidewall portion of the inspection area 216 just inside the access door opening, and a corresponding sensor 220b (e.g., an IR receiver, a laser receiver, etc.) mounted to an opposite sidewall portion on the other side of the opening to detect the beam emitted by the emitter 220a. If the user extends their hand/arm through the access door opening, it will break the beam emitted by the emitter 220a, and the break of the beam will be sensed by the sensor 220b. The sensor 220b can be configured to send a corresponding signal to the kiosk processor, and the kiosk 100 can respond by stopping the transaction, displaying a warning to the user via the display screen 104, etc. In other embodiments, an internal camera positioned in the inspection area can be used by the kiosk 100 to detect if the user reaches into the inspection area 216 when the inspection tray is in the position shown in FIG. 2B.

After the mobile phone 210 has been fully evaluated and the kiosk 100 has determined a purchase price, the purchase price can be offered to the user via the display screen 104. If the user accepts the purchase price offer, the access door 112 remains closed and the purchase transaction proceeds. For example, in some embodiments the user may be prompted to place his or her identification (e.g., a driver's license) in the ID scanner 108 and provide a thumbprint via the fingerprint reader 118 (FIG. 1). As a fraud prevention measure, the kiosk 100 can be configured to transmit an image of the driver's license to a remote computer screen, and an operator at the remote computer can visually compare the picture (and/or other information) on the driver's license to the person standing in front of the kiosk 100 as viewed by one or more of the cameras 106 (FIG. 1) to confirm that the person attempting to sell the mobile phone 210 is in fact the person identified by the driver's license. In some embodiments, one or more of the cameras 106 can be movable to facilitate viewing of kiosk users, as well as other individuals in the proximity of the kiosk 100.

In some embodiments, the inspection tray can include a mirror 213 (FIG. 2A) or other reflective surface incorporated into an upper surface thereof to facilitate obtaining an image of the user, as described in more detail below with reference to FIG. 7A. Additionally, the user's fingerprint can be checked against records of known fraud perpetrators. In some embodiments, rather than place their identification card (e.g., a driver's license) in the ID scanner 108, the user can instead position their identification card in front of the camera 106 on the exterior of the kiosk 100 (FIG. 1), and the camera 106 can capture images of the front side and/or back side of the ID card. The images of the ID card can be transmitted to a remote computer so that an operator at the remote computer can visually compare the images to the user standing in front of the kiosk 100 as viewed by the camera 106 and verify the identity of the user. The remote operator can be an artificial intelligence, such as a convolutional neural network. The images of the ID card can also be stored in a database and associated with the mobile phone the user sells. Additionally, the identification information can be read off the ID card image (via, e.g., OCR, etc.) and checked against a database of potentially fraudulent sellers as a means of fraud prevention. In such embodiments where the user's ID card or other form of identification is verified via the external camera 106 as described above, the ID scanner 108 (FIG. 1) may not be necessary and can potentially be omitted.

Once the user's identity has been verified, the inspection tray 212 rotates farther rearward as shown in FIG. 2C so that the mobile phone 210 can slide off of the inspection tray 212 and into a storage bin (not shown). (Although the access door 112 would normally be closed during this stage of operation, the access door 112 is omitted from FIG. 2C for purposes of illustrative clarity.) The kiosk 100 can then provide payment of the purchase price to the user or the kiosk 100 can retain the phone and facilitate remunerating the user as described herein. In some embodiments, payment can be made in the form of cash dispensed from the payment outlet 110. In other embodiments, the user can receive remuneration for the mobile phone 210 in various other useful ways. For example, the user can be paid via a redeemable cash voucher, a coupon, an e-certificate, a prepaid card, etc., that is dispensed from the kiosk 100; or via a gift code, a redeemable voucher, a coupon, an e-certificate, etc., that is sent to the user via email, text, or other form of electronic message. Additionally, in some embodiments the user can be paid via a wired or wireless monetary (e.g., cash) deposit to an electronic account (e.g., a bank account, a credit account, a loyalty account, an online commerce account, a mobile wallet, etc.) via, e.g., PayPal, Venmo, etc., or with Bitcoin, etc.

Alternatively, if the user declines the purchase price offer, or if the user's identity cannot be verified or the kiosk 100 otherwise determines that the transaction presents a fraud risk, the transaction can be declined and the mobile phone 210 returned to the user. More specifically, the inspection tray 212 rotates forward to the position illustrated in FIG. 2A and the access door 112 opens so that the user can retrieve the mobile phone 210 from the kiosk 100.

Figure 3A:
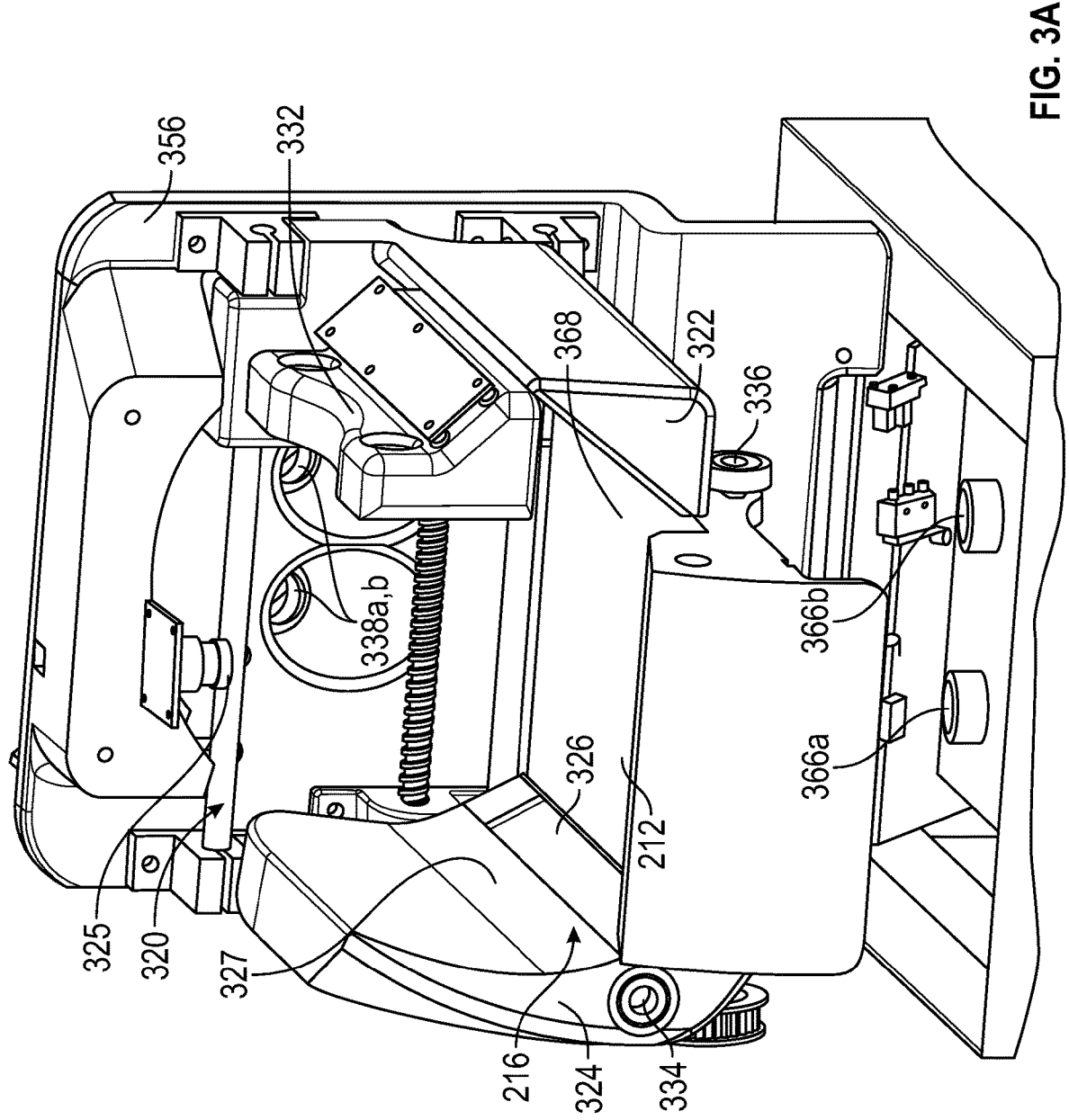
FIGS. 3A-3C are right front, left front, and left rear isometric views, respectively, of the inspection area of FIGS. 2A-2C with a housing and other exterior structures removed to better illustrate internal components associated with the inspection area.
Figure 3B:
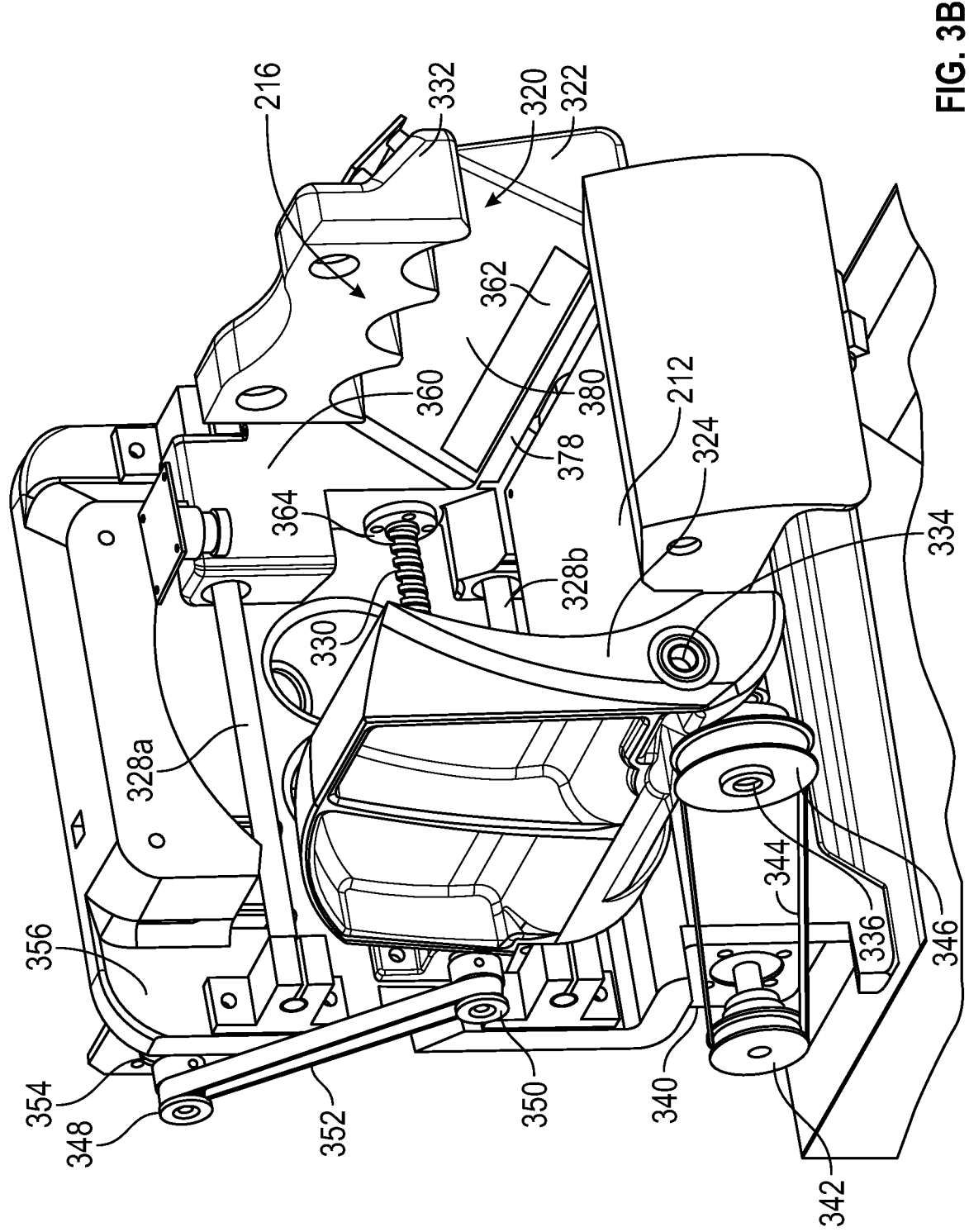
Figure 3C:
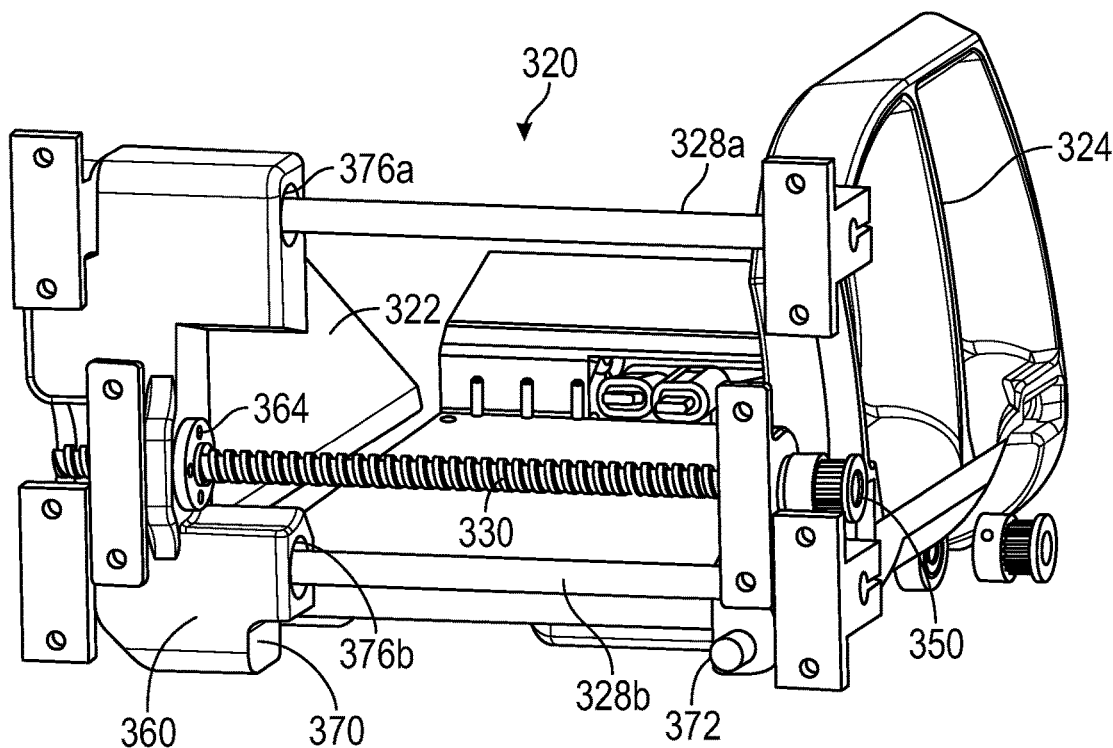
Figure 3D:
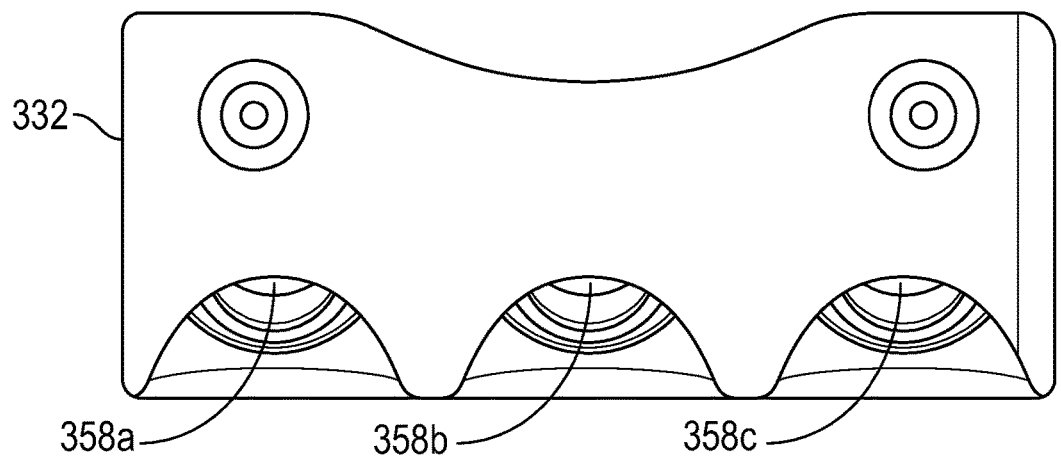
FIG. 3D is a front view of an inspection area light mount, configured in accordance with embodiments of the present technology.

FIGS. 3A-3C are right front, left front, and left rear isometric views, respectively, of the inspection area 216 with a number of external structures omitted to better illustrate certain operative components associated with the inspection area 216, and FIG. 3D is a front view of a light mount 332 that is used in the inspection area 216. Referring first to FIG. 3A, the inspection area 216 includes a camera 325 mounted above and directed downward toward the inspection tray 212. In some embodiments, the camera 325 can be configured to obtain still pictures and/or video images of mobile phones positioned on the inspection tray 212. In some embodiments, the camera 325 can include or be combined with one or more magnification tools, scanners, and/or other imaging components (e.g., other cameras) to view, photograph, and/or otherwise visually evaluate the mobile phone from multiple perspectives. Additionally, in some embodiments, the camera 325 can be movable to facilitate device visual inspection. In addition to the camera 325, the inspection area 216 can also include one or more lights directed toward the inspection tray 212 to facilitate the visual inspection of the mobile phone 210. For example, the inspection area can include a pair of lights 338a, 338b mounted in suitable bezels on a backplate 356. Similarly, as shown in FIG. 3D, the inspection area 216 can also include a plurality of lights 358a-c carried in suitable bezels on a light mount 332 that, as shown in FIG. 3A, is mounted generally above a pusher member 322 toward the right side of the inspection area 216.

As noted above, in some embodiments the inspection tray 212 can be configured as a light table. In such embodiments, the inspection tray 212 (or at least an inspection surface portion 368 of the inspection tray 212 upon which the mobile phone 210 is placed) can be made from a translucent (e.g., semitransparent) material, such as a translucent glass or plastic. By way of example only, in some embodiments the thickness of the translucent inspection surface portion 368 can be from about 0.08 inch to 0.25 inch, or about 0.12 inch. In such embodiments, the kiosk 100 can also include one or more lights 366a and 366b mounted to the kiosk chassis (or other adjacent kiosk structure) below the inspection area 216 and positioned to project light upward through the inspection tray 212 during visual inspection of, e.g., the mobile phone 210 (FIG. 2B). The lights 366a, 366b can include, for example, light emitting diodes (LEDs, such as white LEDs), fluorescent lights, incandescent lights, IR lights, etc. Configuring the inspection tray 212 as a light table during visual evaluation of mobile phones can enhance the contrast and silhouette of a device as depicted in images of the device captured by the camera 325. This can facilitate more accurate evaluation of the size, shape, external features, etc., of the phone by the kiosk processor. Additionally, it is contemplated that in some embodiments the kiosk 100 can also include one or more UV light sources that can be positioned to project UV light on mobile phones in the inspection area 216 to clean the phones.

In the illustrated embodiment, the inspection area 216 further includes a pusher member 322 operably positioned toward a right side of the inspection tray 212, and a ramp member 324 operably positioned toward a left side of the inspection tray 212. As described in greater detail below, in operation the pusher member 322 and the ramp member 324 cooperate to flip a mobile phone placed on the inspection tray 212 over from one side to the other side, such as from an upward-facing position to a downward-facing position. The ramp member 324 is pivotally mounted to a chassis (or other adjacent mounting structure; not shown) by means of a pivot shaft 334. In the illustrated embodiment, the ramp member 324 includes a generally smooth, curved (e.g., radiused) concave surface 327 facing toward the pusher member 322. In some embodiments, a lower portion of the ramp member 324 can include a mirror 326 that enables the camera 325 to capture an image of the adjacent side of the mobile phone (not shown) positioned on the inspection tray 212. In the illustrated embodiment, the inspection tray 212 is pivotally mounted (via, e.g., bearings) to the chassis (or other adjacent support structure; not shown) by means of a pivot shaft 336 that is fixedly attached to the inspection tray 212 and enables the inspection tray 212 to pivot between the positions shown in FIGS. 2A-2C.

Turning next to FIG. 3B, a first pulley 346 is fixedly attached to a left end portion of the pivot shaft 336. The first pulley 346 is operably connected to a second pulley 342 by means of a drive belt 344 (e.g., a toothed rubber drive belt). The second pulley 342 is in turn fixedly attached to a drive shaft of a motor 340 (e.g., a stepper motor), which is mounted to a lower portion of the backplate 356. Accordingly, operation of the motor 340 (by, e.g., a kiosk controller; not shown) rotates the first pulley 346 by means of the second pulley 342 and the drive belt 344. Rotation of the first pulley 346 rotates the pivot shaft 336, which in turn rotates the inspection tray 212. In this manner, operation of the motor 340 can be used to rotate the inspection tray 212 between the three positions illustrated in FIGS. 2A-2C.

In the illustrated embodiment, the pusher member 322 includes a short vertical surface 378 extending upward adjacent to the upper surface of the inspection tray 212, and an angled surface 380 that extends upward from the vertical surface 378. The pusher member 322 extends forward from a base 360. The base 360 is slidably mounted on upper and lower guide shafts 328a and 328b, respectively. More specifically, in the illustrated embodiment, the base 360 includes two cylindrical bores 376a and 376b (FIG. 3C), and the guide shafts 328a, 328b can be cylindrical shafts that are slidably received in the corresponding bores 376a, 376b, respectively. The base 360 is movably coupled to a drive screw 330 by means of a threaded coupling 364 (e.g., a drive nut). An opposite end portion of the drive screw 330 is fixedly attached to a first pulley 350. As shown in FIG. 3B, the first pulley 350 is operably coupled to a second pulley 348 by means of a drive belt 352 (e.g., a toothed rubber drive belt). The second pulley 348 is fixedly attached to a drive shaft of an electric motor 354 (e.g., a stepper motor) that is mounted to the aft surface of the backplate 356. In operation, the kiosk controller (not shown) can operate the motor 354 to rotate the second pulley 348 and, in turn, drive the first pulley 350 to rotate the drive screw 330. Rotation of the drive screw 330 in a first direction causes the pusher member 322 to move across the inspection tray 212 on the guide shafts 328a, 328b toward the ramp member 324. Conversely, rotation of the drive screw 330 in the opposite direction causes the pusher member 322 to move away from the ramp member 324 and return to its starting position on the opposite side of the inspection tray 212.

As shown in FIG. 3C, the base 360 of the pusher member 322 includes a contact surface 370. In operation, as the pusher member 322 approaches the ramp member 324, the contact surface 370 contacts a contact feature 372 (e.g., a cylindrical pin) that extends rearward from a lower portion of the ramp member 324. As the pusher member 322 continues moving toward the ramp member 324 (i.e., from left to right in FIG. 3C), the contact surface 370 drives the contact feature 372 to the right, thereby causing the ramp member 324 to rotate counterclockwise about the pivot shaft 334 (FIG. 3B) as viewed from FIG. 3C, which is equivalent to rotating in the clockwise direction about the pivot shaft 334 in FIG. 3B. When the pusher member 322 moves away from the ramp member 324, a return spring (not shown) and/or another biasing member operably coupled to the ramp member 324 causes the ramp member 324 to rotate back to its original position.

Figure 4A:
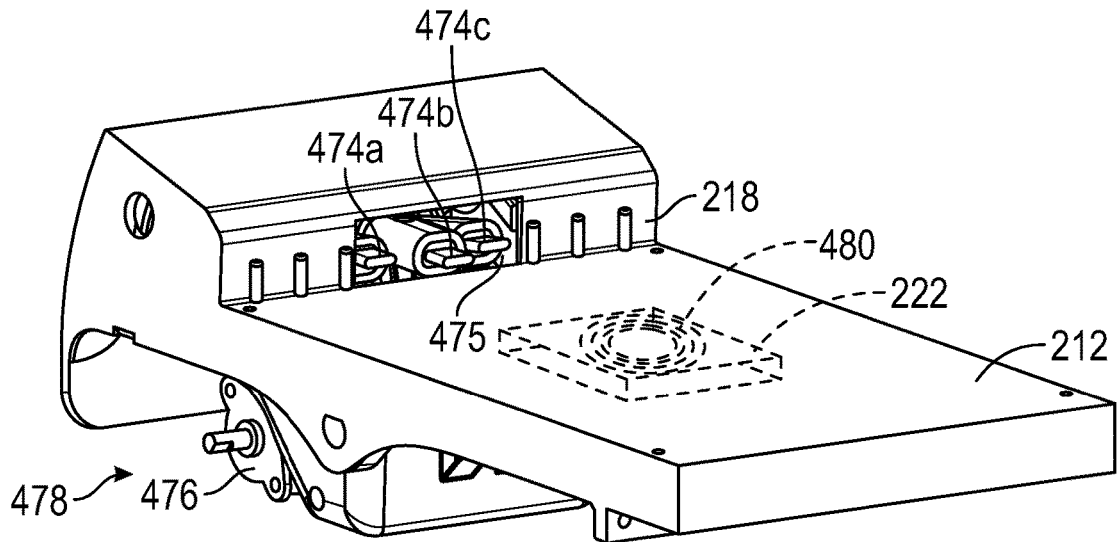
FIG. 4A is a right rear isometric view of a mobile device inspection tray assembly configured in accordance with embodiments of the present technology.

FIG. 4A is a right rear isometric view of the inspection tray 212 configured in accordance with embodiments of the present technology. In the illustrated embodiment, an electrical connector carrier assembly 478 is mounted to the underside of the inspection tray 212 and moves with the inspection tray 212 as it pivots between the three positions illustrated in FIGS. 2A-2C discussed above. The connector carrier assembly 478 includes an electric motor 476 (e.g., a stepper motor) operably coupled to a camshaft (not shown). The camshaft includes a plurality of lobes that are each operably positioned to move a corresponding one of a plurality of mobile device electrical connectors 474a-c (e.g., USB connectors, Android and iOS connectors, etc.) positioned in or near an opening 475 in the shelf 218 of the inspection tray 212. In operation, a kiosk controller (not shown) can activate the motor 476, which in turn rotates the camshaft so that one of the lobes selectively drives the desired electrical connector (e.g., 474b) outward through the opening 475, while the other electrical connectors (e.g., 474a and 474c) remain back in the opening 475. With the desired electrical connector 474 in this position, the user can easily connect their mobile phone to the correct connector when placing their mobile phone on the shelf 218 as illustrated above with reference to FIG. 2A. As shown in FIG. 4A, the camshaft configuration of the connector carrier assembly 478 enables the electrical connectors 474a-c to be compactly arranged in the inspection tray assembly 470. In some embodiments, the correct electrical connector is selected based on the make and model of phone that the user has identified via the display screen 104 (FIG. 1) that they wish to sell. Once the mobile phone has been electrically inspected via the selected connector, the motor 476 can rotate the camshaft to drive the selected connector back through the opening to disengage the connector from the mobile phone. This enables the mobile phone to be flipped over as described in detail below.

As noted above with reference to FIG. 2A, in some embodiments the kiosk 100 includes a wireless charger 222 (e.g., a "Qi wireless charger") mounted (via, e.g., a plurality of screws or other fasteners) to the back side of the inspection tray 212. The wireless charger 222 is positioned so that a charging pad 480 of the wireless charger 222 is relatively close to (e.g., less than 1.6 inches from) mobile phones placed on the front side (inspection surface) of the inspection tray 212 so that the phones can be effectively charged. In some embodiments, the wireless charger 222 can be a wireless charger provided by STMicroelectronics of Coppell, Tex., USA. In other embodiments, other wireless chargers can be used.

Figure 4B:
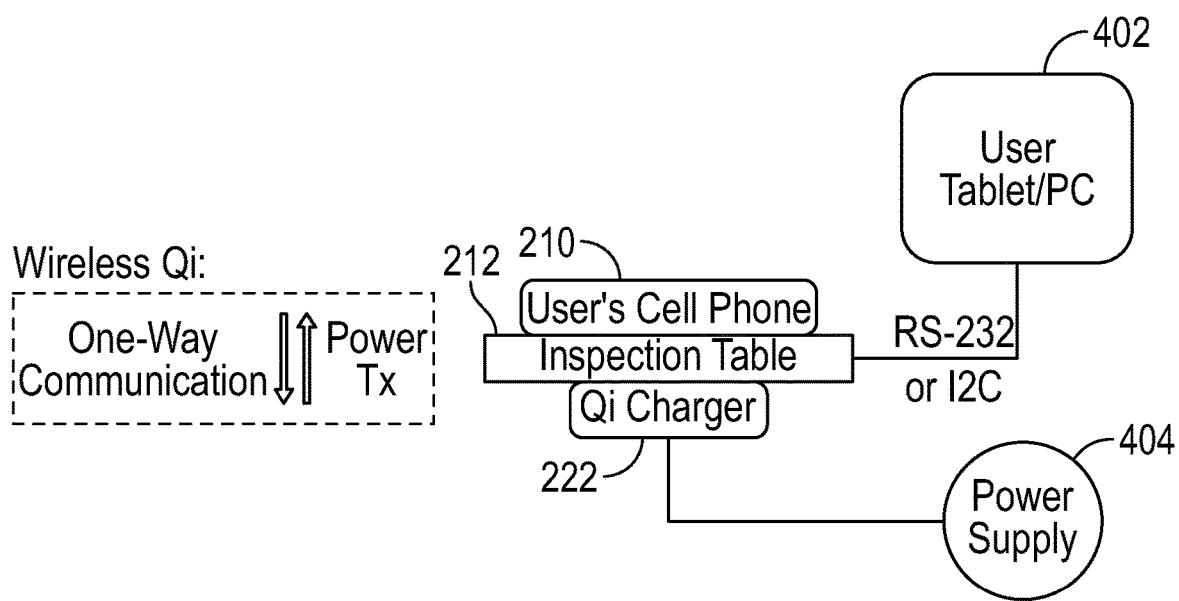
FIG. 4B is a schematic diagram illustrating a wireless charger mounted to the inspection tray assembly in accordance with embodiments of the present technology.

FIG. 4B is a schematic diagram illustrating a mounting arrangement of the wireless charger 222 configured in accordance with embodiments of the present technology. In the illustrated embodiment, the wireless charger 222 is electrically connected to a kiosk processor 402 (via, e.g., a serial port) and receives power from a kiosk power supply 404. The kiosk processor 402 is sometimes referred to as the "processor 402." In operation, when the wireless charger 222 is powered on, it wirelessly provides power to the mobile phone 210, and the phone responds by providing a one-way communication to the wireless charger 222. This communication can include specific information about the phone, including, for example, a Wireless Power ID packet that can provide the device manufacturer (e.g., Apple®, Samsung®, TI®, etc.), a unique identifier associated with the phone, such as a unique 32-bit identifier, etc. As described herein, the kiosk processor 402 can use this information to guide and facilitate the phone intake and/or purchasing transaction, as well as other useful purposes.

FIGS. 5A-5G are a series of front views of the inspection area 216 illustrating various stages of operation of a flipping apparatus 320 in accordance with embodiments of the present technology. In these Figures, the front portion of the inspection tray 212 has been omitted to better illustrate the operation of the flipping apparatus components. Starting in FIG. 5A, the mobile phone 210 is positioned on the inspection tray 212 with the front side (e.g., the display screen) facing upward as shown by the arrow F. By way of example, this position corresponds to the mobile phone 210 undergoing electrical and visual inspection as shown in FIG. 2B. For example, the mobile phone 210 can undergo an electrical inspection and evaluation using the appropriate electrical connector 474a-c (FIG. 4A), and the front side of the mobile phone 210 can be visually inspected and evaluated via the camera 325 as described above. Additionally, the sides of the mobile phone 210 (e.g., a first or left side 586a and a second or right side 586b) can be evaluated via the camera 325 by use of one or more mirrors. For example, the mirror 326 (FIG. 3A) positioned on the lower portion of the ramp member 324 can enable the camera 325 to obtain an image of the left side 586a of the mobile phone 210, and the mirror 326 (FIG. 3B) positioned toward a lower portion of the pusher member 322 can enable the camera 325 to obtain an image of the right side 586b of the mobile phone 210. Once the mobile phone 210 has been electrically evaluated, the electrical connector 474 is disengaged from the mobile phone 210 as described above with reference to FIG. 4A. Once the electrical connector 474 has been disengaged and the front surface 585a and/or the side surfaces 586a, b of the mobile phone 210 have been visually evaluated and/or imaged as needed, the mobile phone 210 can be flipped so that the back side of the mobile phone 210 can be visually inspected via the camera 325.

Referring next to FIG. 5B, before the flipping process begins, the camera 325 verifies that there is a mobile phone (or other electronic device) positioned on the inspection tray 212 and that the phone is not too large to flip. After this is confirmed, the flipping process begins by the pusher member 322 moving from right to left as shown by the arrow D1. As the pusher member 322 moves in this direction, the vertical surface 378 contacts at least a portion of the right side 586b of the mobile phone 210 and pushes the left side 586a against the lower portion of the curved surface 327 of the ramp member 324. This causes the left side 586a to slide upward against the curved surface 327, and the right side 586b to slide from right to left across the upper surface of the inspection tray 212. If at any point the mobile phone 210 becomes jammed (as indicated by, e.g., an over-current draw of the motor 354; FIG. 3B), the pusher member 322 reverses direction, returns to the starting position, and then the process repeats. If the mobile phone 210 cannot be flipped after a preset number of tries, the user can be informed via the display screen 104 (FIG. 1) and the phone can be returned to the user.

As shown in FIG. 5C, continued movement of the pusher member 322 from right to left as indicated by the arrow D2 causes the mobile phone 210 to move into an almost vertical orientation, leaning against the ramp member 324 with its right side 586b supported on the upper surface of the inspection tray 212. The reader will recall from the discussion of FIG. 3C above, that as the pusher member 322 moves into this position it interacts with the ramp member 324 and causes the ramp member 324 to rotate clockwise about the pivot shaft 334 through an arc R1 as shown in FIG. 5D. In some embodiments, the arc can be from 5 degrees to about 25 degrees, or about 10 degrees. Rotating the ramp member 324 in this manner moves the mobile phone 210 past the over-center position, causing it to fall onto the angled surface 380 of the pusher member 322, as shown in FIG. 5E. In this position, the mobile phone 210 is lying on the angled surface 380 with the front side of the phone (e.g., the display screen) facing the angled surface 380.

Turning next to FIG. 5F, the ramp member 324 returns through an arc R2 to its original position as the pusher member moves from left to right as indicated by the arrow D3. As the pusher member 322 moves to the right, the left side 586a of the mobile phone 210 slides downward along the angled surface 380 such that when the pusher member 322 arrives back in its original position, the mobile phone 210 is lying flat on the inspection tray 212 with the front side now pointing downward as indicated by the arrow F in FIG. 5G. In this position, the mobile phone 210 can be visually inspected by means of the camera 325 to determine whether, for example, there is any damage to the back surface of the mobile phone. Such damage could include, for example, cracks, gouges, damage to the phone camera, etc. Additionally, as discussed above in reference to FIG. 2B, on some mobile phones the IMEI number is printed or otherwise formed on the back surface of the mobile phone. In some embodiments, the kiosk 100 can visually inspect such phones (using, e.g., OCR) to read or otherwise obtain the IMEI number off the back surface of the mobile phone once the phone has been flipped. In some situations, the right side 586b of the mobile phone 210 may be positioned against, or otherwise too close to, the mirror 326 at the lower portion of the ramp member 324 and, as a result, the camera 325 may not be able to obtain a satisfactory side profile image of the mobile phone 210. For such situations, the kiosk can include one or more electromechanical vibrators 590 that, in response to a control signal from the kiosk processor 402, vibrate the inspection tray 212 and thereby cause the mobile phone 210 to move away from the mirror 326 so that the camera 325 can obtain a suitable side image. Additionally, in some embodiments, the inspection tray 212 may be positioned at a slight angle sloping downward away from the ramp member 324 to facilitate the foregoing movement of the mobile phone 210 in response to vibration of the inspection tray 212.

FIGS. 6A-6C are a series of front views illustrating various stages of operation of a flipping apparatus 320a configured in accordance with another embodiment of the present technology. Many of the components and features of the flipping apparatus 320a are at least generally similar in structure and function to the flipping apparatus 320 described in detail above. In one aspect of this embodiment, however, the flipping apparatus 320a is configured to flip the mobile phone 210 over without requiring any "tipping" movement of the ramp member 324. For example, in some embodiments a portion of the upper surface of the inspection tray 212 may be curved or slanted upward toward the base of the ramp member 324, as illustrated by a ramp feature 690. As shown in FIG. 6A, as the pusher member 322 moves from right to left, the first side 586a of the mobile phone 210 first slides up the ramp feature 690 and then up the curved surface 327 of the ramp member 324. As shown in FIG. 6B, as the pusher member 322 continues pushing the right side 586b of the mobile phone 210 to the left, the right side 586b moves up the ramp feature 690 and further into the recess formed by the concave curved surface 327. As a result, the mobile phone 210 is now in an over-center position, which causes the mobile phone 210 to fall to the right and onto the angled surface 380 of the pusher member 322, without any necessary "nudging" or pushing by the ramp member 324. As shown in FIG. 6C, as the pusher member 322 moves to the right toward its starting position, the opposing sides 586a, 586b of the mobile phone 210 slide down the angled surface 380 and the ramp feature 690, respectively, so that the mobile phone 210 is ultimately resting face down on the upper surface of the inspection tray 212. Accordingly, the embodiment described above with reference to FIGS. 6A-6C provides a method of flipping the mobile phone 210 without requiring the ramp member 324 to rotate or otherwise move.

While various embodiments of a flipping apparatus have been described herein, it is contemplated that other flipping apparatuses configured in accordance with the present technology can also be provided to flip mobile phones and other mobile devices. For example, with reference to FIGS. 6A-6C, it is contemplated that the ramp member 324 could be configured with a concave curved surface similar to the curved surface 327, but with an upper portion that extends farther to the right in FIG. 6A relative to the base of the ramp member 324. By configuring the upper portion of the curved surface 327 to extend more in this direction, it is contemplated that mobile phones and other mobile devices can be moved to an over-center position using a pusher member at least generally similar to the pusher member 322 described above without the need for the ramp member 324 to move or otherwise impart any tipping action to the mobile phone 210.

In some embodiments, the flipping apparatus 320 described in detail above can be used to flip more than mobile phones and other handheld electronic devices. For example, in some embodiments the flipping apparatus 320 can be used to flip a user's identification card (e.g., a driver's license or other ID card). In these embodiments, the user would place their ID card facing outward on the inspection tray 212 when the tray is in the position shown in FIG. 2A, and then the inspection tray 212 would rotate back to the position shown in FIG. 2B. In this position, the inspection area camera 325 (see, e.g., FIG. 5A) would capture an image of the face (front side) of the ID card, and then the flipping apparatus 320 would flip the ID card over in the manner described above with reference to FIGS. 5A-5G so that the camera 325 can capture an image of the back side of the ID card. The images of the ID card can then be stored in a database and associated with a mobile phone the user sells. Additionally, the identification information can be read off the ID card image (via, e.g., OCR, etc.) and checked against a database of potentially fraudulent sellers as a means of fraud prevention. The images can also be transferred to a remote computer for display to a remote operator who can compare the information on the ID card (e.g., the person's age, height, weight, etc.) to the images of the user obtained via the external camera 106 (FIG. 1) to verify the identity of the user. In such embodiments where the user's ID card or other form of identification is verified via the inspection area camera 325 as described above, the ID scanner 108 (FIG. 1) may not be necessary and could potentially be omitted.

In other embodiments, the user can place their ID card on the inspection tray 212 when the tray is in the position shown in FIG. 2A, and the camera 325 can capture an image of the face (front side) of the ID card with the tray in this position (i.e., not rotated back to the position shown in FIG. 2B). After the front side of the ID card has been imaged, the kiosk can instruct the user to turn the ID card over so that the back side of the card can be imaged if need be. The identification information can then be read off the ID card images (via, e.g., OCR, etc.) and checked against a database of potentially fraudulent sellers as a means of fraud prevention, and/or stored in a database and associated with a mobile phone the user sells as described above. The images can also be transferred to a remote computer for display to a remote operator (such as an artificial intelligence) who can compare the information on the ID card to the images of the user obtained via the external camera 106 (FIG. 1) to verify the identity of the user as also described above.

FIGS. 7A-7C are a series of cross-sectional side views of the kiosk 100 illustrating various stages of processing of a mobile device (e.g., the mobile phone 210) in accordance with embodiments of the present technology. As the reader will observe, the positions of the inspection tray 212 in FIGS. 7A-7C correspond to the positions of the inspection tray 212 in FIGS. 2A-2C, respectively, described above.

Turning first to FIG. 7A, this view illustrates the mobile phone 210 positioned on the inspection tray 212 with the bottom edge of the mobile phone 210 sitting against the shelf 118. In some embodiments, the wireless charger 222 can provide a quick charge to the mobile phone 210 if it is placed on the inspection tray 212 without power. Additionally (and even if the mobile phone 210 is fully or partially charged when it is placed on the inspection tray 212), the mobile phone 210 responds to receiving power from the wireless charger 222 by providing information about the phone to the wireless charger 222. In some embodiments as described above, this information can be transmitted to the kiosk processor 402 (FIG. 4B) and can include a Wireless Power ID packet that can be used to determine, e.g., a make of a device. The make of the device can be used to determine the appropriate questions/prompts, etc., to display to the user via the kiosk display screen 104 for the phone inspection/purchase process. For example, if the mobile phone 210 is an Apple® product, the display screen 104 can provide messages or instructions for the user to log out of their iCloud account so that the phone can be purchased by the kiosk 100. Additionally, in some embodiments the unique phone identification information received from the mobile phone 210 via the wireless charger 222 can be used to track downstream processing of the mobile phone, thereby alleviating the need to have the user apply an identifying label or sticker (e.g., a barcode sticker) to the phone for tracking purposes.

In some embodiments, the make of the mobile phone 210 will be only a part of the information needed to provide an accurate price quote for the mobile phone 210. Thus, if the make is the only information available to the kiosk 100, the kiosk 100 can determine (via, e.g., accessing an associated price database) a price at the low end of the price range for the particular make of phone and offer to purchase the mobile phone 210 for the low price. In addition, the kiosk 100 can also offer to perform a more thorough evaluation of the mobile phone 210 and possibly arrive at a higher price for the mobile phone 210 if the user is willing to wait. If the user opts to sell the mobile phone 210 for the low price (by, e.g., selecting appropriate responses to prompts on the kiosk display screen 104), the kiosk 100 can retain the mobile phone 210 and remunerate the user as described below or the kiosk 100 can retain the phone and facilitate remunerating the user as described herein. If the user decides to wait and authorizes the kiosk 100 to perform a more thorough evaluation, the kiosk 100 can obtain additional device information, such as the model, the carrier, memory capacity, IMEI number, etc., by guiding the user to provide the additional information. For example, with the mobile phone 210 in the position shown in FIG. 7A, the kiosk 100 can instruct the user (via the kiosk display screen 104) how to navigate menus and/or other options/commands on the display screen of the mobile phone 210 to display information about the mobile phone 210. The kiosk 100 can adjust messages or instructions presented to the user based on the make of the mobile phone 210 obtained from the wireless charger 222. By way of example, the user can interact with the mobile phone touch screen display to bring up an "about" page using the phone's "settings" menu. The about page can display various types of information about the phone, which the kiosk 100 can capture via the camera 325 and process using, e.g., associated OCR software. Such information can include, for example, the model, serial number, operating system/operating system version, IMEI number, IP address, MAC addresses, carrier, memory configuration, user information, Cloud lock status, etc. This information can be used by the kiosk 100 to determine (via, e.g., access to an associated pricing database) a more accurate price or a range of prices (e.g., a high price and a low price) for the mobile phone 210 and present the price or range of prices to the user.

If the kiosk 100 cannot obtain the necessary information by guiding the user because, for example, the user cannot follow the messages or instructions, or if the user does not want to spend the time to follow the messages or instructions, the kiosk 100 can present an electrical connector (e.g., one of the electrical connectors 474a-c described above with reference to FIG. 4A) to connect to the mobile phone 210 as described above. The kiosk processor 402 can determine the appropriate electrical connector (e.g., a USB-C or Lightning connector) to present to the user on the inspection tray shelf 218 based on, e.g., the make of the mobile phone 210. After the user connects the electrical connector to the mobile phone 210, the kiosk 100 can obtain the needed information via an electrical inspection as described above. The kiosk 100 can then determine a more accurate price or a range of prices for the mobile phone 210 based on the information and present the price or range of prices to the user. If the user is not interested in the offered price or range of prices and no longer wishes to proceed with the transaction, the user can simply retrieve their phone from the kiosk 100. If the user decides to proceed with the transaction, the user may be asked to adhere a label with a unique code (e.g., a barcode) dispensed from the outlet 116 (FIG. 1) to the back of the mobile phone 210 for tracking purposes, and then place the phone back on the inspection tray 212.

At this point, in some embodiments, the user may elect to sell the mobile phone 210 for the price at the low end of the more accurate price range, or the user may elect to have the phone further inspected for, e.g., damage to the phone display screen, to potentially obtain the higher price for the phone if the screen is not damaged. If the user elects to sell the mobile phone 210 for the lower price, the kiosk 100 can retain the mobile phone 210 and provide the lower price compensation to the user as described below. Alternatively, if the user authorizes the kiosk 100 to further inspect the mobile phone 210 for, e.g., damage to the phone's display screen, and potentially offer a higher price, the access door 112 closes and the inspection tray 212 rotates to the horizontal, grading position shown in FIG. 7B. In this position, the mobile phone 210 can be visually inspected to determine whether the device is cracked, as described above. For example, as described above, in some embodiments, this includes a visual inspection of the front side of the mobile phone 210 followed by a visual inspection of the back side after the phone has been flipped using the flipping apparatus 320 described in detail above. As discussed above, the lights 366a, 366b can facilitate the visual inspection in those embodiments in which the inspection tray 212 is configured as a light table. If the display or other portion of the mobile phone 210 is cracked, the price for the phone will be lower than if the device is not cracked.

In some embodiments, the kiosk 100 can inspect the condition of the mobile phone 210 when the inspection tray 212 is in the upright position shown in FIG. 7A. For example, either before or after the OCR system (such as the OCR system 807 in FIG. 8) obtains information about the mobile phone 210 as described above, the camera 325 can image the mobile phone 210 and the kiosk processor 402 can process the images as described above to detect cracks or other damage on the front side of the device (e.g., in the display screen) or on the back side of the mobile phone 210 after the user flips the phone over. Additionally, in some embodiments the camera 325 can also facilitate identification of the mobile phone 210 at this time by obtaining images of the device that the processor 402 can process to determine dimensions, e.g., the width, height, curvature of edges/corners, etc., and/or markings (e.g., markings identifying manufacturer, model, etc.) of the mobile phone 210. The determined dimensions, markings, etc., can then be compared to dimensions, markings, etc., of known phones stored in a local or remote database accessed by the processor 402 to identify the mobile phone 210. In some embodiments, the kiosk lighting system in the inspection area 216 can be controlled (e.g., by turning one or more lights on or off, moving the lights, etc.) to facilitate the foregoing visual analysis of the mobile phone 210. Performing a visual analysis of the mobile phone 210 in the foregoing manner when the inspection tray 212 is in the position shown in FIG. 7A can enable the kiosk 100 to determine and offer the user a final price for the phone instead of, e.g., a price range, even before the inspection tray 212 rotates to the horizontal, grading position shown in FIG. 7B. Accordingly, it will be appreciated that the kiosk 100 can perform a number of different operations for evaluation, inspection, identification, etc., of mobile devices positioned on the inspection tray 212 when the inspection tray 212 is in the position shown in FIG. 7A.

As noted above in reference to FIG. 2A, in some embodiments, the inspection tray 212 can include one or more mirrors 213 on or in an upper surface thereof that are positioned, for example, adjacent to where the mobile phone 210 is placed (FIG. 2A) so that the mobile phone 210 does not cover or otherwise block the mirror 213. In addition or alternatively, in other embodiments the entire upper surface of the inspection tray can be a mirror. In such embodiments, the user can be instructed via, e.g., suitable prompts on the kiosk display screen 104, to stand in front of the kiosk 100 such that the user's face is reflected in the mirror 213. The kiosk camera 325 can then capture the image of the user's face reflected in the mirror 213, and this image can be used to confirm the user's identity for security and/or legal reasons as described above. In other embodiments, the one or more mirrors can be positioned in other locations proximate to the inspection area 216 and positioned to obtain a reflection of the user's face in the field of view of the camera 325 as described above. Use of the one or more mirrors 213 and the camera 325 to obtain an image of the user may eliminate the need for, and cost of, the external camera 106.

After obtaining the device information and performing the visual inspection, the kiosk 100 can determine a price for the mobile phone 210. For example, to determine a price the kiosk 100 may use information about the make and model of the phone or one or more unique identifiers of the phone to look up a current price for the device in a database or pricing model. The database or pricing model can be, for example, a local lookup table of common devices and/or a remotely hosted database or web service to which the kiosk 100 can transmit information about the electronic device and receive a current market value or offer price for the electronic device. After a purchase price has been determined, the user may be presented with the offer price via the display screen 104.

If the user accepts the offer price, the kiosk 100 can verify the user's identity and/or perform other fraud prevention measures as described above with reference to FIG. 2B. Once these steps have been satisfactorily completed, the inspection tray 212 rotates further aft as shown in FIG. 7C, causing the mobile phone 210 to slide off of the aft portion of the inspection tray 212 and into a chute 792 leading to a storage bin 794. It will be noted that the forward portion of the inspection tray 212 includes a skirt 796 that blocks users from reaching under the inspection tray 212 and into the storage bin 794 when the access door 112 is open and the inspection tray 212 is in the position shown in FIG. 7B. Once the phone has been received in the storage bin 794, the kiosk 100 can provide payment of the purchase price to the user or the kiosk 100 can retain the phone and facilitate remunerating the user as described herein. In some embodiments, payment can be made in the form of cash dispensed from the payment outlet 110. In other embodiments, the user can receive remuneration for their mobile phone 210 in various other ways. For example, the user can be paid via a redeemable cash voucher, a coupon (e.g., a coupon for purchasing another mobile phone), an e-certificate, a gift code, a prepaid card, etc., that is dispensed from the kiosk 100; or the kiosk 100 can implement payment via a gift code, a redeemable voucher, a coupon, an e-certificate, etc., that is sent to the user via email, text, or other form of electronic message. Additionally, in some embodiments the kiosk 100 can implement payment to the user via a wired or wireless monetary deposit via the kiosk 100 to an electronic account (e.g., a bank account, a credit account, a loyalty account, an online commerce account, a mobile wallet, etc.) via, e.g., PayPal, Venmo, etc., or with Bitcoin, etc.

In other embodiments, the price offered to the user for the mobile phone 210 can be a price quote or a range of price quotes. For example, in some embodiments the kiosk 100 can provide the user with a range of price quotes for the mobile phone 210, with the final price paid for the phone depending on the outcome of a subsequent evaluation of the mobile phone 210 by a human operator at a remote facility. The highest price quote may be based on the human inspection confirming that the mobile phone 210 is in the same condition that was determined by the kiosk 100, whereas a lower price quote may be based on the human inspection determining that the mobile phone 210 is in worse condition (e.g., more damaged) than was initially determined by the kiosk 100. In such embodiments, if the user wishes to proceed with the sales transaction based on the quoted price (or prices), the kiosk 100 receives the mobile phone 210 but the user is not paid for the phone immediately by the kiosk 100. Instead, after the kiosk operator has retrieved the mobile phone 210 from the kiosk 100 and the phone has undergone a human inspection to confirm condition, then the kiosk 100 can retain the phone and facilitate remunerating the user as described herein or the user can be paid the final price based on condition (e.g., the high quote or the low quote) by, e.g., a mailed check, or by any number of different methods of electronic payment including, e.g., sending of an e-certificate, gift code, coupon, redeemable voucher, etc., via email, text, or other form of electronic message, or via a wired or wireless monetary deposit to an electronic account (e.g., a bank account, a credit account, a loyalty account, an online commerce account, a mobile wallet, etc.).

Although only one storage bin (i.e., the storage bin 794) is shown in FIGS. 7A-7C, in some embodiments the kiosk 100 can include two or more storage bins for storing mobile phones of different types and/or for storing phones that may require different types of post-receipt processing. For example, in some embodiments the storage bin 794 can be a first storage bin used to store mobile phones that will be collected from the kiosk and undergo a normal processing procedure for resale, and the kiosk 100 can include a second storage bin (not shown) that receives mobile phones that may require some type of special processing or evaluation. Placing phones of this second type in a second storage bin enables a human operator to quickly access such phones if needed for evaluation, reporting, etc. By way of example, to implement a second storage bin the chute 792 can include two outlet paths and a deflector (not shown) or similar device to direct mobile phones into the appropriate storage bin.

As those of ordinary skill in the art will appreciate, the foregoing processes are but some examples of ways in which the kiosk 100 can be used to purchase, recycle, or otherwise process consumer electronic devices such as mobile phones. Additionally, it should be understood that the configuration of the kiosk 100 described above is but one example of a suitable mobile device evaluation, purchasing, and/or recycling system that can be used with embodiments of the present technology. Accordingly, other embodiments of the present technology can use other systems without departing from the present disclosure. Although the foregoing examples are described in the context of mobile phones, it should be understood that the kiosk 100 and various embodiments thereof can also be used in a similar manner for recycling virtually any consumer electronic device, such as MP3 players, tablet computers, laptop computers, e-readers, PDAs, Google® Glass™ smartwatches, and other portable or wearable devices, as well as other relatively non-portable electronic devices such as desktop computers, printers, televisions, DVRs, devices for playing games, entertainment, or other digital media on CDs, DVDs, Blu-ray, etc. Moreover, although the foregoing examples are described in the context of use by a consumer, the kiosk 100 in various embodiments thereof can similarly be used by others, such as store clerks, to assist consumers in recycling, selling, exchanging, etc., their electronic devices.

Figure 8:
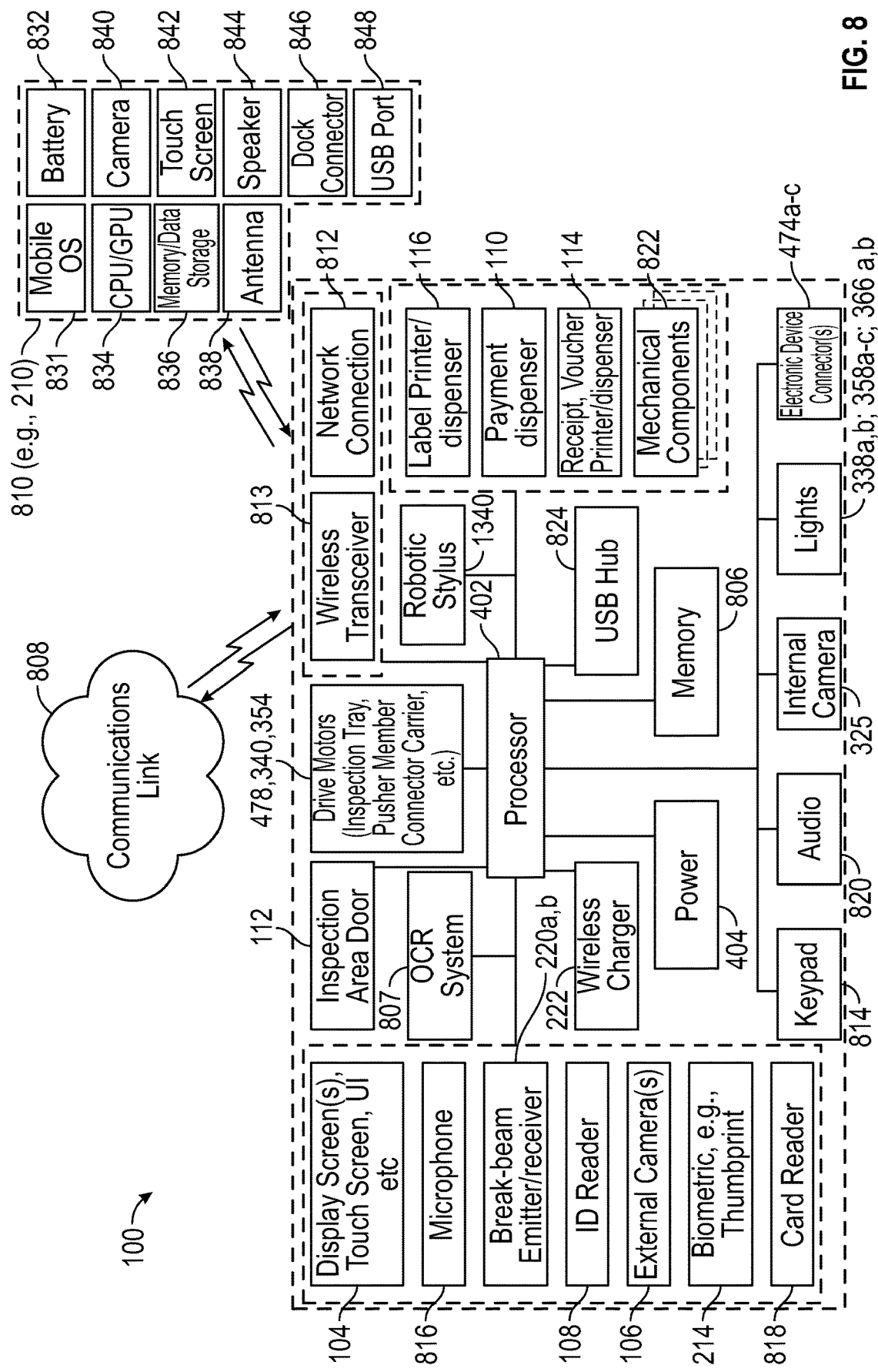
FIG. 8 is a schematic diagram illustrating various components associated with the kiosk of FIG. 1 configured in accordance with embodiments of the present technology.

FIG. 8 provides a schematic representation of an architecture of the kiosk 100 in accordance with embodiments of the present technology. In the illustrated embodiment, the kiosk 100 includes a suitable processor or central processing unit (CPU) 402 that controls operation of the kiosk 100 as described above in accordance with computer-readable instructions stored on system memory 806. The processor 402 may be any logic processing unit, such as one or more CPUs, digital signal processors (DSPs), application-specific integrated circuits (ASICs), etc. The processor 402 may be a single processing unit or multiple processing units in an electronic device or distributed across multiple devices. The processor 402 is connected to the memory 806 and may be coupled to other hardware devices and high-speed peripherals internally, for example, with the use of a bus (e.g., a USB 3.0 hub 824, a PCI Express or Serial ATA bus, etc.). The processor 402 can include, by way of example, a standard personal computer (PC) (e.g., a Dell® Optiplex® 7010PC); or other type of embedded computers running any suitable operating system, such as Windows® (e.g., Windows 8 Pro operating system), Linux®, Android™, iOS®, or an embedded real-time operating system. In some embodiments, the processor 402 can be a small form factor PC with integrated hard disk drive (HDD) or solid-state drive (SSD) and universal serial bus (USB) or other ports to communicate with other components of the kiosk 100. In other embodiments, the processor 402 can include a microprocessor with a standalone motherboard that interfaces with a separate HDD. The memory 806 can include read-only memory (ROM) and random access memory (RAM) or other storage devices, such as disk drives or SSDs, that store the executable applications, test software, databases, and/or other software required to, for example, control kiosk components, process electronic device information and data (to, e.g., evaluate device make, model, condition, pricing, etc.), and communicate and exchange data and information with remote computers and other devices, etc. Program modules can be stored in the system memory 806, such as an operating system, one or more application programs, other programs or modules and program data. The memory 806 may also include a web browser for permitting the kiosk 100 to access and exchange data with websites over the Internet.

The processor 402 can provide information and messages or instructions to kiosk users via the display screen 104 and/or an audio system (e.g., a speaker) 820. The processor 402 can also receive user inputs via, e.g., a touch screen associated with the display screen 104 and/or, in some embodiments, a keypad 814 with physical keys, and/or a microphone 816. Additionally, the processor 402 can receive personal identification and/or biometric information associated with users via the ID scanner 108 (e.g., a driver's license reader/scanner), one or more of the external cameras 106, and/or a fingerprint reader 214. In some embodiments, the processor 402 can also receive information (such as user identification and/or account information) via a card reader 818 (e.g., a debit, credit, or loyalty card reader having, e.g., a suitable magnetic stripe reader, optical reader, etc.). The processor 402 can also control operation of the outlet 116 of the label printer and systems for providing remuneration to users, such as the payment (e.g., cash) dispenser outlet 110 and/or a receipt or voucher dispenser and an associated outlet 114.

The processor 402 can also control operation of the electronic, optical, and electromechanical systems the kiosk 100 includes for electrically, visually, and/or physically analyzing electronic devices placed in the kiosk 100 for purchase or recycling. Such systems can include: one or more internal cameras (e.g., the camera 325) for visually inspecting electronic devices for, e.g., determining external dimensions and/or determining condition, such as whether and to what extent the LCD display of the mobile phone may be cracked; and the electrical connectors 474*a-c* (e.g., USB connectors) for, e.g., powering up mobile phones and other electronic devices and performing electronic inspections. The processor 402 can also be operably connected to the connector carrier assembly 478 to control dispensing of the electrical connectors 474*a-c*, and to the motors 340 and 354 to control movement of the inspection tray 212 and the pusher member 322, respectively, as described in detail above. The kiosk 100 further includes a plurality of mechanical components 822 that are electronically actuated for carrying out the various functions of the kiosk 100 during operation. The mechanical components 822 can include, for example, the inspection area access door 112 (FIG. 1A). The kiosk 100 further includes power supply 404, which can include battery power and/or facility power for operation of the various electrical components associated with kiosk operation.

In the illustrated embodiment, the kiosk 100 further includes a network connection 812 (e.g., a wired connection, such as an Ethernet port, cable modem, FireWire cable, Lightning connector, USB port, etc.) suitable for communication with, e.g., all manner of processing devices (including remote processing devices) via a communication link 808, and a wireless transceiver 813 (e.g., including a Wi-Fi access point; Bluetooth transceiver; near-field communication (NFC) device; wireless modem or cellular radio utilizing GSM, CDMA, 3G, 4G, and/or 5G technologies; etc.) suitable for communication with, e.g., all manner of processing devices (including remote processing devices) via the communication link 808 and/or directly via, e.g., a wireless peer-to-peer connection. For example, the wireless transceiver 813 can facilitate wireless communication with electronic devices, such as an electronic device 810 (e.g., the mobile phone 210) for, e.g., wireless evaluation of the electronic device via, e.g., a mobile application loaded on the device. Such communication with the electronic device 810 can occur when the device is in the proximity of the kiosk 100 (e.g., in or near the inspection area 216) or when the device is remote from the kiosk. In other embodiments, the kiosk 100 can include other components and features that may be different from those described above, and/or one or more of the components and features described above may be omitted.

In the illustrated embodiment, the electronic device 810 is depicted as a handheld device, e.g., the mobile phone 210. In other embodiments, however, the electronic device 810 can be other types of electronic devices including, for example, other handheld devices; PDAs; MP3 players; tablet, notebook, and laptop computers; e-readers; cameras; desktop computers; TVs; DVRs; game consoles; Google® Glass™; smartwatches; etc. By way of example only, in the illustrated embodiment the electronic device 810 can include one or more features, applications, and/or other elements commonly found in smartphones and other known mobile devices. For example, the electronic device 810 can include a CPU and/or a graphics processing unit (GPU) 834 for executing computer-readable instructions stored on memory 806. In addition, the electronic device 810 can include an internal power source or battery 832, a dock connector 846, a USB port 848, a camera 840, and/or well-known input devices, including, for example, a touch screen 842, a keypad, etc. In many embodiments, the electronic device 810 can also include a speaker 844 for two-way communication and audio playback. In addition to the foregoing features, the electronic device 810 can include an operating system (OS) 831 and/or a device wireless transceiver that may include one or more antennas 838 for wirelessly communicating with, for example, other electronic devices, websites, and the kiosk 100. Such communication can be performed via, e.g., the communication link 808 (which can include the Internet, a public or private intranet, a local or extended Wi-Fi network, cell towers, the plain old telephone system (POTS), etc.), direct wireless communication, etc.

Figure 9:
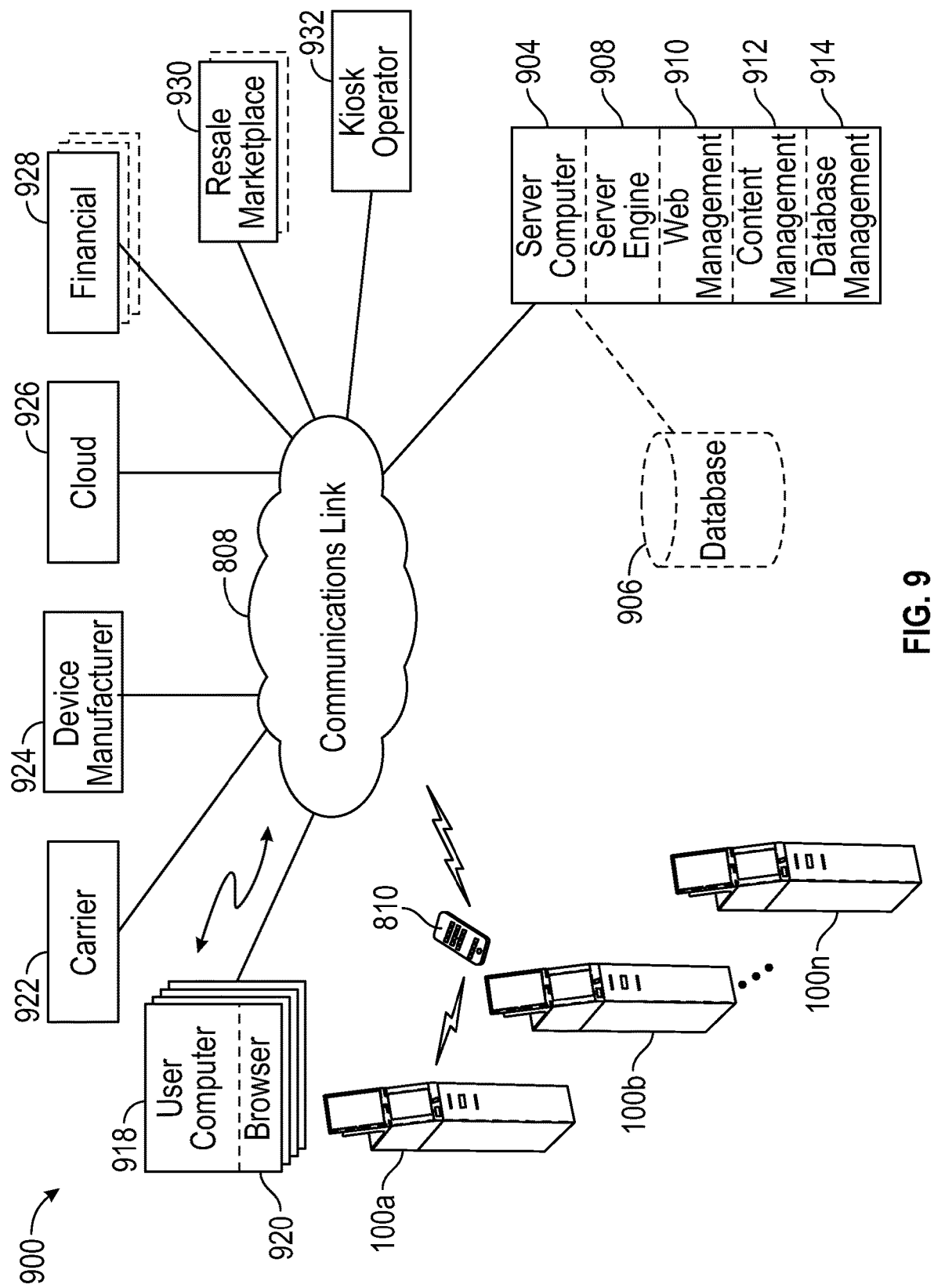
FIG. 9 is a schematic diagram of a suitable network environment for implementing various aspects of an electronic device recycling system configured in accordance with embodiments of the present technology.

FIG. 9 is a schematic diagram of a suitable network environment for implementing various aspects of an electronic device recycling system 900 configured in accordance with embodiments of the present technology. In the illustrated embodiment, a plurality of the kiosks 100 (identified individually as kiosks 100*a*-100*n*) can exchange information with one or more remote computers (e.g., one or more server computers 904) via the communication link 808. Although the communication link 808 can include a publicly available network (e.g., the Internet with a web interface), a private communication link, such as an intranet or other network, can also be used. Moreover, in various embodiments the individual kiosks 100 can be connected to a host computer (not shown) that facilitates the exchange of information between the kiosks 100 and remote computers, other kiosks, mobile devices, etc.

The server computer 904 can perform many or all of the functions for receiving, routing, and storing of electronic messages, such as web pages, audio signals, and electronic images necessary to implement the various electronic transactions described herein. For example, the server computer 904 can retrieve and exchange web pages and other content with an associated database or databases 906. In some embodiments, the database 906 can include information related to mobile phones and/or other consumer electronic devices. Such information can include, for example, make, model, serial number, IMEI number, carrier plan information, pricing information, owner information, etc. In various embodiments the server computer 904 can also include a server engine 908, a web page management component 910, a content management component 912, and a database management component 914. The server engine 908 can perform the basic processing and operating system level tasks associated with the various technologies described herein. The web page management component 910 can handle creation and/or display and/or routing of web or other display pages. The content management component 912 can handle many of the functions associated with the routines described herein. The database management component 914 can perform various storage, retrieval, and query tasks associated with the database 906, and can store various information and data such as animation, graphics, visual and audio signals, etc.

In the illustrated embodiment, the kiosks 100 can also be operably connected to a plurality of other remote devices and systems via the communication link 808. For example, the kiosks 100 can be operably connected to a plurality of user devices 918 (e.g., personal computers, laptops, handheld devices, etc.) having associated browsers 920. Similarly, as described above the kiosks 100 can each include wireless communication facilities for exchanging digital information with wireless-enabled electronic devices, such as the electronic device 810 (e.g., the mobile phone 210). The kiosks 100 and/or the server computer 904 are also operably connectable to a series of remote computers for obtaining data and/or exchanging information with necessary service providers, financial institutions, device manufacturers, authorities, government agencies, etc. For example, the kiosks 100 and the server computer 904 can be operably connected to one or more cell carriers 922, one or more device manufacturers 924 (e.g., mobile phone manufacturers), one or more electronic payment or financial institutions 928, one or more databases (e.g., the GSMA IMEI Database, etc.), and one or more computers and/or other remotely located or shared resources associated with cloud computing 926. The financial institutions 928 can include all manner of entity associated with conducting financial transactions, including banks, credit/debit card facilities, online commerce facilities, online payment systems, virtual cash systems, money transfer systems, etc.

In addition to the foregoing, the kiosks 100 and the server computer 904 can also be operably connected to a resale marketplace 930 and a kiosk operator 932. The resale marketplace 930 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 932 can be a central computer or system of computers for controlling all manner of operation of the network of kiosks 100. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 932 can further include one or more display screens operably connected to receive images from one or cameras located at each of the kiosks 100 (e.g., one or more of the cameras 106 and 325). This remote viewing capability enables operator personnel to verify user identification and/ or make other visual observations at the kiosks 100 in real time during transactions. This can include remote evaluation of images of an electronic device by a remote operator to grade the physical condition of the device.

The foregoing description of the electronic device recycling system 900 illustrates but one possible network system suitable for implementing the various technologies described herein. Accordingly, those of ordinary skill in the art will appreciate that other systems consistent with the present technology can omit one or more of the facilities described in reference to FIG. 9 or can include one or more additional facilities not described in detail in FIG. 9.

Although specific circuitry is described above, those of ordinary skill in the art will recognize that a microprocessor-based system could also be used where any logical decisions are configured in software. The foregoing discussions of FIGS. 8 and 9 provide a brief, general description of a suitable computing environment in which the present technology can be implemented. Although not required, aspects of the present technology are described in the general context of computer-executable instructions, such as routines executed by a general-purpose data processing device, e.g., a server computer, wireless device, or personal computer. Those skilled in the relevant art will appreciate that aspects of the present technology can be practiced with other communications, data processing, or computer system configurations, including: Internet appliances, handheld devices (including personal digital assistants (PDAs)), wearable computers, all manner of cellular or mobile phones (including Voice over Internet Protocol (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Figure 10:
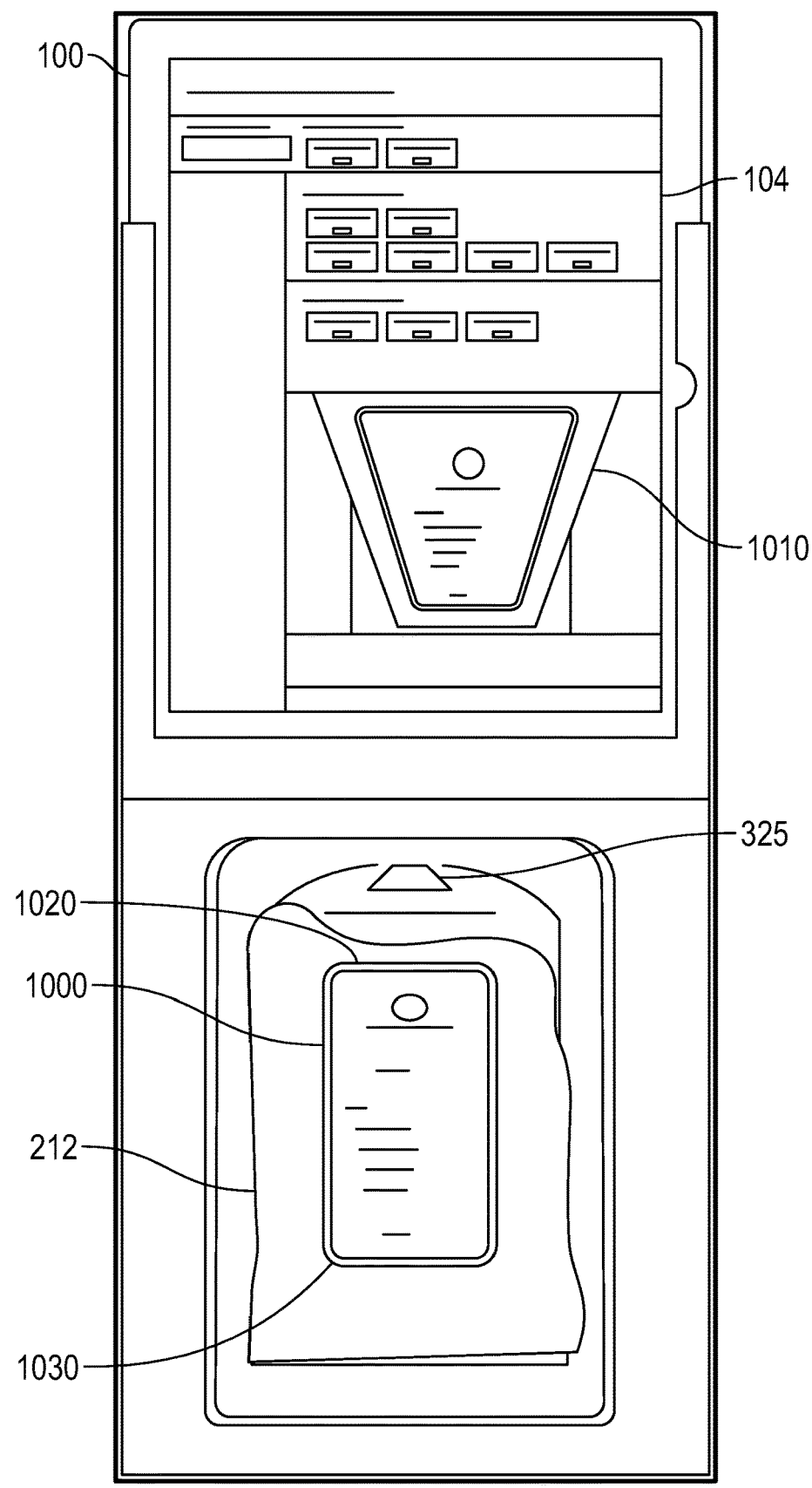
FIG. 10 is a front view illustrating a mobile electronic device positioned in the kiosk of FIG. 1 with an image of the mobile electronic device presented on the kiosk display, in accordance with embodiments of the present technology.

FIG. 10 is a front view of the kiosk 100 after a user has positioned an electronic device 1000 (e.g., a mobile phone) on the inspection tray 212 ("tray 212") of the kiosk 100. As noted above with reference to FIG. 1, the kiosk 100 can include the kiosk display screen 104, which shows a perspective view 1010 of the device 1000 on the tray 212, from the point of view of the camera 325 (FIGS. 3A, 7A) included in the kiosk inspection area 216. The perspective view 1010 can be part of an image or a video recording of the device 1000. As can be seen in FIG. 10, the perspective view 1010 of the device 1000 (which can also be referred to as the "keystone effect") presents the device 1000 as a trapezoidal shape with a first side 1020 of the device 1000 closest to the camera 325 appearing longer than a second side 1030 of the device 1000 farther away from the camera 325.

When the user places the device 1000 on the tray 212, the tray is in a slanted position, as shown in FIG. 7A. As seen in FIG. 7A, the camera 325 views the device 1000 at an angle, and as a result the device appears distorted as shown in the perspective view 1010.

Figure 11:
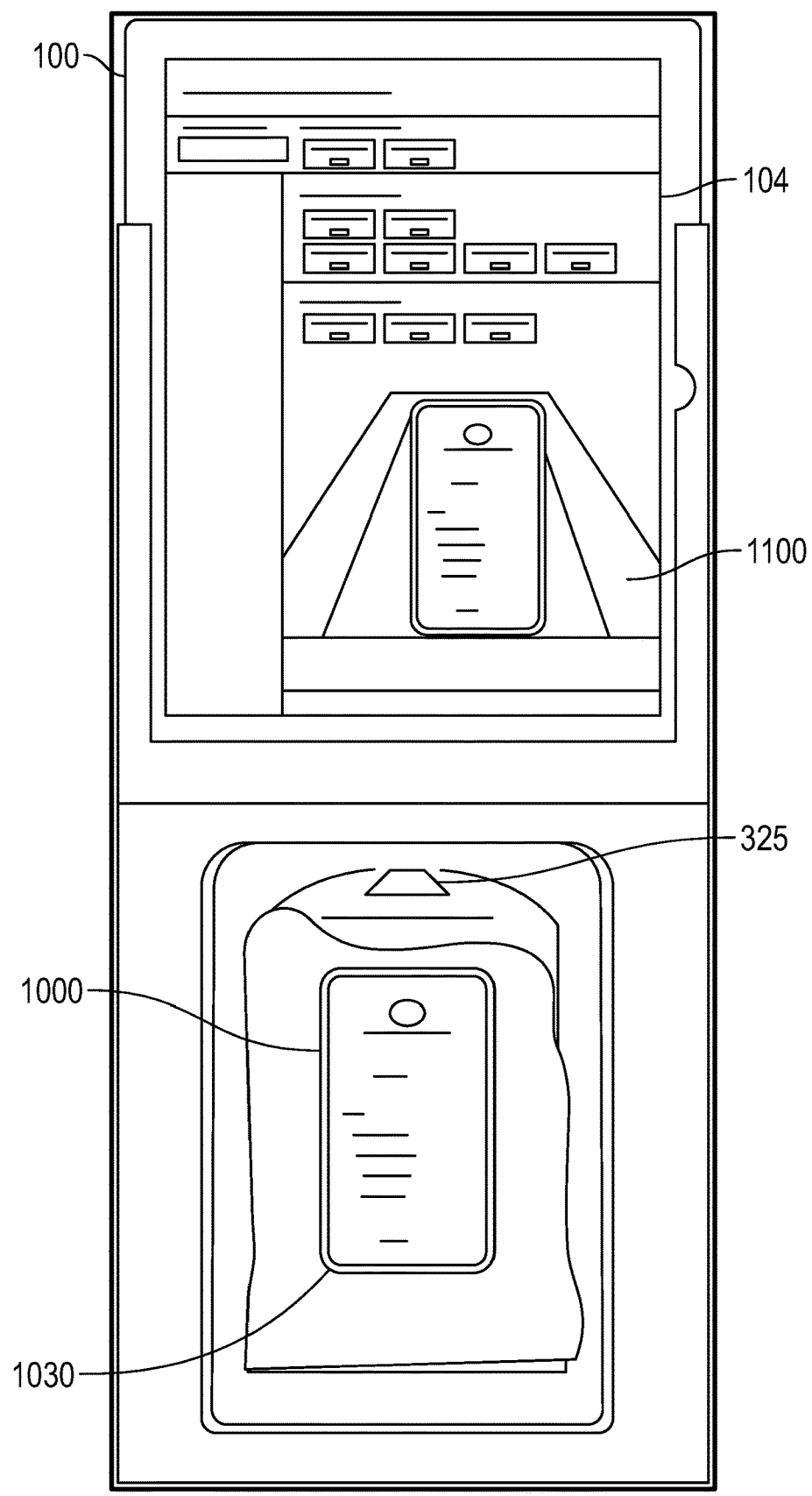
FIG. 11 is a front view similar to FIG. 10 illustrating a keystone correction applied to the image of the mobile electronic device presented on the kiosk display, in accordance with embodiments of the present technology.

FIG. 11 is similar to FIG. 10 but shows a keystone correction applied to the image of the device 1000 displayed on the kiosk display screen 104. A hardware or a software processor associated with the kiosk 100, such as the processor 402 in FIG. 4B, can receive the perspective view 1010 of the device 1000 shown in FIG. 10. The processor 402 can correct the perspective distortion and prevent the shortening of distances, such as shortening the second side 1030 of the device 1000, away from the camera 325. As a result, the kiosk display screen 104 can show an augmented reality display including a corrected image 1100, in which the device 1000 appears to be rectangular, or at least approximately rectangular, as opposed to trapezoidal. The user may not realize that the corrected image 1100 does not represent the actual image visible to the camera 325.

In some embodiments, when the tray 212 rotates into a horizontal, grading position as shown in FIG. 7B, the camera 325 in FIG. 7B has a direct view (which could also be referred to as a perpendicular or "non-angled" view) of the device 1000. Consequently, there is no (or at least relatively little) perspective distortion in the camera's 325 view of the device 1000. As a result, the processor 402 associated with the camera 325 can forgo performing the keystone correction before displaying a visual representation of the device 1000 on the kiosk display screen 104 or, in some embodiments, on a display of a remote computing device used by a remote operator to view the device 1000. In some embodiments, the processor 402 can make the decision to not perform the keystone correction based on the tray 212 being in the horizontal position and/or based on the access door 112 being closed. In other embodiments, the processor 402 can analyze a recorded image of the device 1000, and upon determining that there is no (or relatively little) perspective distortion in the recorded image, e.g., that there are no trapezoidal shapes in the image, the processor can forgo performing the keystone correction.

Figure 12:
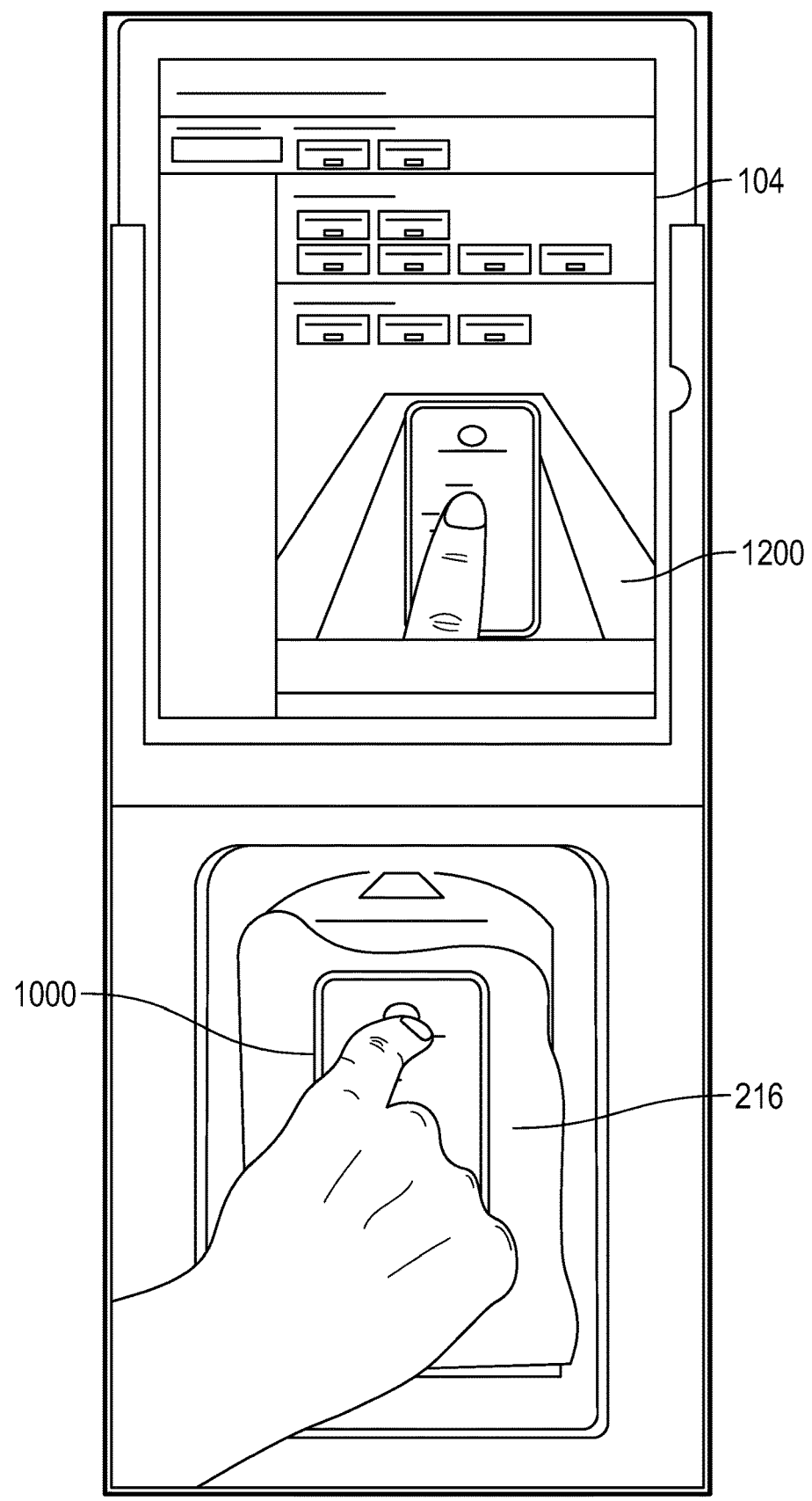
FIG. 12 is a front view similar to FIG. 11 illustrating a visual representation of a user interacting with the mobile electronic device presented on the kiosk display, in accordance with embodiments of the present technology.

FIG. 12 is a front view of the kiosk 100 that is similar to FIG. 11 and shows a visual representation presented on the kiosk display screen 104. The visual representation can be one or more images and/or a video of the device 1000. For example, in the illustrated embodiment the visual representation includes a user interaction with the device 1000. More specifically, in this embodiment the user has inserted their hand into a portion of the inspection area 216 to touch the display of the device 1000, and this interaction is shown on the kiosk display screen 104. The kiosk display screen 104 can show the user interacting with the device 1000 as a corrected image 1200.

Figure 13A:
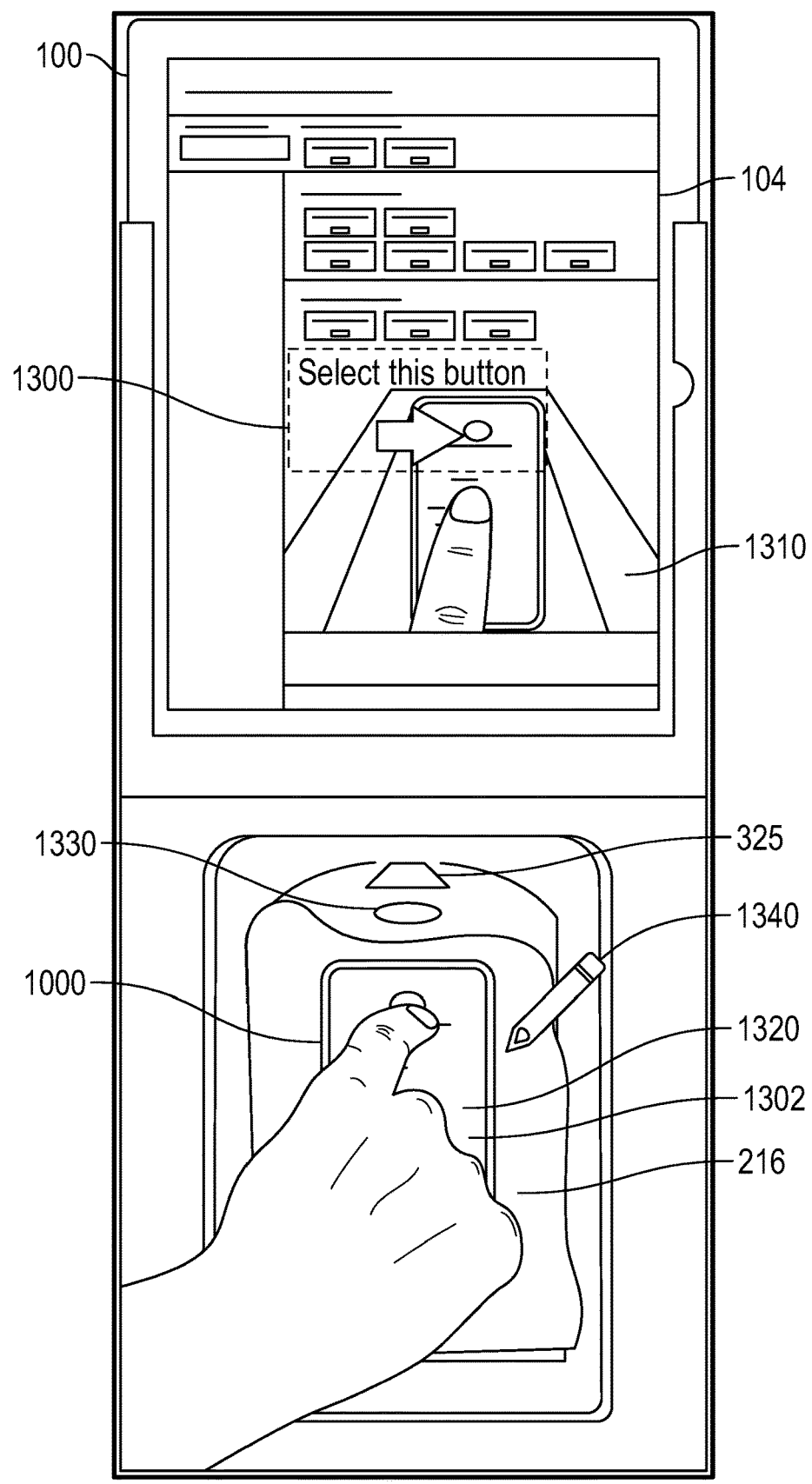
FIG. 13A is a front view similar to FIG. 12 illustrating an augmented reality display presented on the kiosk display, in accordance with embodiments of the present technology.

FIG. 13A shows an augmented reality display at the kiosk display screen 104. A processor associated with the kiosk 100 can create an augmented reality display at the kiosk display screen 104 by overlaying one or more prompts 1300 or user messages on top of the live video 1310 of the device 1000 while the user is interacting with the device. For example, as shown in FIG. 13A, the user's finger can be visible on the kiosk display screen 104.

The prompts 1300 can direct the user how to navigate the device 1000 so that a display screen of the device 1000 can display an image 1320 showing information about the device, such as:
Make
Model
Serial number
Operating system (OS) and OS version
IMEI (primary and secondary)
IP addresses (IPv4/6)
BT/Wi-Fi MAC addresses.
Carrier (AT&T, Verizon, etc.)
Memory configuration
User info: email, phone, name
Cloud lock status (via log-in screen for new user).

The messages or instructions can vary based on the make and/or model of the device 1000. To determine the make and/or model of the device 1000, the camera 325 can record images/videos of the device 1000. Based on the recorded images/videos, the processor can determine the dimensions (e.g., width, height, and/or thickness) of the device 1000, as well as other visual attributes, such as the shape of the curvature of a corner of the device 1000. For example, Apple® iPhones® have a particular corner curvature, whereas Android® and Microsoft® phones tend to have sharper corners than iPhones®. Based on the determined device characteristics (e.g., width, height, and/or curvature), the processor can determine the make and/or model of the device 1000. In other embodiments, information obtained by a wireless charger (e.g., the wireless charger 222; FIG. 2A) can be used by the kiosk 100 to determine the make and/or model of the device 1000. Consequently, based on the make and/or model of the device, the processor can provide device-specific messages or instructions that can cause the device 1000 to provide additional information about the device.

For example, the prompt 1300 can instruct the user to go to the "Settings" menu on the device 1000 and select the menu item "About Phone," which can provide all or a portion of the above-listed information. The camera 325 can record the image of the display screen 1302 of the device 1000, and the processor can perform OCR to obtain the necessary information about the device 1000. In another example, the prompt 1300 can instruct the user to dial "*#06 #" on the device 1000, which can bring up information about the device 1000, such as the IMEI number.

The image 1320 displayed on the device 1000 can vary in color, such as white background with black characters, or dark background with white characters. The font size and type in the image 1320 can also vary. Consequently, the kiosk 100 can include one or more light sources 1330 providing appropriate lighting of the device 1000. The light sources 1330 can vary the lighting based on the color of the image 1320 and the color of the font in the image. For example, the lighting can be used to increase the visibility of the font in the image 1320, such as when the font is black, the lighting can be white, and when the font is white, the lighting can be colored and/or can be of low intensity. Further, the processor can adjust the exposure, focus, etc., of the camera 325 to provide a clear image 1320 with appropriate color contrast, so that the font can be read from the image 1320.

The prompt 1300 can also direct the user to the user's personal accounts, such as their iCloud account, so that the kiosk processor 402 can confirm that the user is logged out of the personal account. If the user is still logged in to the personal account, the prompt 1300 can instruct the user to log out of the personal account. In some embodiments, this may be necessary because when the user is still logged in to the personal account, such as their iCloud account, the user can retain the rights to the device 1000, even if the device is deposited inside the kiosk 100. Therefore, before enabling receipt of the device 1000, the processor 402, using OCR, determines whether the user is logged out of one or more personal accounts.

In addition, after the user has decided to sell the device 1000, the kiosk 100, for example, using the prompt 1300 can instruct the user to perform a factory reset. The OCR system (such as the OCR system 807 in FIG. 8) can observe the user initiating a factory reset. When the factory reset is initiated, the device 1000 OS shows a unique progress screen indicating the initiation. The OCR system can detect the unique progress screen to confirm the initiation of the factory reset. Resetting a device to a factory reset is a lengthy process, so the kiosk 100 would likely make this the last interaction the user has with the device 1000 before selling it. In one embodiment, the user can initiate a factory reset, receive the payment for the device 1000, and leave the device 1000 to finish the factory reset inside the kiosk 100. Once the processor 402 performs OCR to obtain the necessary information about the device 1000, such as the make, model, memory capacity, and/or carrier of the device, the processor can provide a price or multiple prices for the device. A first price can be lower than a second price and can indicate the price of the device 1000 if the device is damaged/defective, while the second price can indicate the price of the device 1000 if the device is not damaged/defective. Also, if needed the prompt 1300 can indicate an additional amount of time needed, such as several minutes, to determine whether the device 1000 is damaged or somehow deficient or, conversely, if the device 1000 is otherwise worthy of the second, higher price. The user can determine whether the additional amount of time is worth the wait, given the difference between the two prices.

If the user does not wish to wait, the user can accept the lower price and the kiosk 100 can proceed to purchase the device for the lower price as described herein. If, instead, the user wishes to have the device further inspected in order to obtain a higher price, the kiosk 100 can proceed to further inspect the device and then offer a more accurate (and likely higher) price based on the more thorough inspection. In some embodiments as described herein, the kiosk 100 and other associated systems can further inspect the device 1000 by: causing the device to run one or more tests; using one or more cameras (e.g., the camera 325) that image the device for visual inspection of, e.g., the device display screen for cracks or other damage; and/or using an electrical cable, such as electrical connectors 474*a-c* in FIG. 4A, or a wireless connection (e.g., the wireless transceiver 813; FIG. 8) that connects to the device and performs an electrical inspection of, e.g., device functionality, etc.

Even if the user does not follow the directions provided through the prompts 1300 and instead shows a fake unique identifier of the device 1000, such as a fake IMEI number, the kiosk 100 can detect the fake. For example, in some embodiments the kiosk 100 can include a robotic stylus 1340 that is operably positioned in or proximate to the inspection area 216 and can interact with the display of the device 1000, such as by interacting with touch sensors of the device. For example, the robotic stylus 1340 can scroll the screen of the device 1000. When the user presents the image of the IMEI, the robotic stylus 1340 can interact with the display screen 1302 of the device 1000 to make sure that the device screen can be scrolled. If the user is showing a static image with a fake IMEI, the screen of the device 1000 cannot be scrolled and can only be moved. The processor 402, using the camera 325 and the OCR system, can detect whether the screen is being scrolled or just being moved. If the screen is just being moved, the processor 402 can determine that the user has presented a static image and inform the user to display the true unique identifier of the device 1000. If the user declines, the kiosk 100 can terminate the transaction.

In addition, the OCR system can determine whether the device 1000 has been stolen. For example, if the kiosk 100 receives a device 1000 that has been turned off, a wireless or wired charger associated with the kiosk 100 can power the device 1000. When a stolen device 1000 is powered up, the device displays a notification that the device has been stolen, such as a "Find My iPhone" notification. The notification can be in a standard format and have a predefined place on the device 1000 display. The OCR system can recognize the notification and ask the user to disable the notification. If the user cannot disable the notification, the kiosk 100 can reject the device 1000. In another example, to determine whether the device 1000 is stolen, the kiosk 100 can access a database containing a list of unique identifiers of stolen devices. If the unique identifier associated with the device 1000 is on the list of stolen devices, the kiosk 100 can reject the device 1000 and terminate the transaction.

Based on the unique identifier, e.g., the IMEI number, the kiosk 100 can determine whether the device 1000 has a high resale value, such as a newer-model phone like Pixel 3® or iPhone X®. If the device 1000 has a high resale value, the kiosk 100 can ask the user (via, e.g., appropriate prompts presented on the kiosk display screen 104) to do more tests to determine a more accurate price. The kiosk 100 can present an offer to the user asking the user to perform several more tests which will take a total of several minutes, and in exchange, the user can receive a higher purchase price for the device 1000. The kiosk 100 can present the offer at the kiosk display screen 104, or the kiosk 100 can cause the device 1000 to present the offer to the user, and the kiosk display screen 104 can show the offer presented on the device 1000. If the user accepts the offer, the kiosk 100 can instruct the user on how to perform the additional tests. FIGS. 14A-17 described below illustrate various aspects of tests that the kiosk 100 can cause the device 1000 to perform to provide a more accurate price. To perform the various tests described below in reference to FIGS. 14A-17, the user can remove the device 1000 from the kiosk 100, and upon completing the tasks, the user can return the device to the kiosk (e.g., by repositioning the device 1000 on the inspection tray 212 with the tray 212 in the position shown in FIG. 7A). Alternatively, the user can interact with the device 1000 during the tests and while the device is placed on the tray 212 of the kiosk 100.

Figure 13B:
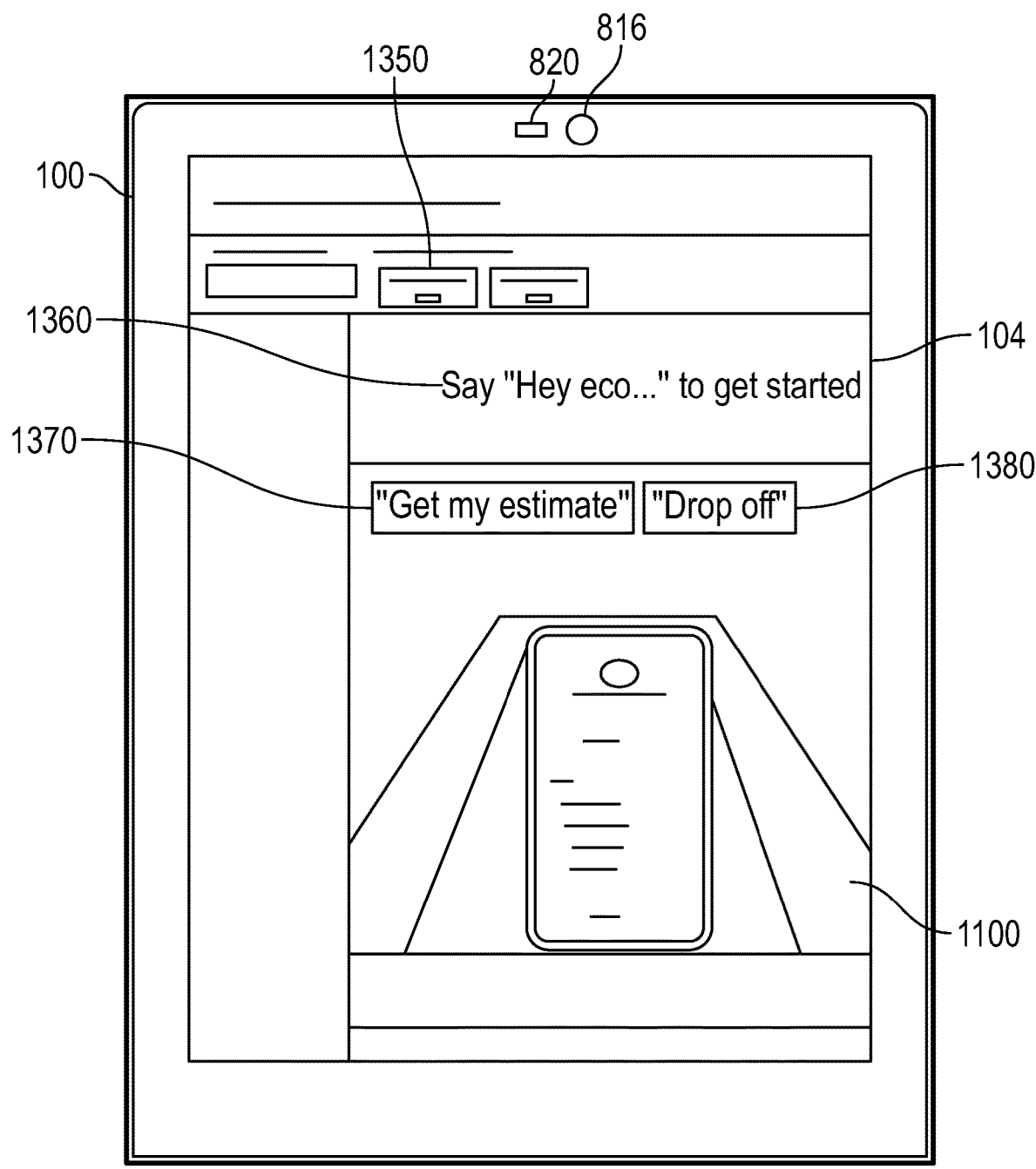
FIG. 13B shows a natural language user interface at the kiosk.

FIG. 13B shows a natural language user interface at the kiosk 100. In some embodiments, the kiosk can include a natural language processing system, and the user can interact with the kiosk using natural language, in addition to interacting with the kiosk 100 using the kiosk display screen 104, or kiosk buttons 1350. The natural language processing system can include the microphone 816 and a processor, e.g., processor 402 in FIG. 4B. The processor 402 can support a machine learning model, such as a neural network or a transformer trained to understand a natural language. The processor 402 can be an artificial intelligence (AI) accelerator, such as a tensor processing unit (TPU), a graphics processing unit (GPU), an application-specific integrated circuit (ASIC), a field-programmable gate array (FPGA), etc.

For example, the kiosk display screen 104 can show a message 1360 to the user indicating the wake word that the user can use to activate the natural language interaction. Once the user speaks the wake word, such as "Hey, eco," the kiosk 100 can respond with an audio prompt to the user, and/or the kiosk can respond with a visual prompt shown on the kiosk display screen 104. For example, the kiosk display screen 104 can display visual prompts including the commands 1370, 1380 that, when spoken by the user, the natural language processing system can recognize, such as "Get My Estimate" or "Drop Off." The commands 1370, 1380 can change depending on what the kiosk 100 can recognize at a particular point in time.

In another example, if the user says "Get Estimate," the commands 1370, 1380 can change to state "Show Me How," "Enter Digits," "Help," or "Go back," because those are the commands that the kiosk 100 can recognize at that point in time. Alternatively, or in addition to the visually displayed commands 1370, 1380, the kiosk can provide the available commands to the user through audio emitted by one or more speakers 820. The kiosk 100 can use one or more directional microphones 816 to enable audio interaction with the user by recording and understanding the user's speech in a noisy environment, such as a mall.

Once the user has spoken the wake word, the kiosk 100 can wait for the user input for a predetermined amount of time, such as 5 or 10 seconds. If the user does not provide input within the predetermined amount of time, the kiosk 100 can go back into sleep mode until the kiosk receives the wake word.

Figure 14A:
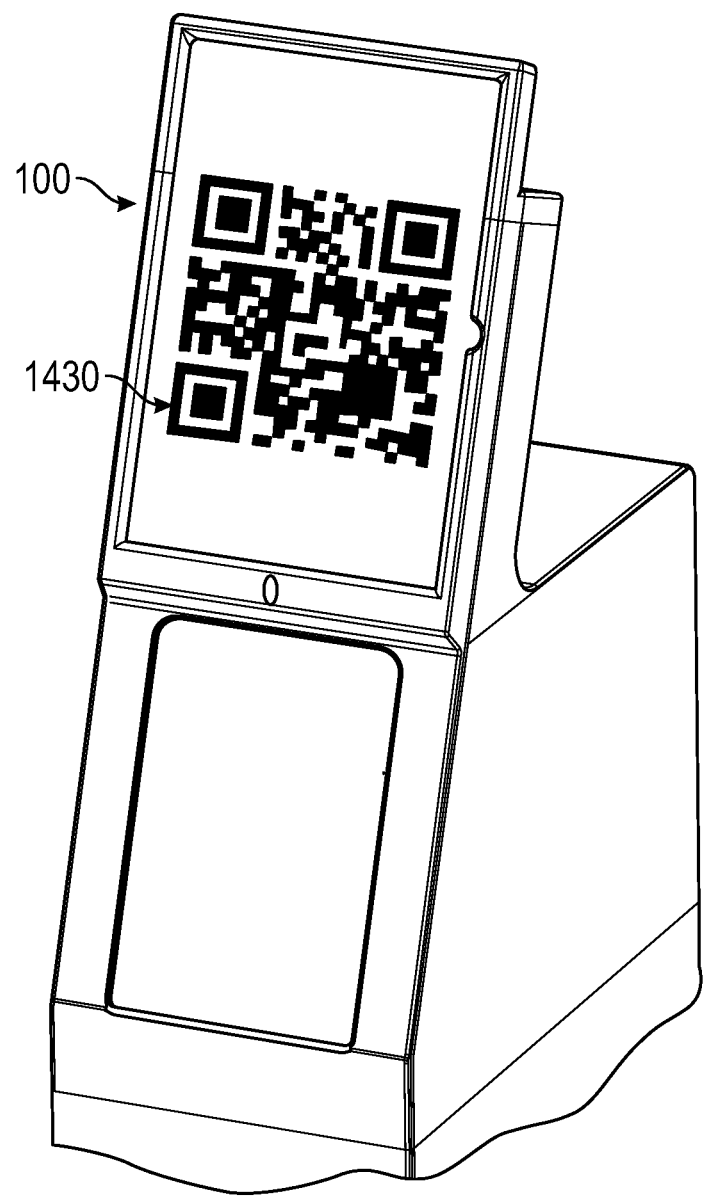
FIG. 14A is an isometric view of the kiosk of FIG. 1 showing a quick response (QR) code displayed on the kiosk display, in accordance with embodiments of the present technology.

FIG. 14A is an isometric view of the kiosk 100 showing a unique code (e.g., a QR code, barcode, etc.) displayed on the kiosk display screen 104. In some embodiments, to run the tests on the device 1000, the kiosk 100 can guide the user to download a software application to the device 1000, where the software application is configured to run one or more tests on the device 1000. In other embodiments, as shown in FIG. 14A, to streamline the process and not require the user to download a software application, the kiosk 100 can display a QR code 1430. The user can point a camera of the device 1000 at the displayed QR code 1430. When the device 1000 detects/identifies the QR code 1430, the device 1000 can launch a web browser and direct the user to a website. The website can (via, e.g., HTML5 and Javascript) run one or more of the tests described below in reference to FIGS. 14B-17 via the browser launched by the device 1000.

Figure 14B:
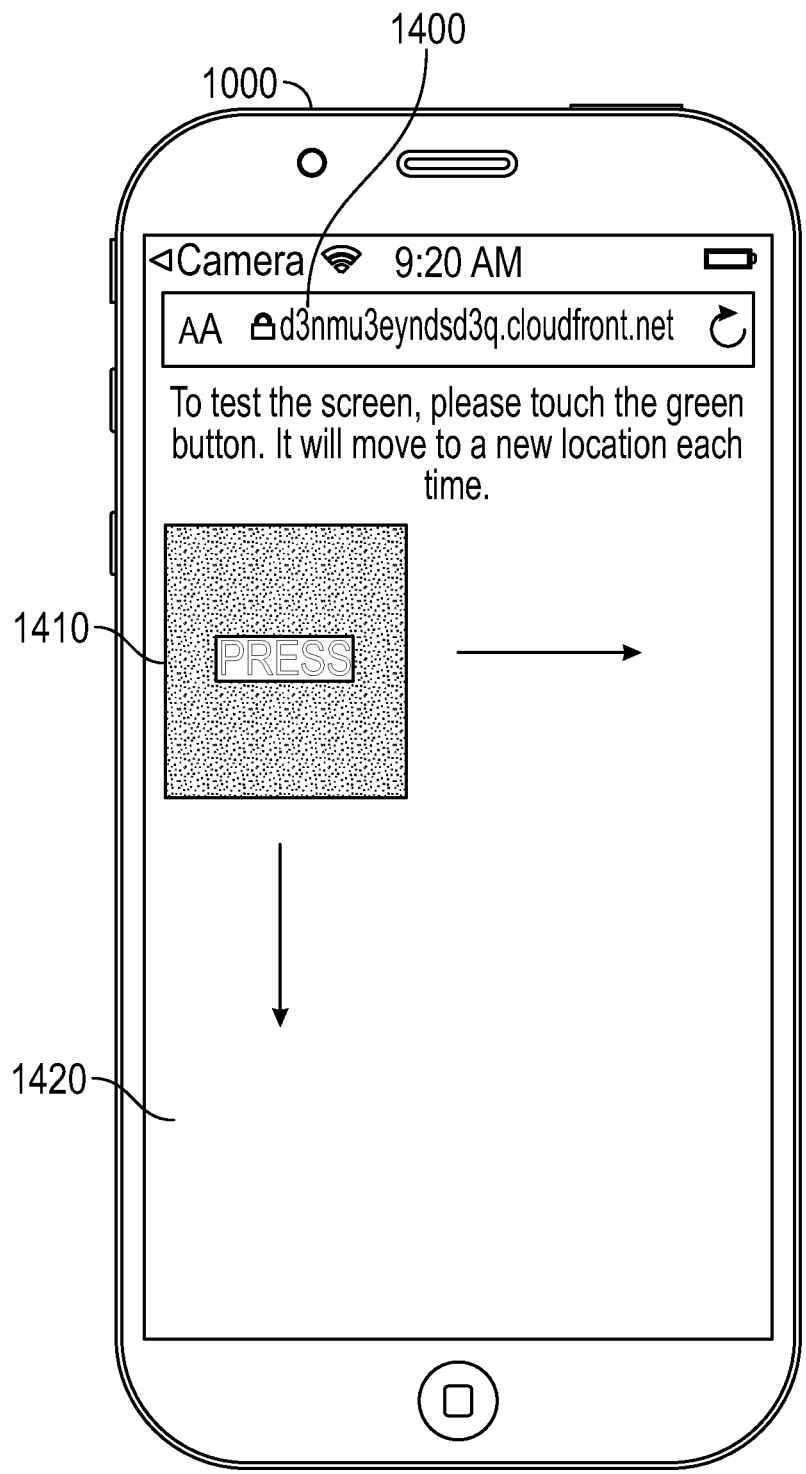
FIG. 14B illustrates a user interface of a mobile electronic device that displays tests of the device including touch screen functionality, in accordance with some embodiments of the present technology.

Turning next to FIG. 14B, to test network access of the device 1000, the kiosk 100 can instruct or otherwise cause the device 1000 to access a particular web page 1400 by, for example, having the device 1000 scan the QR code 1430, as described above. If the device 1000 successfully accesses the web page 1400, that is an indication that the device has functioning network access. To test the camera of the device 1000, the device 1000 can scan the QR code 1430 shown in FIG. 14A that can initiate testing of the device's other functionalities.

FIG. 14B shows a user interface of the device 1000 that displays tests of the device including touch screen functionality according to some embodiments of the present technology. In some embodiments, the user can run the tests if the user has accepted the offer described above. To test the touch screen functionality, the device 1000 can display an object (e.g., a square 1410), that can move across the screen 1420 (e.g., horizontally and vertically). In each new position of the square 1410, the device 1000 can ask the user to select the square 1410. The device 1000 can determine whether the selection was detected and whether the selection matches the location (or approximate location) of the square 1410. If the selection matches the location of the square 1410 for a threshold number of (or all) positions of the square 1410 on the screen 1420, the device 1000 can determine that the touch screen functionality works.

Figure 15:
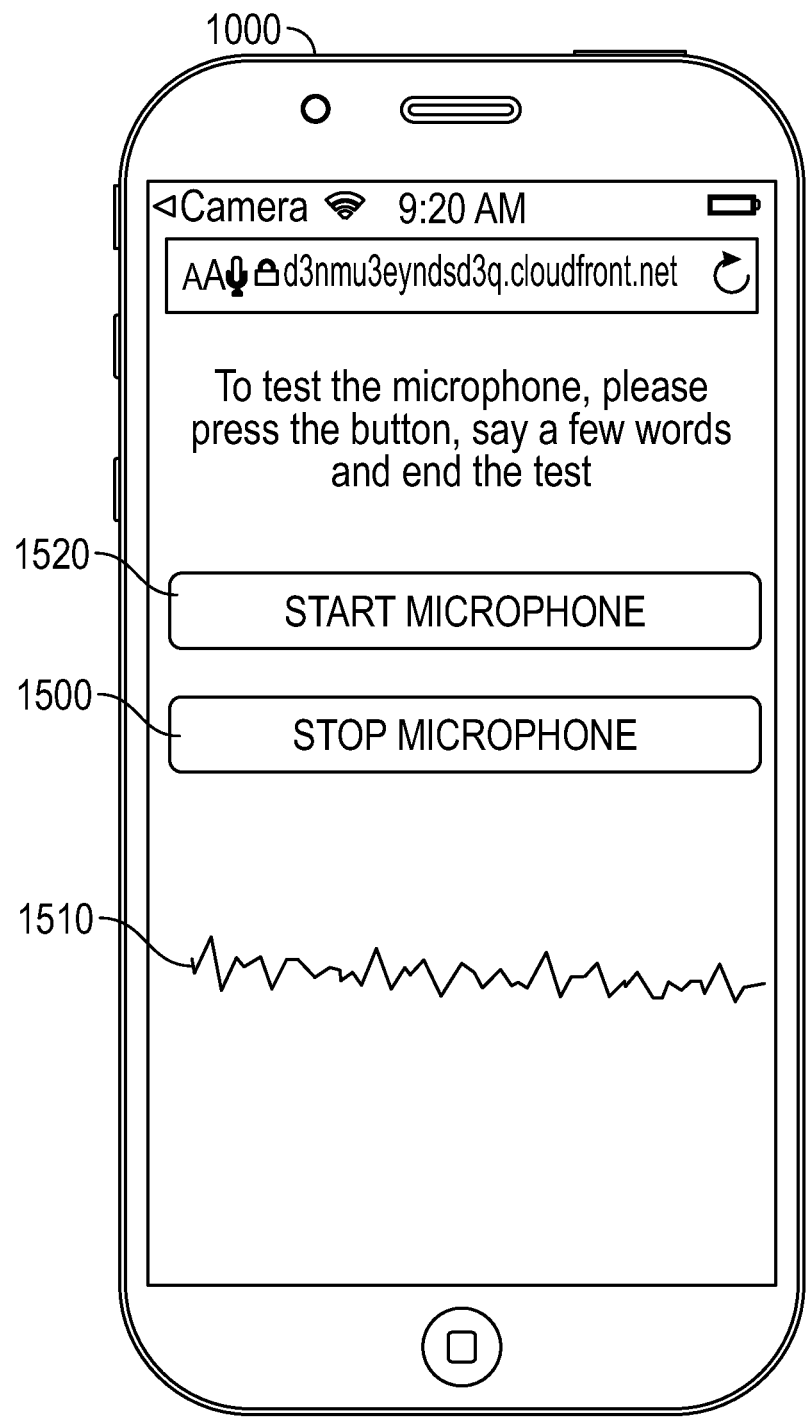
FIG. 15 illustrates a user interface of a mobile electronic device that displays a test of a microphone of the device, in accordance with some embodiments of the present technology.

FIG. 15 illustrates a user interface of the device 1000 that displays a test of the microphone of the device 1000 according to some embodiments of the present technology. The device 1000 can instruct the user, via audio, video, text, picture, or other similar means, how to test the microphone. For example, the device 1000 can provide a selection (e.g., a button) 1520 to start the test and record the audio, and a selection (e.g., a button) 1500 to stop the test. The device 1000 can display a visualization 1510 of the recorded audio.

Figure 16:
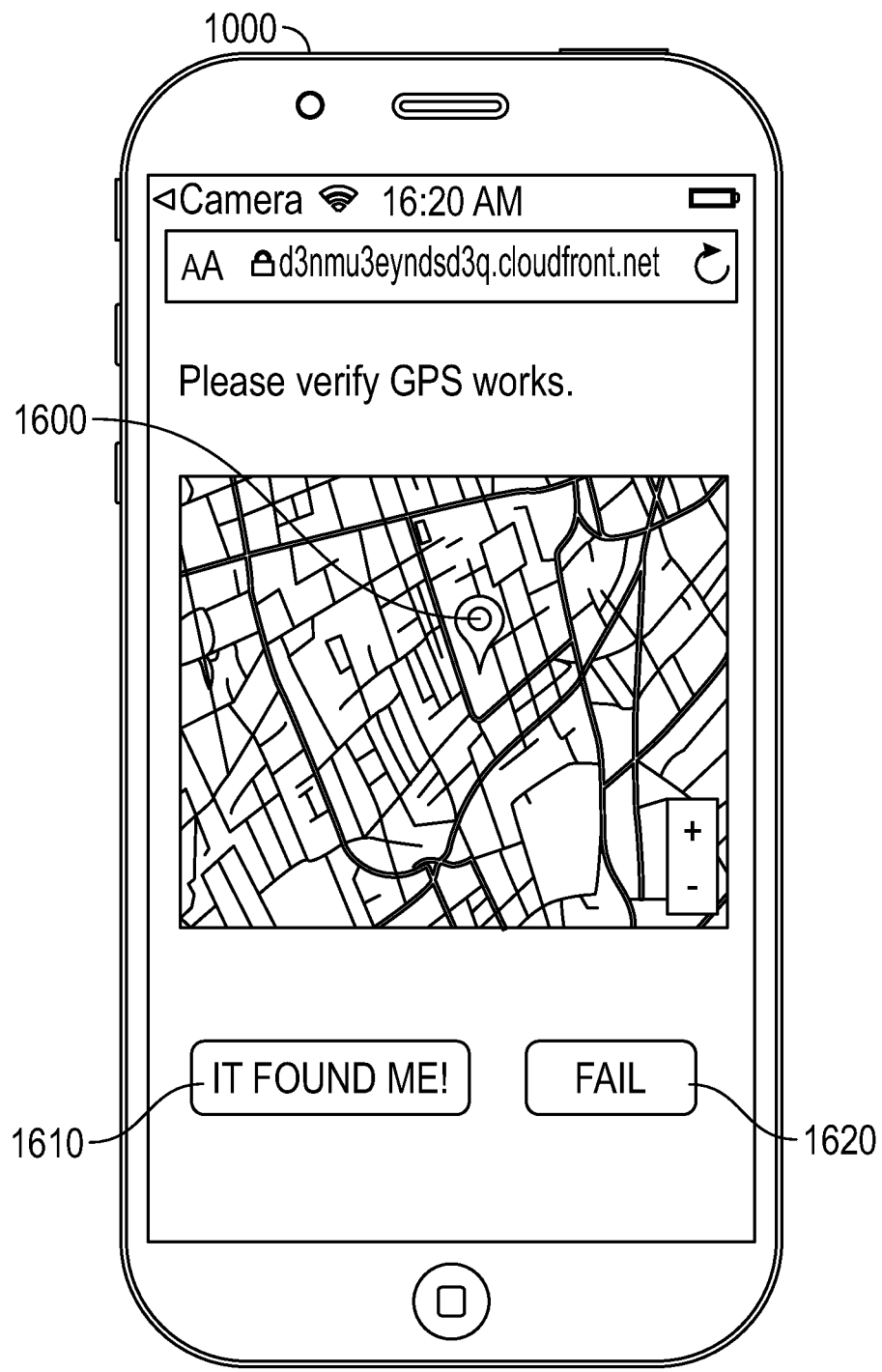
FIG. 16 illustrates a user interface of a mobile electronic device that displays a test of a global positioning system (GPS) of the device, in accordance with some embodiments of the present technology.

FIG. 16 shows a user interface of the device 1000 that displays a test of the location capabilities (e.g., a GPS) of the device according to some embodiments of the present technology. For example, the device 1000 can test the GPS by determining the location of the device 1000 using the GPS and communicating the location of the device 1000 to the user, via audio, video, text, picture, or other similar means. For example, the device 1000 can display the detected location 1600 of the device 1000 on a map. The device 1000 can request that the user provide confirmation of the detected location 1600, such as by using buttons 1610, 1620, and/or by using audio communication.

Figure 17:
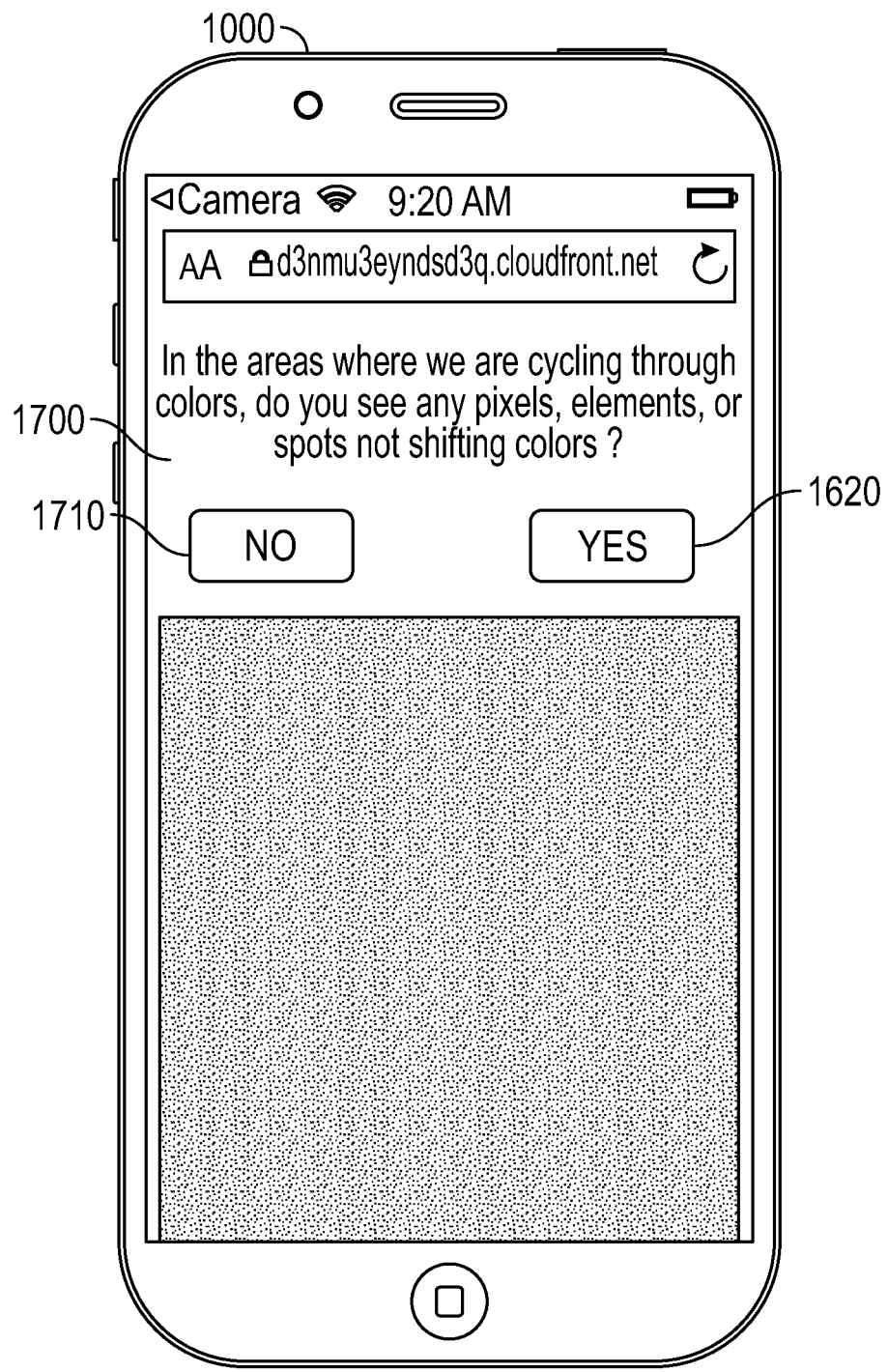
FIG. 17 illustrates a user interface of a mobile electronic device that displays a test of the display of the device, in accordance with some embodiments of the present technology.

FIG. 17 shows a user interface that displays a test of the display of the device 1000 according to some embodiments of the present technology. The device 1000 can display one or more colors, such as red, blue, and/or green, on the display screen 1302 of the device 1000. The device 1000 can present a query to the user, via audio, video, text, picture, or other similar means, such as: "in the areas where we are cycling through colors, do you see any pixels, elements, or spots that are not shifting colors?" The user can respond to the query using buttons 1710, 1720, and/or by using audio communication. A "No" response can indicate to the kiosk processor 402 that the display screen 1302 is not defective; conversely, a "Yes" response can indicate that the display screen 1302 may have one or more defects, such as defective pixels.

Figure 18A:
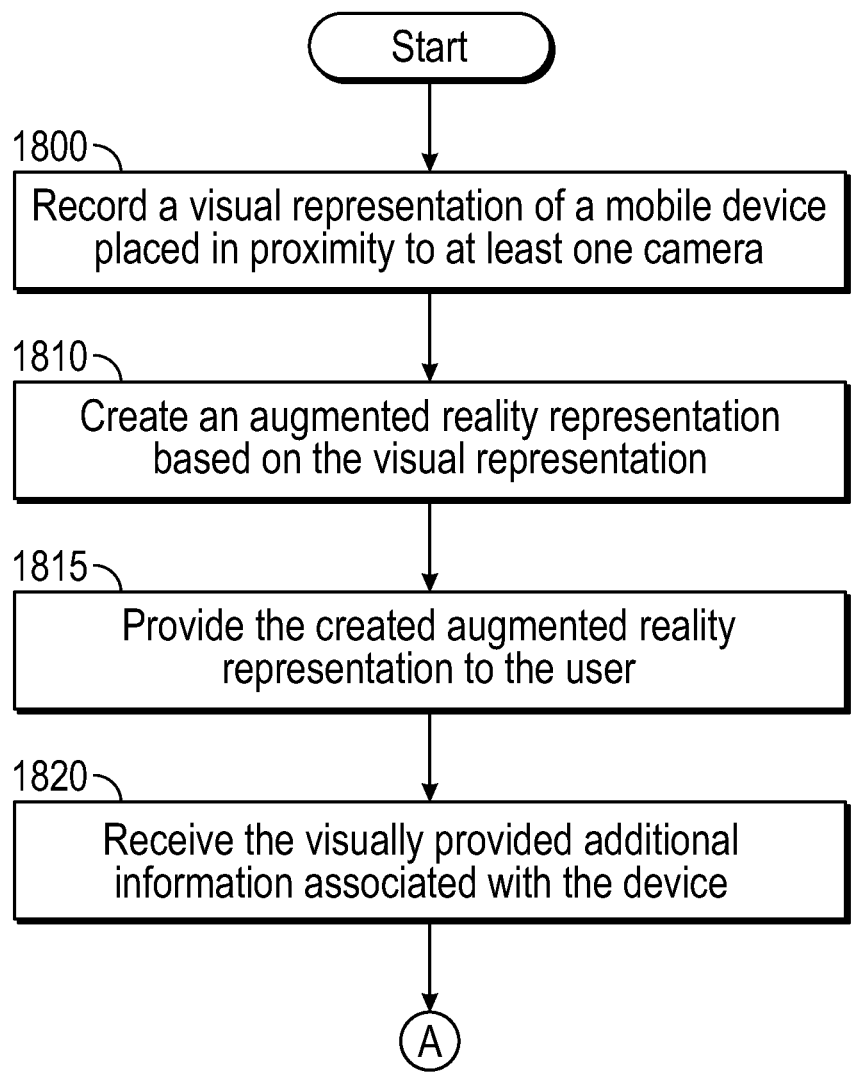
FIGS. 18A-18B illustrate flowcharts of a method for providing a purchase price for a mobile device, in accordance with some embodiments of the present technology.
Figure 18B:
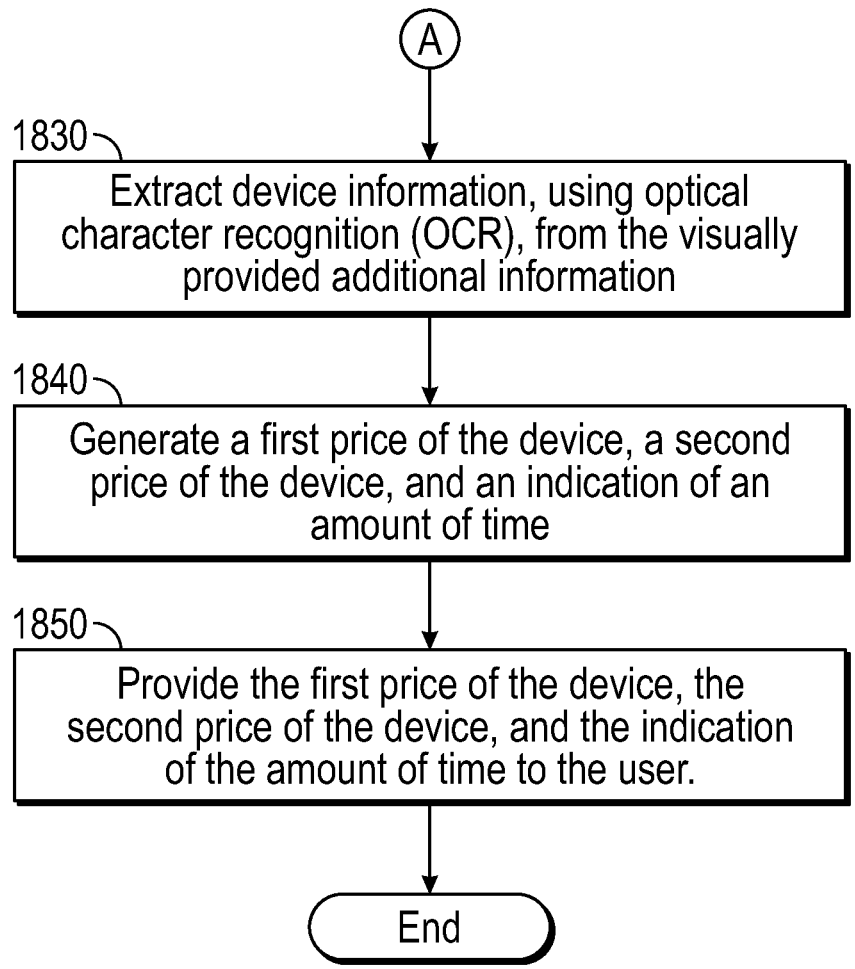

FIGS. 18A-18B illustrate a flowchart of a method for determining and providing a purchase price (e.g., a dollar value) or other compensation value for a mobile device (e.g., the mobile device 1000). In step 1800, a processor, such as the processor 402 in FIG. 4B, can record a visual representation of a mobile device placed in proximity to at least one camera (e.g., a mobile device placed on the inspection tray 212 in view of the camera 325; FIG. 7A). The visual representation can include a perspective distortion due to the position of the at least one camera relative to the device, as shown in FIG. 10.

In step 1810, the processor can create an augmented reality representation based on the visual representation. For example, as described above in reference to FIGS. 11-13, the processor can correct the perspective distortion associated with the visual representation, generate a message to guide a user to cause the device to visually provide additional information associated with the device, combine the corrected visual representation and the message or instruction to guide the user into the augmented reality representation, and provide the augmented reality representation to the user. The device information can include a make of the device, a model of the device, a carrier associated with the device, a memory capacity associated with the device, or any combination thereof.

In a more specific example, the generated message or instruction can guide the user to log out from one or more personal user accounts associated with the device. In a different, specific example, the processor can generate the message or instruction to guide the user to cause the device to visually provide the additional information associated with the device based on the make of the device. The messages or instructions to guide the user can vary based on the make of the device. The processor can use the OCR system (such as the OCR system 807 in FIG. 8) to determine the make of the device by determining, for example, a curvature of a corner of the device from the visual representation of the device. For example, the processor can take a picture when the device is placed in a tray, such as the tray 212 shown in FIG. 10, and based on the picture determine the curvature of the device. The curvature of the device, as described in this application, can indicate the make of the device.

The processor can determine whether to perform the correction of the perspective distortion based on an orientation of the device or based on a state of an enclosure surrounding the device. For example, when the device is in the grading position as shown in FIG. 7B, the processor can decide that the correction of the perspective distortion is not necessary because the camera 325 in FIG. 7A views the device 210 straight on (e.g., at a perpendicular angle relative to the device). Similarly, when the access door 112 in FIG. 7B is closed, the processor may not perform the correction because the user cannot interact with the device 210 when the access door 112 is closed, and thus correction of any perspective distortion is not necessary.

In step 1815, the processor can provide the created augmented reality representation to the user by, for example, displaying the augmented reality representation at a kiosk display, such as the kiosk display screen 104 described above.

In step 1820, the processor can receive the visually provided additional information associated with the device. The visually provided additional information can be provided on the display of the mobile device in the form of, e.g., an image and/or a video. In step 1830 (FIG. 18B), the processor can extract device information from the visually provided additional information using, for example, optical character recognition (OCR).

In step 1840, based on the extracted device information, the processor can generate one or more prices for the device, such as a first price of the device and a second price of the device, and an indication of an amount of time. The first price can indicate the value of the device if the device is damaged. The second price can indicate the value of the device if the device is not damaged. In some embodiments, the processor will not have performed a full inspection of the device before providing the first price and the second price, and as a result the processor does not know whether the device is damaged or not. Consequently, the first price indicates an approximate value of the device if, upon inspection of the device, the processor determines that the device is damaged. Similarly, the second price indicates an approximate value of the device if, upon inspection of the device, the processor determines that the device is not damaged. Consequently, the first price is lower than the second price. The indication of the amount of time can represent a wait time for the processor to evaluate the device, determine whether the device is damaged, and offer the appropriate price (e.g., the first price to the user based on the determined condition of the device).

In step 1850, the processor can provide the first price of the device, the second price of the device, and the indication of the amount of time to the user via, e.g., the kiosk display screen 104. If the processor receives a selection of the second price from the user, this indicates that the user is willing to wait for the processor to perform a full inspection of the device. The user is likely to make the selection of the second price when the user knows that the device is in good condition and that the full inspection of the device will result in an offer of the second price, or a price close to the second price, for the device. The processor can determine the condition of the device. Upon determining that the device is not damaged, the processor can offer the second price, or a price similar to the second price, to the user for the device.

As noted above, in some embodiments the processor can also detect whether the device is stolen. If the device is stolen, the processor can refuse to purchase the device. To detect whether the device is stolen, the processor can power up the device using a wireless charger if the device as received has been turned off. A lost and/or stolen device can display an alert, upon being powered up, to indicate that the owner of the device has reported that the device is lost and/or stolen. The processor can use OCR to determine whether the device displays an alert indicating that the device is reported to be stolen and/or lost. Upon detecting the alert, the processor can provide a notification to the user to disable the displayed alert. A true owner of the device can disable the alert. The processor can determine whether the displayed alert is disabled. Upon determining that the displayed alert is not disabled, the processor can determine that the device is stolen and refuse to accept the device and/or take other steps.

The processor can enable voice interaction with the user by providing recognizable voice commands to the user, as described above in reference to FIG. 13B. The processor can obtain audio spoken by the user and can match the audio spoken by the user to at least one of the recognizable voice commands, such as "Help," "Enter Digits," "Give Me an Estimate," "Start Over," etc. Upon finding a match between the audio spoken by the user and the recognizable voice command, the processor can execute the command. If the processor does not match the spoken voice to the commands, the processor can ask the user to repeat the command or to make a selection using a button or a touch screen on the kiosk.

A non-transitory computer-readable medium can store instructions described herein, which when executed by at least one computing device, can perform a method as generally shown and described herein and equivalents thereof.

Figure 19:
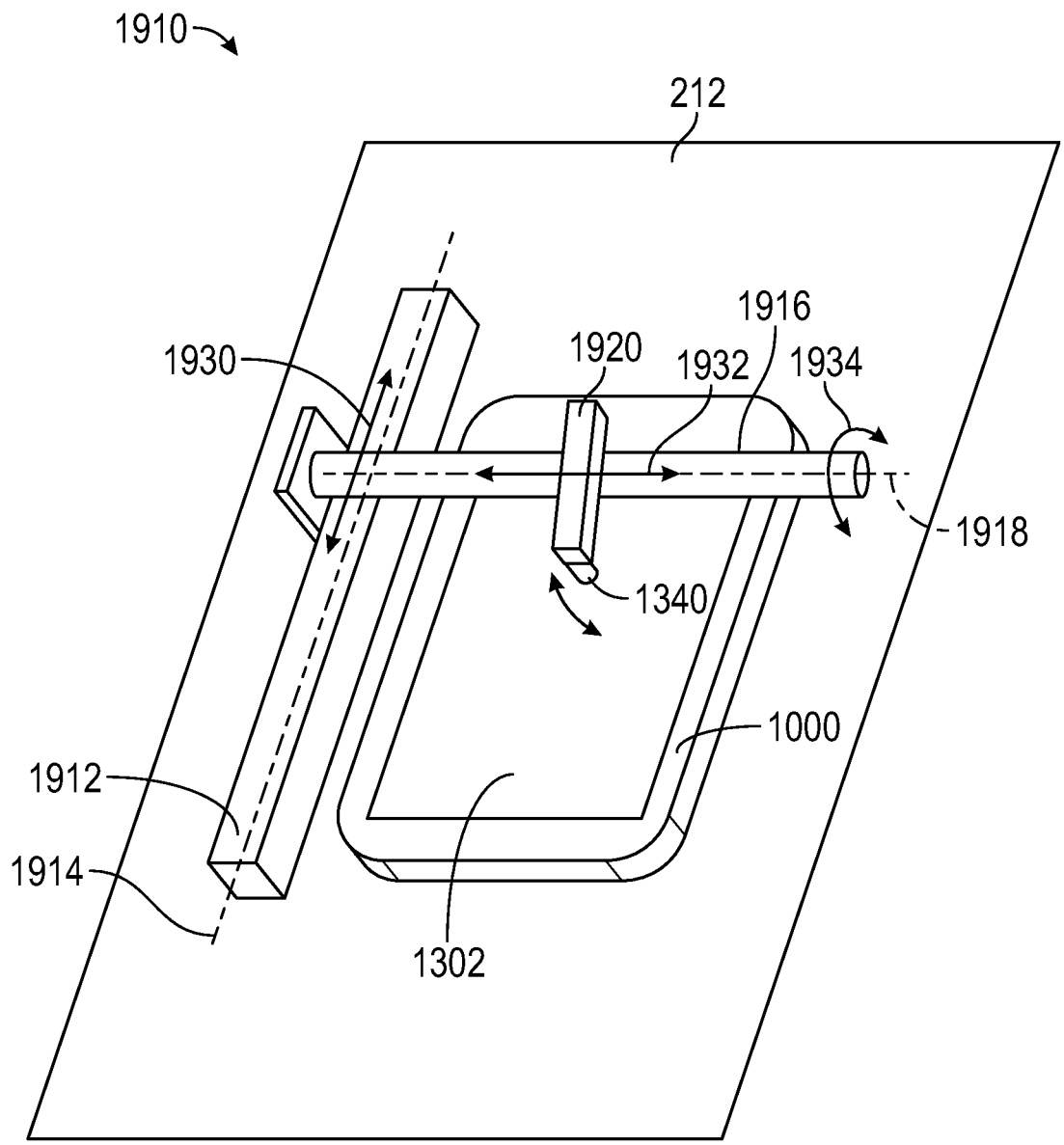
FIG. 19 is a partially schematic isometric view of a robotic stylus system configured in accordance with some embodiments of the present technology.

As described above in reference to FIG. 13A, in some embodiments the kiosk 100 can include a robotic stylus 1340 (which can also be referred to as a robotic finger) that is operably positioned in or proximate to the inspection area 216 and can interact with the display of the device 1000, such as by interacting with touch sensors of the device. By way of example, FIG. 19 is a partially schematic isometric view of a robotic stylus system 1910 configured in accordance with some embodiments of the present technology. In the illustrated embodiment, the robotic stylus system 1910 includes a track or rail 1912 positioned on or proximate to the surface of the inspection tray 212, and a carriage arm 1916 extending at a right angle therefrom and having a proximal end portion that is movably (e.g., slidably) coupled to the rail 1912. More specifically, in some embodiments the proximal end portion of the carriage arm 1916 can be coupled to a drive belt on the rail 1912 that is controlled by a motor (e.g., an electric stepper motor) to move the carriage arm 1916 up and down along a longitudinal axis 1914 of the rail 1912 as indicated by the arrows 1930. In other embodiments, the carriage arm 1916 can be coupled to the rail 1912 by means of a pinion gear that engages a toothed track that extends longitudinally on the rail, and activation of the pinion gear (via, e.g., an electric motor) can move the carriage arm 1916 up and down on the toothed track in the indicated directions. In another aspect of this embodiment, the robotic stylus system 1910 further includes a stylus carriage 1920 that is movably coupled to the carriage arm 1916 by, for example, a drive belt on the carriage arm 1916 that, when activated by a drive motor, is configured to move the stylus carriage 1920 left and right along an axis 1918 of the carriage arm 1916 as indicated by the arrows 1932. The stylus carriage 1920 includes a stylus 1340 positioned on a distal end portion thereof. In the illustrated embodiment, the carriage arm 1916 is also configured to rotate about the axis 1918 as indicated by the arrows 1934 to thereby move the stylus 1340 toward and away from the device display screen 1302 as necessary to interact with the display screen 1302 as described above with reference to FIG. 13A. In operation, the device 1000 can be positioned on the inspection tray 212 adjacent to the robotic stylus system 1910 as shown in FIG. 19. In some embodiments, the inspection tray 212 can include an adhesive pad on which the device 1000 is placed to help hold the device 1000 in position on the tray. The respective drive motors of the robotic stylus system 1910 can be controlled by the kiosk processor to move the carriage arm 1916 and the stylus carriage 1920 as needed along and/or about the axes 1914 and 1918, respectively, to move the stylus 1340 to interact with the device display screen 1302 as described above in reference to FIG. 13A. Although FIG. 19 illustrates one example of a suitable robotic stylus system, the present disclosure is not limited to such a system and other types of suitable systems can be used. For example, other such systems can include styluses that are operably coupled to a robotic arm, and/or styluses that are coupled to a solenoid and configured to move toward and away from the device display screen 1302 via operation of the solenoid. Additional robotic stylus systems are disclosed in U.S. Provisional Patent Application No. 62/202,330 and U.S. Nonprovisional patent application Ser. No. 13/658,828, both of which are incorporated herein by reference in their entireties.

The following patents and patent applications are incorporated herein by reference in their entireties: U.S. Pat. Nos. 10,572,946; 10,475,002; 10,445,708; 10,438,174; 10,417,615; 10,401,411; 10,269,110; 10,157,427; 10,127,647; 10,055,798; 9,885,672; 9,881,284; 8,200,533; 8,195,511; and 7,881,965; U.S. patent application Ser. Nos. 16/794,009; 16/788,169; 16/788,153; 16/719,699; 16/601,492; 16/575,090; 16/575,003; 16/556,104; 16/556,018; 16/534,741; 16/357,041; 16/195,785; 15/977,729; 15/901,526; 15/855,320; 15/672,157; 15/641,145; 15/630,460; 15/214,791; 15/091,487; 15/057,707; 14/967,183; 14/966,346; 14/964,963; 14/934,134; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; and Ser. No. 13/113,497; and U.S. Provisional Patent Application Nos. 63/116,007; 63/116,020; 63/066,794, 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

Aspects of the invention can be embodied in a special purpose computer or data processor that is specifically programmed, configured, or constructed to perform one or more of the computer-executable instructions explained in detail herein. While aspects of the present technology, such as certain functions, are described as being performed exclusively on a single device, the present technology can also be practiced in distributed environments where functions or modules are shared among disparate processing devices, which are linked through a communications network, such as a Local Area Network (LAN), a Wide Area Network (WAN), or the Internet. In a distributed computing environment, program modules may be located in both local and remote memory storage devices.

Aspects of the present technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in their entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

The above Detailed Description of examples and embodiments of the invention is not intended to be exhaustive or to limit the invention to the precise form disclosed above. While specific examples of the invention are described above for illustrative purposes, various equivalent modifications are possible within the scope of the invention, as those skilled in the relevant art will recognize. For example, while processes are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes are at times described as being performed in series, these processes may instead be performed or implemented in parallel or performed at different times.

The teachings of the present technology provided herein can be applied to other systems, not necessarily the system described above. The elements and acts of the various examples described above can be combined to provide further implementations of the invention. Some alternative implementations of the invention may not only include additional elements to those implementations noted above, but may also include fewer elements. Further, any specific numbers noted herein are only examples; alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, either in this application or in a continuing application.

We claim:

1. A method performed by one or more processors of a kiosk, the method comprising:
    recording, by at least one camera of the kiosk, a visual representation of a mobile device placed in proximity to the at least one camera,
        wherein the visual representation of the mobile device includes a perspective distortion of the mobile device due to a position of the at least one camera relative to the mobile device;
    creating, by the one or more processors, an augmented reality representation of the mobile device based on the visual representation by:
        correcting the perspective distortion associated with the visual representation;
        generating a message to guide a user to cause the mobile device to visually display additional information associated with the mobile device; and
        combining the corrected visual representation and the message to generate the augmented reality representation;
    providing, by a user interface of the kiosk, the created augmented reality representation to the user;
    receiving the visually displayed additional information associated with the mobile device;
    extracting device information, using optical character recognition (OCR), from the visually displayed additional information;
    based on the extracted device information, generating a first price of the mobile device and a second price of the mobile device,
        wherein the first price indicates a value of the mobile device when the mobile device is damaged,
        wherein the second price indicates a value of the mobile device when the mobile device is not damaged, and
        wherein the first price is lower than the second price; and
    presenting, by the user interface, the first price and the second price to the user.

2. The method of claim 1, further comprising:
    receiving, by the user interface, a selection of the second price from the user;
    determining, by the one or more processors, a condition of the mobile device; and
    upon determining that the mobile device is not damaged, offering, by the user interface, the second price to the user.

3. The method of claim 1, wherein the visual representation comprises at least one of an image or a video.

4. The method of claim 1, wherein creating the augmented reality representation comprises:
    generating, by the one or more processors, the message to guide the user to log out from one or more personal user accounts associated with the mobile device; and
    combining, by the one or more processors, the corrected visual representation and the message to guide the user to log out to create the augmented reality representation.

5. The method of claim 1, wherein the device information comprises at least one of a make of the mobile device, a model of the mobile device, a carrier associated with the mobile device, or a memory capacity associated with the mobile device.

6. The method of claim 1, wherein generating the message to guide the user to cause the mobile device to visually provide the additional information associated with the mobile device comprises:
    determining, by the one or more processors, a make of the mobile device by determining a curvature of a corner of the mobile device from the visual representation; and
    generating, by the one or more processors, the message to guide the user to cause the mobile device to visually provide the additional information associated with the mobile device based on the make of the mobile device.

7. The method of claim 1, further comprising:
    detecting that the mobile device is stolen by:
        receiving, by a tray of the kiosk, the mobile device that has been turned off;
        powering up, by a cable of the kiosk, the mobile device;
        using, by the one or more processors, OCR to determine that the mobile device displays an alert indicating that the mobile device is reported to be stolen;
        providing, by the user interface, a notification to the user to disable the displayed alert;
        determining, by the one or more processors, that the displayed alert is disabled; and
        upon determining that the displayed alert is not disabled, determining, by the one or more processors, that the mobile device is stolen.

8. The method of claim 1, further comprising:
determining, by the one or more processors, that the visual representation should be corrected based on an orientation of the mobile device or based on a state of an enclosure surrounding the mobile device.

9. The method of claim 1, further comprising:
enabling, by a speaker of the kiosk, voice interaction with the user by providing recognizable voice commands to the user;
obtaining, by a microphone of the kiosk, an audio spoken by the user; and
matching, by the one or more processors, the audio spoken by the user to at least one of the recognizable voice commands.

10. A kiosk comprising:
one or more processors; and
a non-transitory computer-readable medium storing instructions, which when executed by the one or more processors cause the one or more processors to:
record, by at least one camera of the kiosk, a visual representation of a mobile device placed in proximity to the at least one camera,
wherein the visual representation includes a perspective distortion of the mobile device due to the position of the at least one camera relative to the mobile device;
create an augmented reality representation of the mobile device based on the visual representation by causing the one or more processors to:
correct the perspective distortion associated with the visual representation;
generate a message to guide a user to cause the mobile device to visually display additional information associated with the mobile device; and
combine the corrected visual representation and the message to generate the augmented reality representation;
provide, by a user interface of the kiosk, the created augmented reality representation to the user;
receive the visually provided additional information associated with the mobile device;
extract device information, using optical character recognition (OCR), from the visually provided additional information;
based on the extracted device information, generate a first price of the mobile device and a second price of the mobile device,
wherein the first price indicates a value of the mobile device when the mobile device is damaged,
wherein the second price indicates a value of the mobile device when the mobile device is not damaged, and
wherein the first price is lower than the second price; and
present the first price and the second price to the user.

11. The kiosk of claim 10, wherein the instructions further cause the one or more processors to:
receive a selection of the second price from the user;
determine a condition of the mobile device; and
upon determining that the mobile device is not damaged, offer the second price to the user.

12. The kiosk of claim 10, wherein the visual representation comprises at least one of an image or a video.

13. The kiosk of claim 10, wherein the instructions to create the augmented reality representation cause the one or more processors to:
generate the message to guide the user to log out from one or more personal user accounts associated with the mobile device; and
combine the corrected visual representation and the message to guide the user to log out to create the augmented reality representation.

14. The kiosk of claim 10, wherein the device information comprises at least one of a make of the mobile device, a model of the mobile device, a carrier associated with the mobile device, or a memory capacity associated with the mobile device.

15. The kiosk of claim 10, wherein the instructions to generate the message to guide the user to cause the mobile device to visually provide the additional information associated with the mobile device cause the one or more processors to:
determine a make of the mobile device by determining a curvature of a corner of the mobile device from the visual representation; and
generate the message to guide the user to cause the mobile device to visually provide the additional information associated with the mobile device based on the make of the mobile device.

16. The kiosk of claim 10, wherein the instructions further cause the one or more processors to:
detect that the mobile device is stolen by causing the one or more processors to:
receive, by a tray of the kiosk, the mobile device that has been turned off;
cause the kiosk to power up the mobile device;
use optical character recognition to determine that the mobile device displays an alert indicating that the mobile device is reported to be stolen;
provide, by the user interface, a notification to the user to disable the displayed alert;
determine that the displayed alert is disabled; and
upon determining that the displayed alert is not disabled, determine that the mobile device is stolen.

17. The kiosk of claim 10, wherein the instructions further cause the one or more processors to:
determine that the visual representation should be corrected based on an orientation of the mobile device or based on a state of an enclosure surrounding the mobile device.

18. The kiosk of claim 10, wherein the instructions further cause the one or more processors to:
enable voice interaction with the user by providing recognizable voice commands to the user;
obtain, by a microphone of the kiosk, an audio spoken by the user; and
match the audio spoken by the user to at least one of the recognizable voice commands.

19. A non-transitory computer-readable medium storing instructions, which when executed by at least one computing device of a kiosk cause the at least one computing device to:
record, by at least one camera of the kiosk, a visual representation of a mobile device placed in proximity to the at least one camera,
wherein the visual representation includes a perspective distortion of the mobile device due to the position of the at least one camera relative to the mobile device;
create an augmented reality representation of the mobile device based on the visual representation by causing the at least one computing device to:
correct the perspective distortion associated with the visual representation;

generate a message to guide a user to cause the mobile device to visually display additional information associated with the mobile device; and combine the corrected visual representation and the message to generate the augmented reality representation;

provide, by a user interface of the kiosk, the created augmented reality representation to the user;

receive the visually provided additional information associated with the mobile device;

extract device information, using optical character recognition (OCR), from the visually provided additional information;

based on the extracted device information, generate a first price of the mobile device and a second price of the mobile device, wherein the first price indicates a value of the mobile device when the mobile device is damaged, wherein the second price indicates a value of the mobile device when the mobile device is not damaged, and wherein the first price is lower than the second price; and present, by the user interface, the first price and the second price to the user.

20. The non-transitory computer-readable medium of claim 19, wherein the instructions further cause the at least one computing device to:

receive, by the user interface, a selection of the second price from the user;

determine a condition of the mobile device; and upon determining that the mobile device is not damaged, offer, by the user interface, the second price to the user.

* * * * *